United States Patent
Nelson et al.

(10) Patent No.: US 10,325,014 B2
(45) Date of Patent: Jun. 18, 2019

(54) SYSTEM AND METHOD FOR CONVERGENT DOCUMENT COLLABORATION

(71) Applicant: WORKIVA INC., Ames, IA (US)

(72) Inventors: Grant Nelson, Bozeman, MT (US); Michael J. Thiesen, Bozeman, MT (US); Aaron Hall, Bozeman, MT (US); Nathan Woods, Bozeman, MT (US); David Marne, Bozeman, MT (US)

(73) Assignee: Workiva Inc., Ames, IA (US)

(*) Notice: Subject to any disclaimer, the term of this patent is extended or adjusted under 35 U.S.C. 154(b) by 0 days.

(21) Appl. No.: 16/191,821

(22) Filed: Nov. 15, 2018

(65) Prior Publication Data

US 2019/0102370 A1 Apr. 4, 2019

Related U.S. Application Data

(63) Continuation-in-part of application No. 15/411,237, filed on Jan. 20, 2017, which is a continuation of
(Continued)

(51) Int. Cl.
*G06F 16/93* (2019.01)
*G06F 17/22* (2006.01)
(Continued)

(52) U.S. Cl.
CPC .......... *G06F 17/24* (2013.01); *G06F 16/9027* (2019.01); *G06F 16/93* (2019.01);
(Continued)

(58) Field of Classification Search
CPC ...... G06F 17/24; G06F 16/93; G06F 16/9027; G06F 17/2235
See application file for complete search history.

(56) References Cited

U.S. PATENT DOCUMENTS

| 4,807,182 A | 2/1989 | Queen |
| 6,230,173 B1 | 5/2001 | Ferrel et al. |

(Continued)

OTHER PUBLICATIONS

Grishchenko, "Deep Hypertext with Embedded Revision Control Implemented in regular Expressions," Proceedings of the 6th International Symposium on Wikis and Open Collaboration, ACM, 2010, 10 pages.

(Continued)

*Primary Examiner* — Ranodhi Serrao
(74) *Attorney, Agent, or Firm* — Drinker Biddle & Reath LLP

(57) ABSTRACT

In various implementations, a computing device: displays the document outline on the user interface; maintains, in a non-transitory computer-readable medium, a causal graph data structure representing the document outline, wherein the causal graph data structure includes a plurality of structure nodes, each structure node representing a level of the document outline; receives, via the user interface, an insertion of a new level to the document outline; in response to the insertion, defines a structure node that represents the inserted level; inserts a transition node in the causal graph data structure, wherein the transition node represents a relationship between the structure node and at least one other node of the causal graph data structure; inserts the structure node into the causal graph data structure as a child of the transition node; and updating the user interface to display the inserted level.

16 Claims, 47 Drawing Sheets

Related U.S. Application Data application No. 15/049,221, filed on Feb. 22, 2016, now Pat. No. 9,552,343, which is a continuation of application No. 14/808,029, filed on Jul. 24, 2015, now Pat. No. 9,292,482.

(60) Provisional application No. 62/587,177, filed on Nov. 16, 2017, provisional application No. 62/155,000, filed on Apr. 30, 2015.

(51) Int. Cl.
  *G06F 17/24* (2006.01)
  *G06Q 10/10* (2012.01)
  *G06F 16/901* (2019.01)

(52) U.S. Cl.
  CPC ...... *G06F 17/2235* (2013.01); *G06F 17/2247* (2013.01); *G06F 17/2288* (2013.01); *G06Q 10/10* (2013.01); *G06Q 10/103* (2013.01)

(56) References Cited

U.S. PATENT DOCUMENTS

| | | |
|---|---|---|
| 6,792,454 B2 | 9/2004 | Nakano et al. |
| 7,124,362 B2 | 10/2006 | Tischer |
| 7,249,314 B2 | 7/2007 | Walker et al. |
| 7,496,841 B2 | 2/2009 | Hadfiled et al. |
| 7,587,471 B2 | 9/2009 | Yasuda et al. |
| 8,015,235 B1 | 9/2011 | Bauer et al. |
| 8,412,813 B2 | 4/2013 | Carlson et al. |
| 8,555,161 B2 | 10/2013 | Parker |
| 8,595,620 B2 | 11/2013 | Larsen et al. |
| 8,656,290 B1 | 2/2014 | Greenspan et al. |
| 8,825,594 B2 | 9/2014 | Skaria et al. |
| 9,015,301 B2 | 4/2015 | Redlich et al. |
| 9,152,686 B2 | 10/2015 | Whitehead et al. |
| 2002/0049697 A1 | 4/2002 | Nakano et al. |
| 2002/0065848 A1 | 5/2002 | Walker et al. |
| 2003/0121008 A1 | 6/2003 | Tischer |
| 2004/0024752 A1 | 2/2004 | Manber et al. |
| 2005/0132070 A1 | 6/2005 | Redlich et al. |
| 2006/0271868 A1 | 11/2006 | Sullivan et al. |
| 2007/0186157 A1 | 8/2007 | Walker et al. |
| 2007/0245409 A1 | 10/2007 | Harris et al. |
| 2008/0005164 A1 | 1/2008 | Yee et al. |
| 2008/0114720 A1 | 5/2008 | Smith et al. |
| 2008/0177825 A1 | 7/2008 | Dubinko et al. |
| 2012/0030563 A1 | 2/2012 | Lemonik et al. |
| 2012/0173612 A1 | 7/2012 | Vegesna-Venkata et al. |
| 2014/0047327 A1 | 2/2014 | Larsen et al. |
| 2014/0181016 A1 | 6/2014 | Whitehead et al. |
| 2014/0245257 A1 | 8/2014 | Kusmer et al. |
| 2015/0058449 A1 | 2/2015 | Garg et al. |

OTHER PUBLICATIONS

Grishchenko et al., "Referencing within evolving hypertext," Second international Workshop on Dynamic and Adaptive Hypertext, 2011, 12 pages.

Ignat et al., "Tree-based model algorithm for maintaining consistency in real-time collaborative editing systems," The Fourth International Workshop on Collaborative Editing Systems, CSCW 2002, New Orleans, USA, Nov. 2002, 8 pages.

| Node | |
|---|---|
| Identifier | *Identifier |
| Attributes Deletions | map[TypeEnum][]*Attributes []*Deletion |
| Parents Children | []*Transition []*Transition |

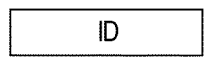

FIG. 18A

| Transition | |
|---|---|
| Identifier Deletions | *Identifier []*Deletion |
| Start End | *Node *Node |
| Cause Children | interface{} []*Transition |

FIG. 18B

| Deletion | |
|---|---|
| Identifier | *Identifier |
| Cause Deletions | interface{} []*Deletion |

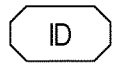

FIG. 18C

| Attribute | |
|---|---|
| Identifier Type Value | *Identifier TypeEnum String |
| Cause Deletions | interface{} []*Deletion |

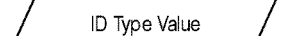

FIG. 18D

| Node | #0:0 Root | #1:1 A | #1:3 B | #1:5 C | #1:7 D |
|---|---|---|---|---|---|
| Transition | nil | nil | nil | nil | nil |

| Node | #0:0 Root | #1:1 A | #1:3 B | #1:5 C | #1:7 D |
|---|---|---|---|---|---|
| Transition | nil | #1:2 Root→A | #1:4 Root→B | #1:6 Root→C | #1:9 B→D |

| Node | #0:0 Root | #1:1 A | #1:3 B | #1:5 C |
|---|---|---|---|---|
| Transition | nil | #1:2 Root→A | #1:4 A→B | #1:6 Root→C |

| Node | #0:0 Root | #1:1 A | #1:3 B | #2:6 C |
|---|---|---|---|---|
| Transition | nil | #1:2 Root→A | #1:4 Root→B | #2:7 Root→C |

| Node | #0:0 Root | #1:1 A | #1:3 B |
|---|---|---|---|
| Transition | nil | nil | nil |
| Parent Index | -1 | -1 | -1 |

| Node | #0:0 Root | #1:1 A | #1:3 B |
|---|---|---|---|
| Transition | nil | #2:5 B→A | nil |
| Parent Index | -1 | 2 | -1 |

| Node | #0:0 Root | #1:1 A | #1:3 B |
|---|---|---|---|
| Transition | nil | #2:5 B→A | #1:5 A→B |
| Parent Index | -1 | 2 | 1 |

| Node | #0:0 Root | #1:1 A | #1:3 B |
|---|---|---|---|
| Transition | nil | #2:5 B→A | #1:4 Root→B |
| Parent Index | -1 | 2 | 0 |

| Node | #0:0 Root | #1:1 A | #1:3 B | #1:5 C |
|---|---|---|---|---|
| Transition | nil | #2:7 C→A | #3:7 A→B | #1:7 B→C |
| Parent Index | -1 | 3 | 1 | 2 |

| Node | #0:0 Root | #1:1 A | #1:3 B | #1:5 C |
|---|---|---|---|---|
| Transition | nil | #2:7 C→A | #3:7 A→B | #1:6 Root→C |
| Parent Index | -1 | 3 | 1 | 0 |

| Node | #0:0 Root | #1:1 A | #1:3 B | #1:5 C |
|---|---|---|---|---|
| Transition | nil | #2:7 C→A | #1:4 Root→B | #1:7 B→C |
| Parent Index | -1 | 3 | 0 | 2 |

| Node | #0:0 Root | #1:1 A | #1:3 B | #1:5 C |
|---|---|---|---|---|
| Transition | nil | #2:7 C→A | #3:7 A→B | #1:6 Root→C |
| Parent Index | -1 | 3 | 1 | 0 |

| Node | #0:0 Root | #1:1 A | #1:3 B | #1:5 C |
|---|---|---|---|---|
| Transition | nil | #1:2 Root→A | #3:7 A→B | #1:7 B→C |
| Parent Index | -1 | 0 | 1 | 2 |

SYSTEM AND METHOD FOR CONVERGENT DOCUMENT COLLABORATION

CROSS-REFERENCE TO RELATED APPLICATIONS

This application claims the priority benefit of U.S. Provisional Patent Application 62/587,177, filed Nov. 16, 2017. This application is also is a continuation in part of U.S. application Ser. No. 15/411,237, filed Jan. 20, 2017, which is a continuation of U.S. application Ser. No. 15/049,221, filed Feb. 22, 2016 (now U.S. Pat. No. 9,552,343), which is a continuation of U.S. application Ser. No. 14/808,029, filed Jul. 24, 2015 (now U.S. Pat. No. 9,292,482), which claims the benefit of U.S. Provisional Patent Application No. 62/155,000, entitled "SYSTEM AND METHOD FOR CONVERGENT DOCUMENT COLLABORATION," filed on Apr. 30, 2015. The disclosures of each of the above-listed applications are incorporated herein by reference in their entirety.

TECHNICAL FIELD

The disclosure is generally directed to methods and devices for online collaborative document editing and, more particularly, to a method and computing device for maintaining a document outline on a user interface.

BACKGROUND

Collaborative editing applications allow multiple users to access and edit a document. There are two conventional approaches to collaboration on documents. The first approach uses an application to manage requests to edit a document by checking a document in and out of shared storage, permitting only one user at a time to edit the document.

The second conventional collaborative approach has the master document's owner create a unique copy of that document for each collaborator. Because the collaborators are denied knowledge of others' edits, their respective work quickly results in conflicting changes to the master document. The master document's owner is left with resolving these conflicts. What was to be collaboration diverges into a conflict of edits.

DRAWINGS

The features and advantages of the disclosure will become more apparent by describing in detail exemplary embodiments thereof with reference to the attached drawings, in which.

FIG. 16A, FIG. 16B, FIG. 16C, and FIG. 16D illustrate examples of causal graphs, according to an embodiment.

Figure 17:
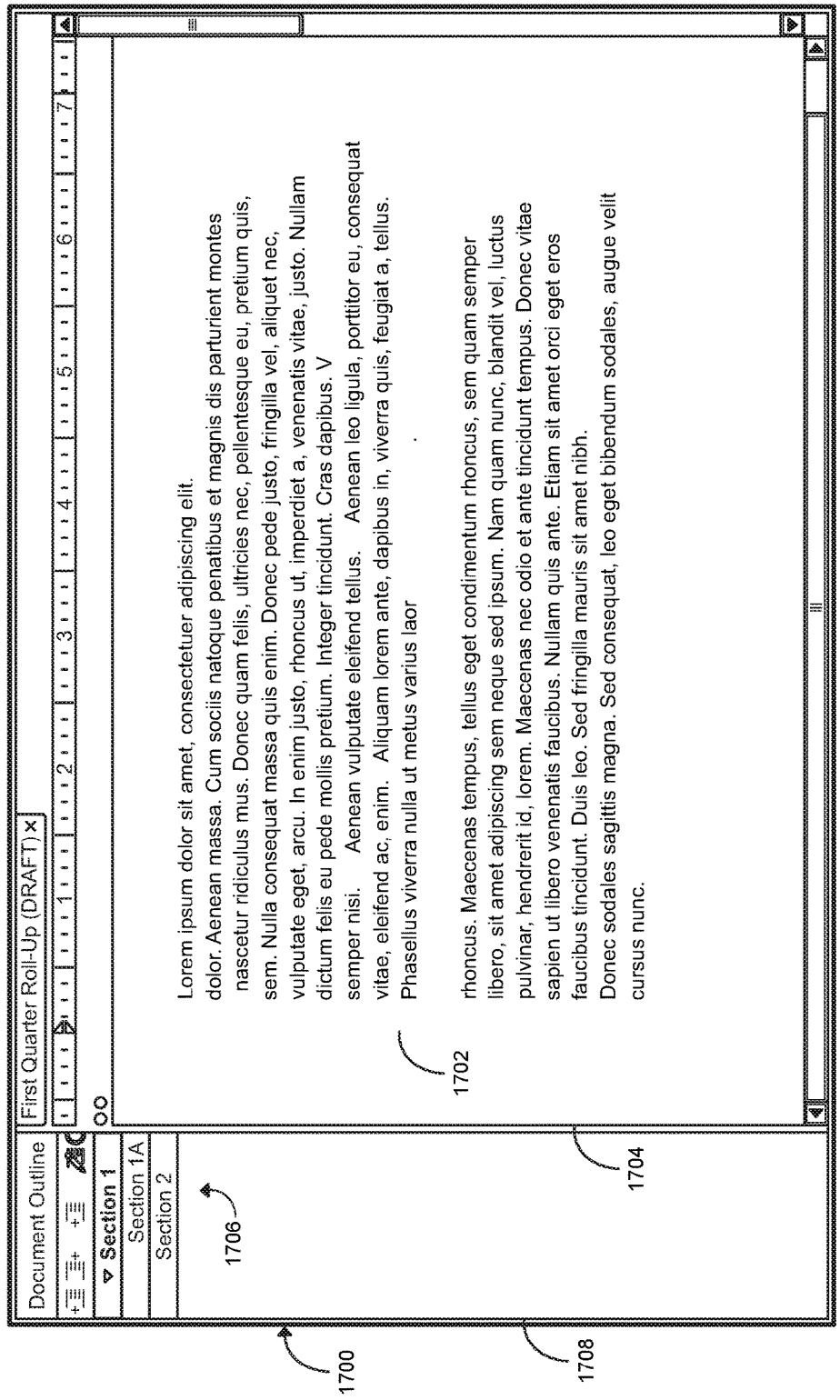

FIG. 17 is an example of a user interface with a document outline that illustrates a use case for the various embodiments.

FIG. 18A shows an example format of a structure node, according to an embodiment.

FIG. 18B shows an example format of a transition node, according to an embodiment.

FIG. 18C shows an example format of a deletion node, according to an embodiment.

FIG. 18D shows an example format of an attribute node according to an embodiment.

Figure 19A:

FIG. 19A shows a root node, along with a representation of the corresponding outline hierarchy, according to an embodiment.

FIG. 19B, FIG. 19C, FIG. 19D, and FIG. 19E show examples of inserting a node, according to various embodiments.

Figure 20A:
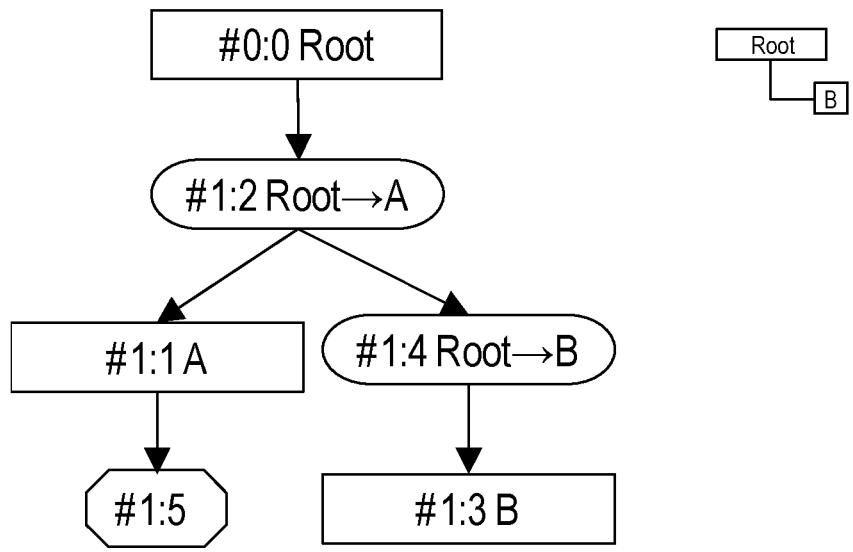
Figure 20B:
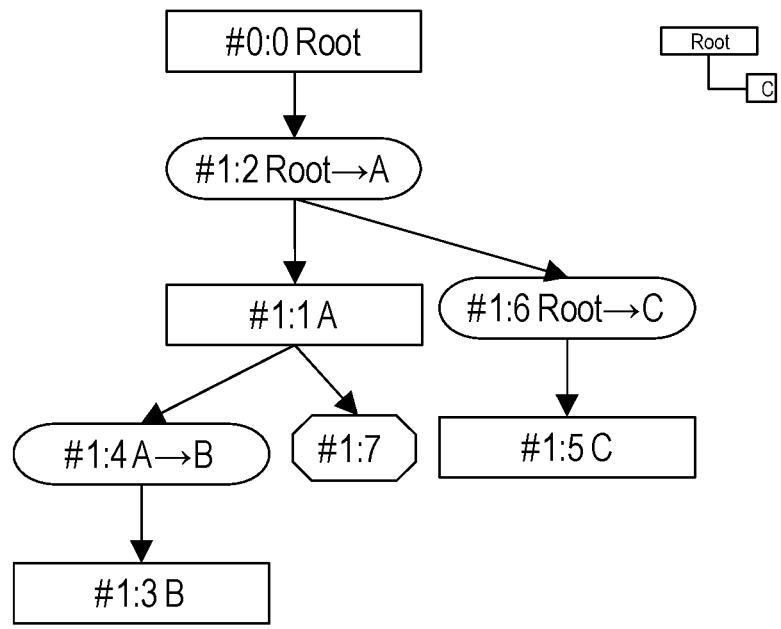

FIG. 20A and FIG. 20B show examples of deleting a node according to various embodiments.

Figure 21A:
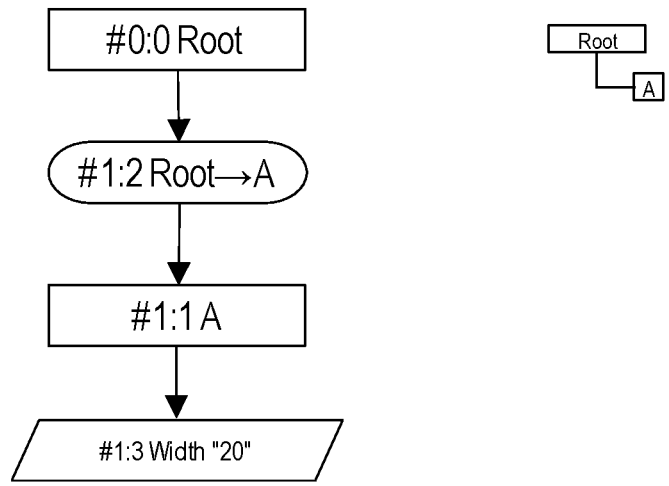
Figure 21B:
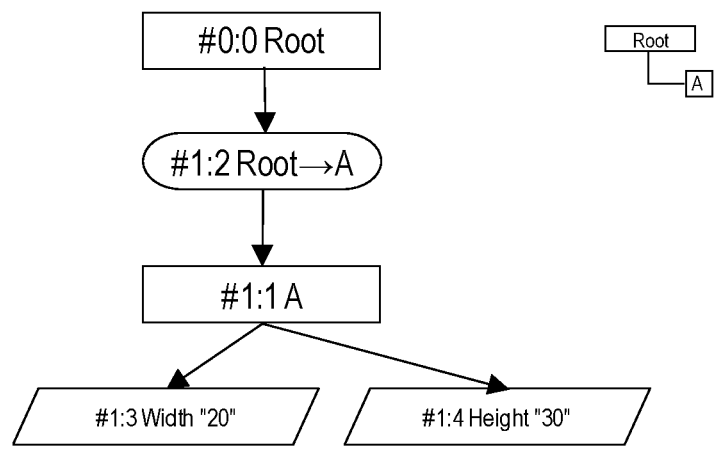
Figure 21C:
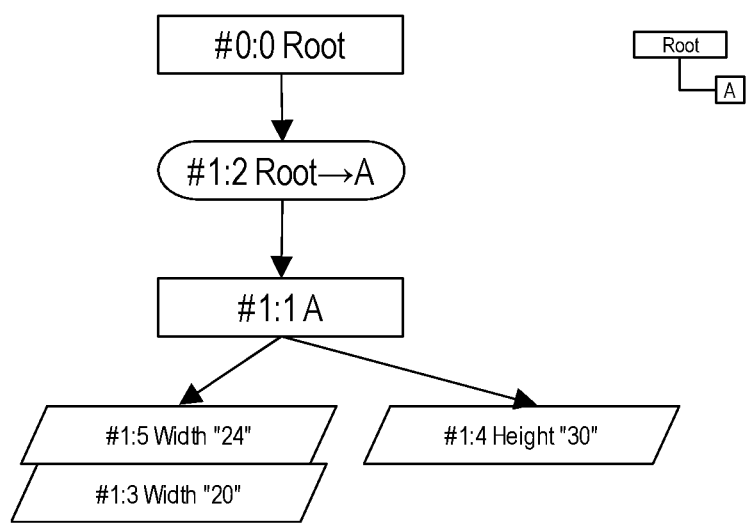

FIG. 21A, FIG. 21B, and FIG. 21C show examples of formatting a node, according to various embodiments.

Figure 22A:
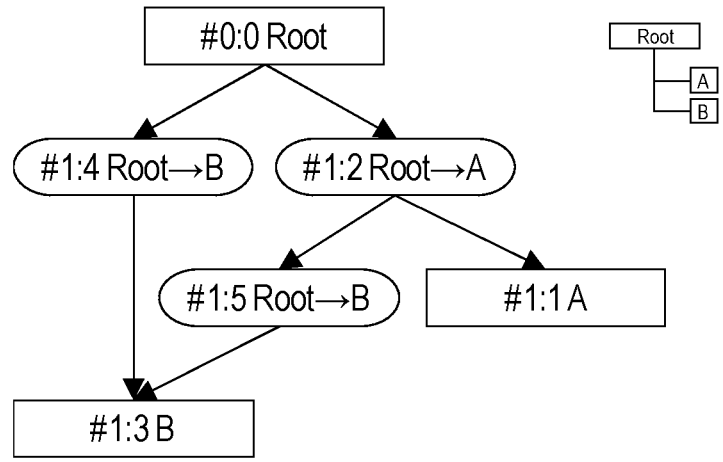
Figure 22B:
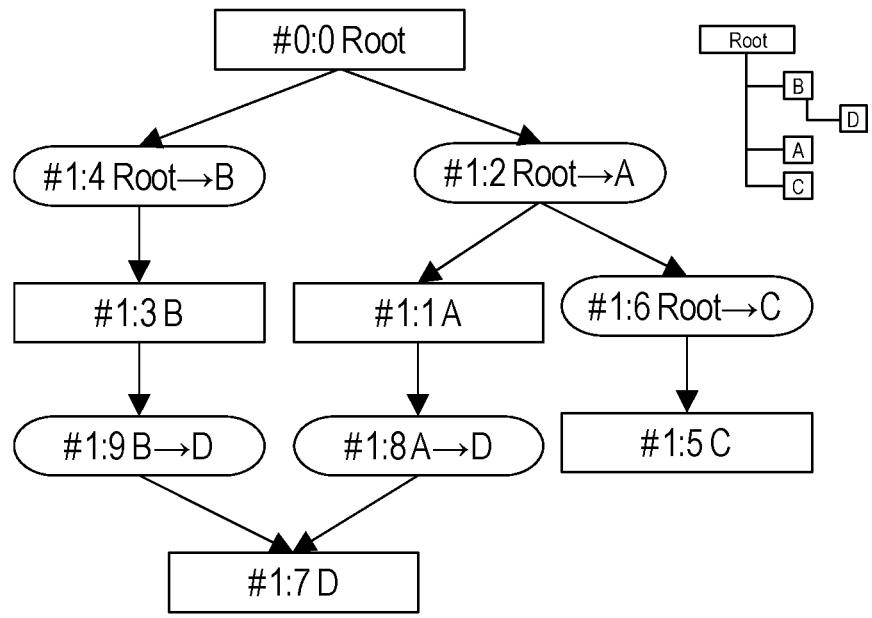

FIG. 22A and FIG. 22B show examples of moving a node according to various embodiments.

FIG. 23A, FIG. 23B, FIG. 23C, FIG. 23D, and FIG. 23E show examples of undoing node-related actions according to various embodiments.

Figures 24A, 24B, 24C:
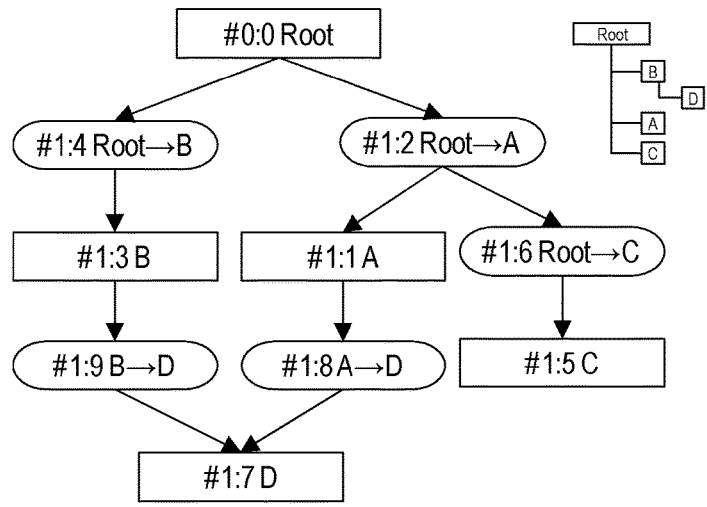

FIG. 24A shows an example of how a computing device outputs an outline using a causal graph, according to an embodiment.

FIG. 24B shows an example of how the computing device creates a flat-tree Node list, according to an embodiment.

FIG. 24C shows an example of how the computing device determines a transition list, according to an embodiment.

Figures 24D, 24E:
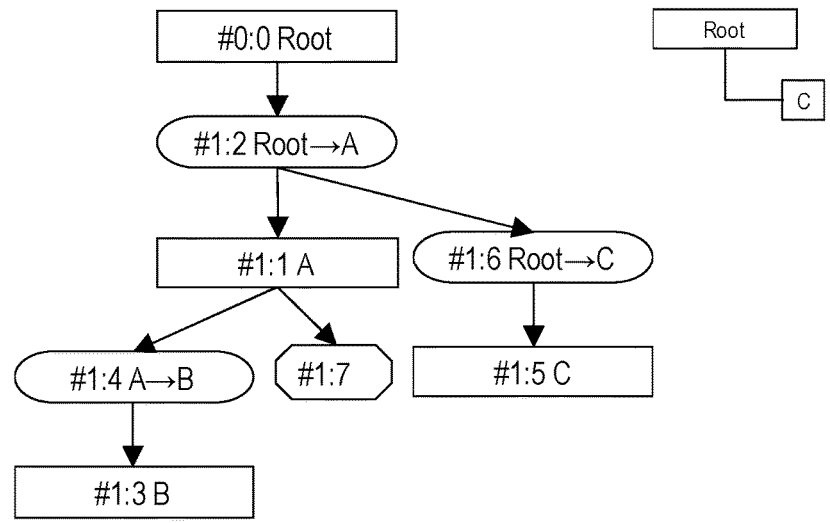

FIG. 24D and FIG. 24E show another example of reading a tree, according to an embodiment.

Figures 24F, 24G:
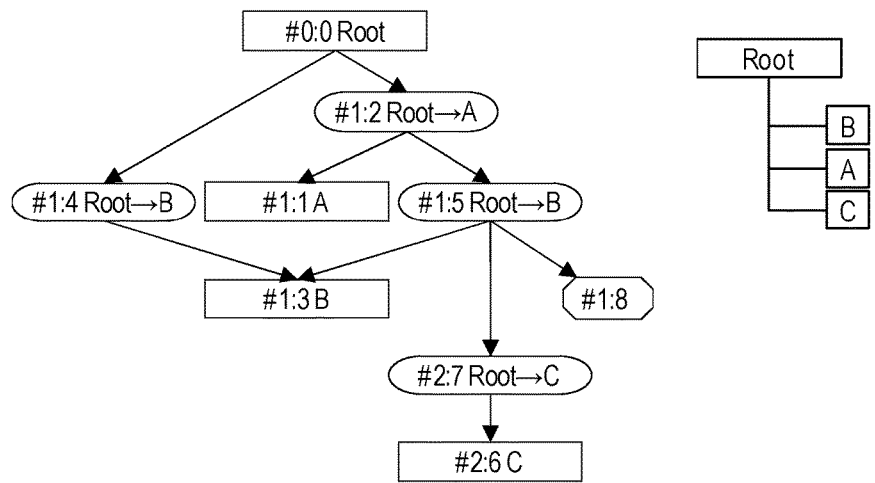

FIG. 24F and FIG. 24G show another example of reading a tree, according to an embodiment.

FIG. 25A, FIG. 25B, FIG. 25C, FIG. 25D, FIG. 25E, and FIG. 25F depict an example of resolving a loop created by two conflicting move commands and the resulting output, according to an embodiment.

FIG. 25G, FIG. 25H, and FIG. 25I, and FIG. 25K depict an example of resolving a loop created by receiving three conflicting move commands and the resulting output, according to an embodiment.

Figures 25A, 25B, 25C:
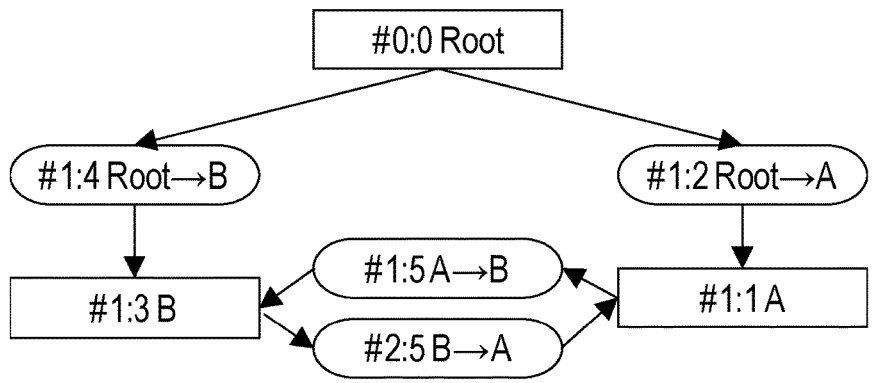
Figures 25D, 25E, 25F:
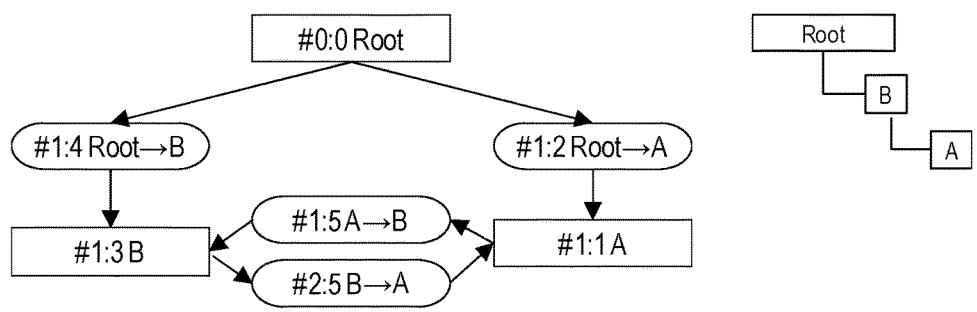
Figures 25G, 25H, 25I:
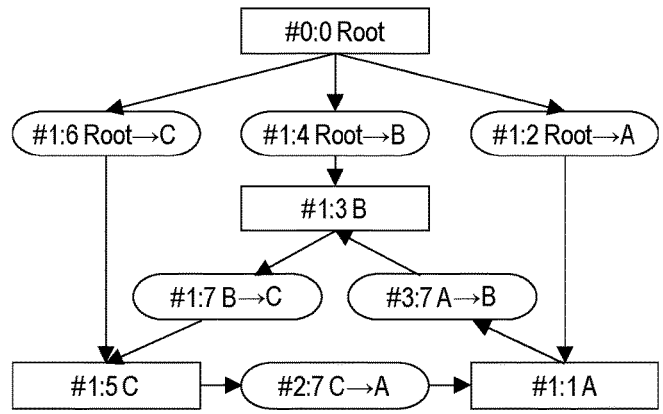
Figure 25K:
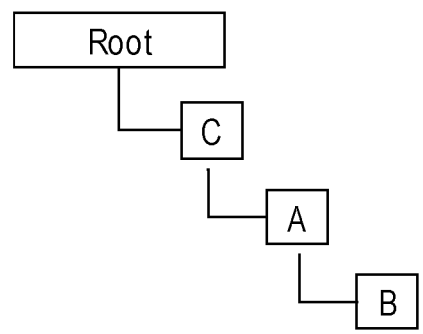
Figures 25L, 25M:
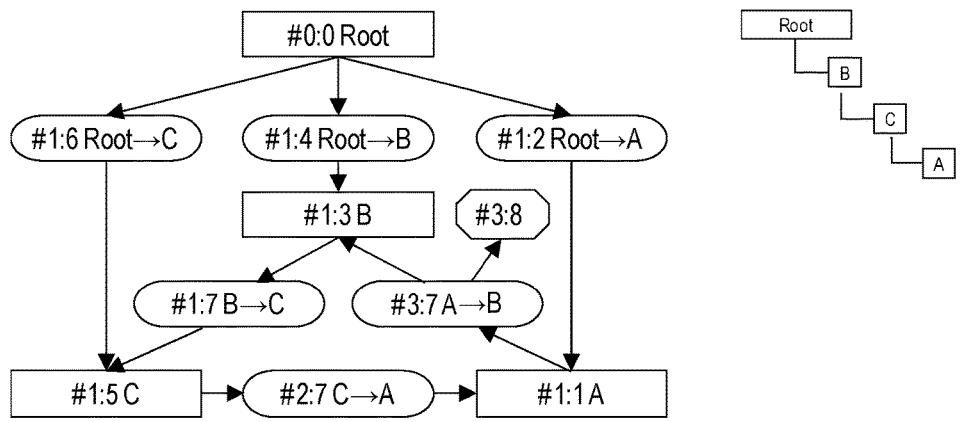

FIG. 25L and FIG. 25M depict an example of what happens if the fourth computing device undoes its move from the previous example.

Figures 25N, 25O:
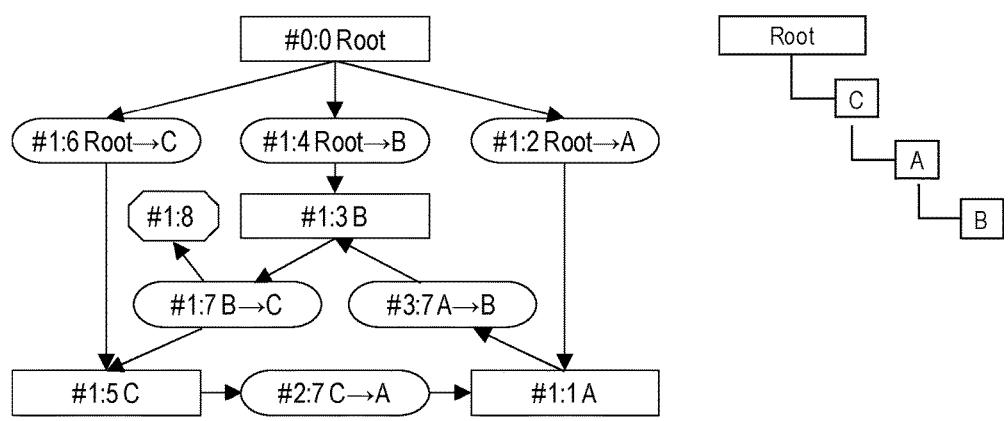

FIG. 25N and FIG. 25O depict an example of what happens if the second computing device undoes its move from the previous example.

Figures 25P, 25Q:
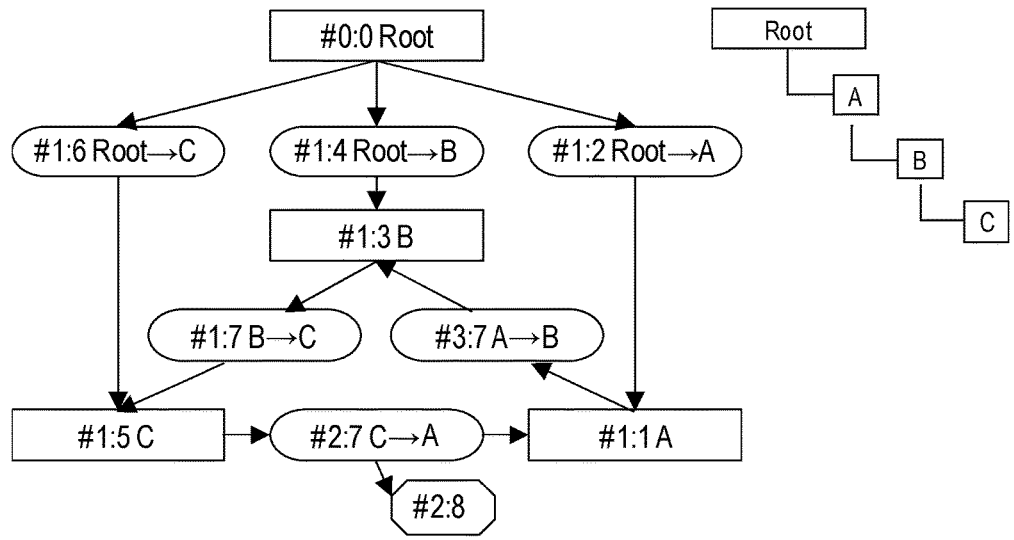

FIG. 25P and FIG. 25Q depict an example of what happens if the third computing device undoes its move from the previous example.

Figure 25R:
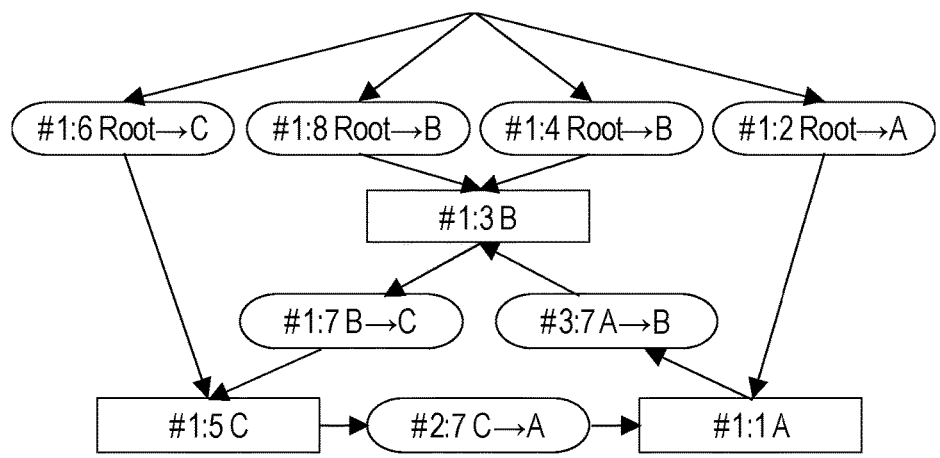
Figure 25S:
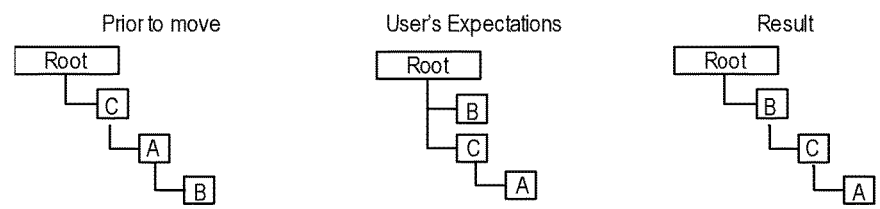

FIG. 25R and FIG. 25S depict an example of a potential problem with a loop resolution procedure, according to an embodiment.

Figure 26:
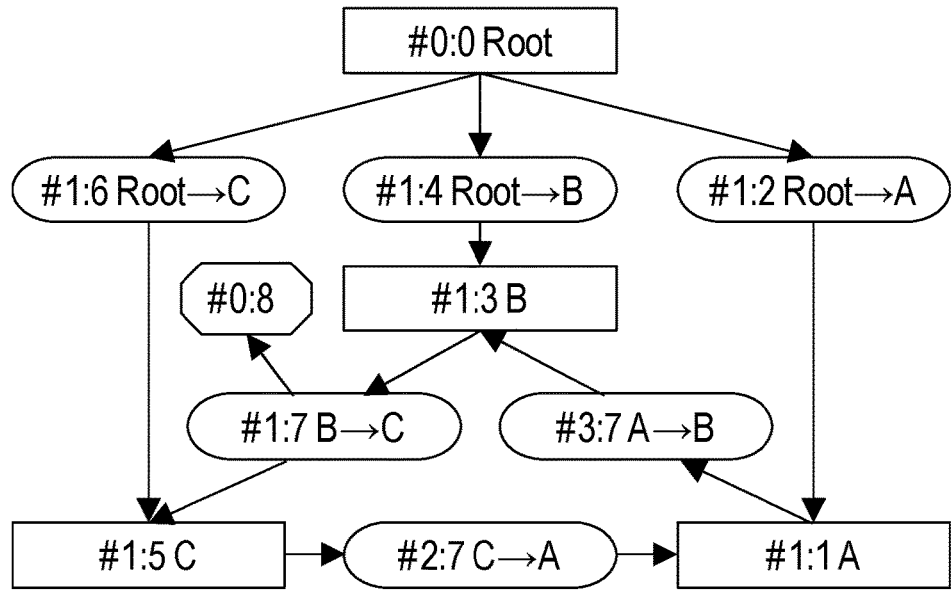

FIG. 26 depicts a series of actions carried out by the first computing device in order to address the potential problems with causal graph management, according to an embodiment.

Figure 27:
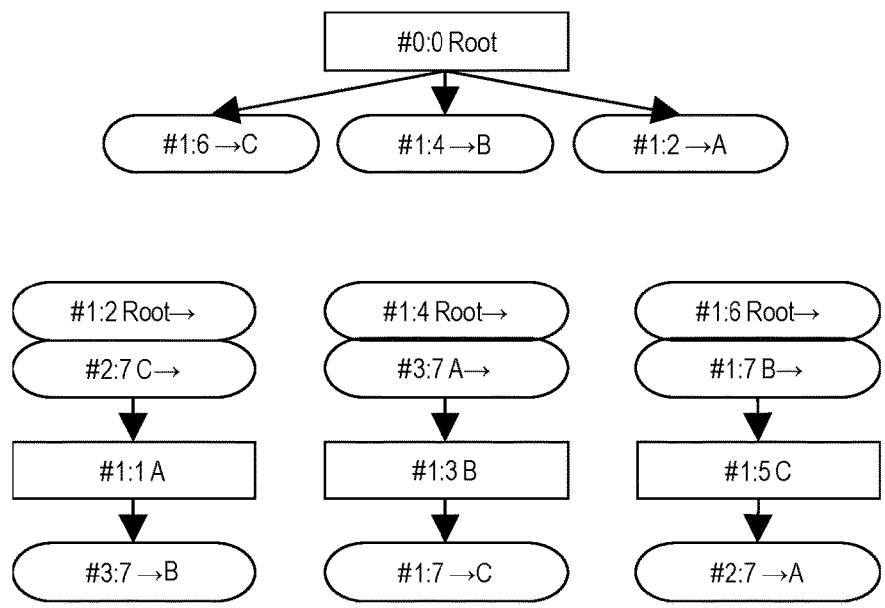

FIG. 27 depicts a method that a computing device carries out to serialize the nodes of a causal graph in an embodiment.

Figure 28:
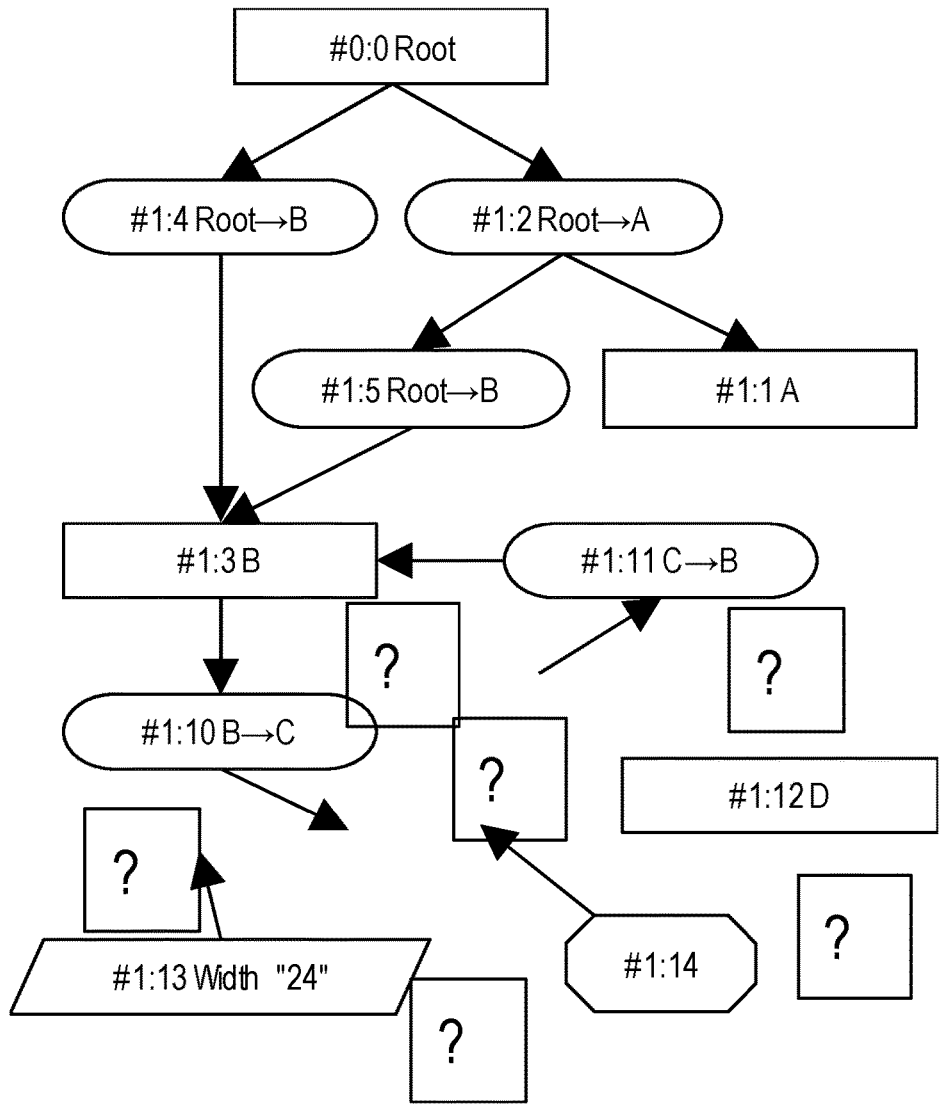

FIG. 28 depicts how a computing device uses proxies to handle orphans that are caused by lost edits or out-of-order edits, according to an embodiment.

Figure 29A:
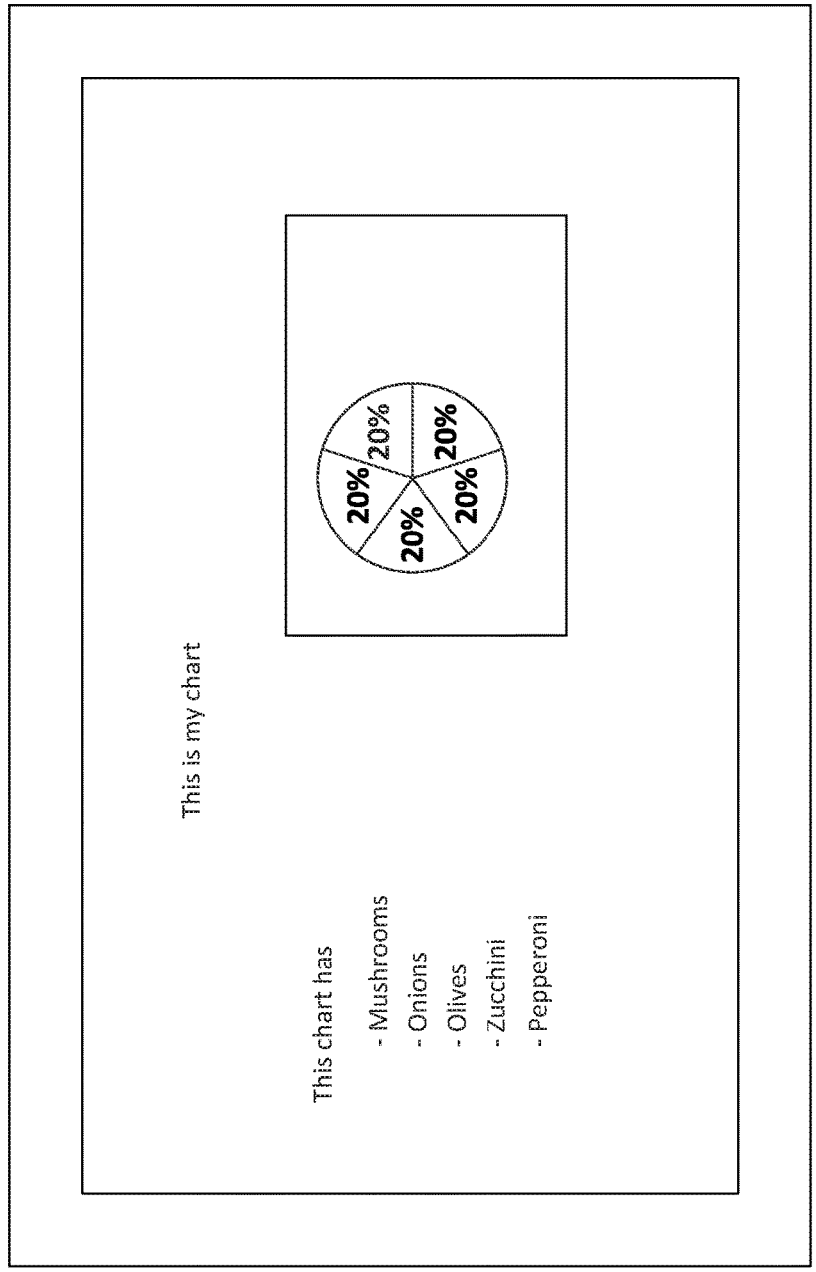
Figure 29B:
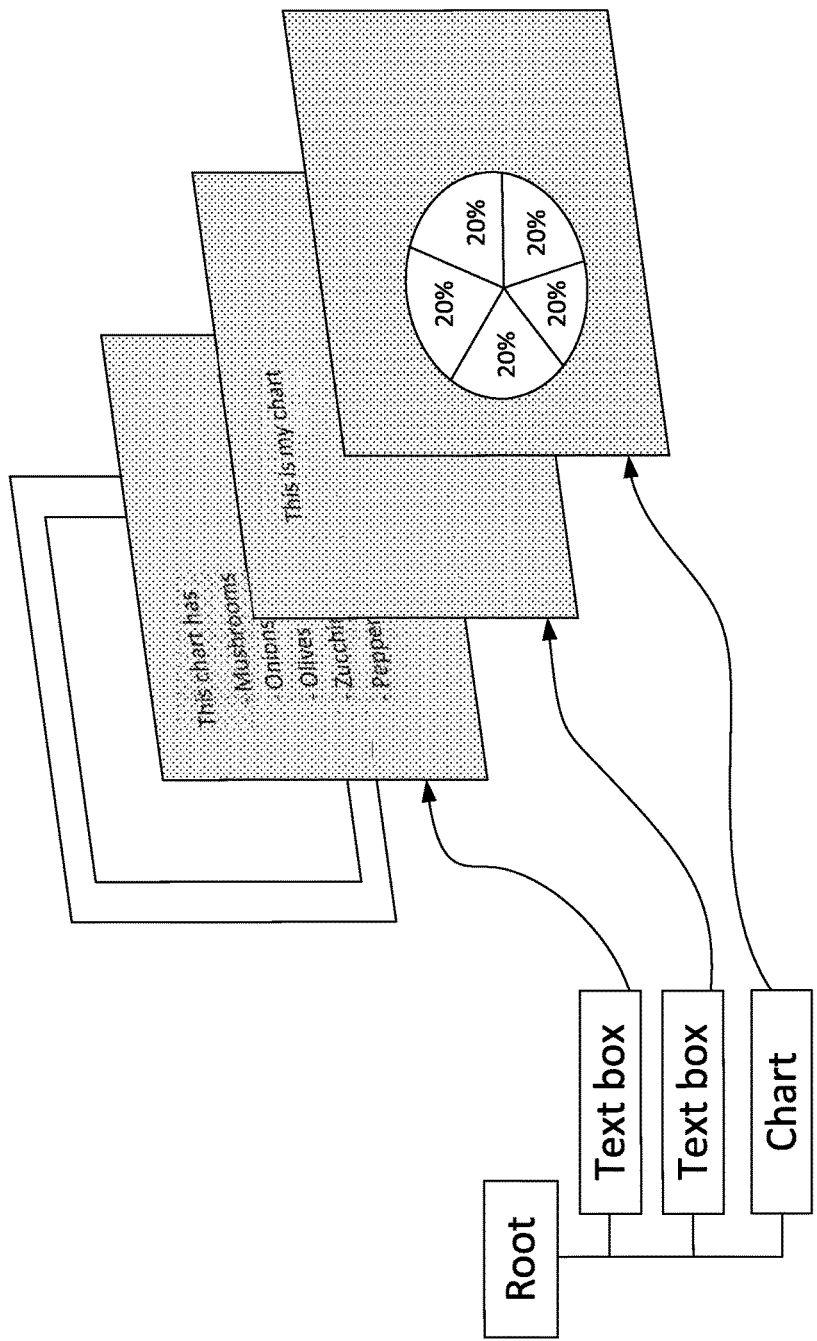

FIG. 29A and FIG. 29B illustrate how the various techniques described herein can be used for depth ordering on presentation slides.

DESCRIPTION

As described herein, various embodiments relate to a system and method for efficiently tracking and storing changes made in documents. In an embodiment, the system and method are used to track and store changes made in editable documents, including but not limited to spreadsheets, content in presentations, graphic components in flow charts and diagrams. The system and method are also used to track and store changes made in a document by multiple users.

A document collaboration system may include a server and various client devices or may simply involve a single device or peer-to-peer devices. The document collaboration system may be implemented in a cloud computing environment. In a client-server architecture, a document collaboration editing application may be installed on the server, the client devices, or both. The document collaboration editing application may also be an application that is accessible through a web browser.

The disclosure is generally to directed to methods and a computing device for maintaining a document outline on a user interface. In various embodiments, a computing device: displays the document outline on the user interface; maintains, in a non-transitory computer-readable medium, a causal graph data structure representing the document outline, wherein the causal graph data structure includes a plurality of structure nodes, each structure node representing a level of the document outline; receives, via the user interface, an insertion of a new level to the document outline; in response to the insertion, defines a structure node that represents the inserted level; inserts a transition node in the causal graph data structure, wherein the transition node represents a relationship between the structure node and at least one other node of the causal graph data structure; inserts the structure node into the causal graph data structure as a child of the transition node; and updating the user interface to display the inserted level within the document outline.

The transition node may be inserted as a child of another transition node, which is, itself, a child of the structure node. Alternatively, the transition node may be inserted as a child of the structure node.

The inserted structure node may include things such as text to be displayed as a title for the inserted level, identifiers of any parent nodes, and identifiers of child nodes.

According to an embodiment, the computing device: receives, via the user interface, a deletion of a level of the plurality of levels; in response to the deletion, inserts, in the causal graph data structure, a deletion node as a child of the structure node representing the level for which the deletion was received, wherein the deletion node refers to the level that is to be deleted; and updates the user interface to remove the level for which the deletion was received.

In an embodiment, the computing device: receives, via the user interface, a formatting of a level of the plurality of levels; in response to the formatting, inserts an attribute node as a child of a structure node representing the level for which the formatting was received, wherein the attribute node indicates the type of formatting that is to be applied; apples the formatting to a section of the document within the level being formatted; and updates the user interface to display the updated formatting of the section.

According to an embodiment, the computing device: receives, via the user interface, an input of an undo instruction; in response to the undo instruction, inserts, in the causal graph data structure, a deletion node as a child of the structure node; and updates the user interface to remove the level represented by the structure node.

In various embodiments, the actions carried out by the computing device with respect to the outline as herein described can also be carried out in the context of z-depth levels on a presentation (e.g., on a slide of a presentation) being displayed (e.g., by presentation software).

Figure 1A:
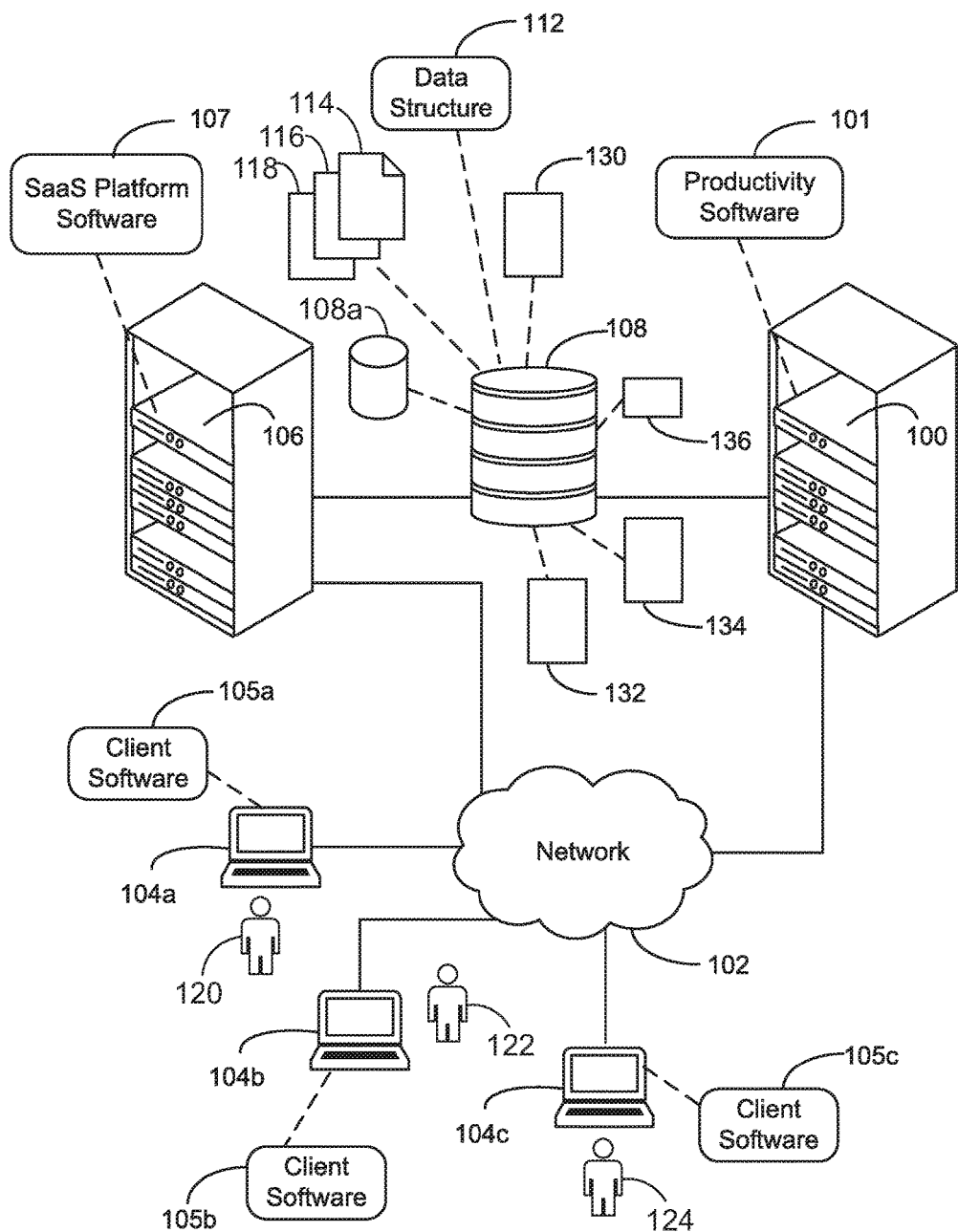
FIG. 1A is an example of a networking environment in which various embodiments of the disclosure may be employed.

Various embodiments of the disclosure are implemented in a computer networking environment. Turning to FIG. 1A, an example of such an environment is shown. A first computing device 100 is communicatively linked to a network 102. Possible implementations of the network 102 include a local-area network, a wide-area network, a private network, a public network (e.g., the Internet), or any combination of these. The network 102 may include both wired and wireless components. Also communicatively linked to the network 102 are a second computing device 104a, a third computing device 104b, a fourth computing device 104c, and a fifth computing device 106. The fifth computing device 106 is communicatively linked to a media storage device 108 (e.g., a redundant array of independent disks). For the sake of example, it is assumed that a first user 120 operates the second computing device 104a, a second user 122 operates the third computing device 104b, and a third user 124 operates the fourth computing device 104c. Each of the computing devices 104a, 104b, and 104c executes client software (reference numerals 105a, 105b, and 105c, respectively). One possible implementation of the client software is a web browser.

Residing within the media storage device 108 is a database 108a containing multiple documents, three of which are depicted in FIG. 1A: a first document 114, a second document 116, and a third document 118. The first computing device 100 and the fifth computing device 106 are depicted as rack-mounted servers, while the second, third, and fourth computing devices 104a, 104b, and 104c are depicted as a notebook computers. However, the computing devices depicted in FIG. 1A are merely representative. Other possible implementations of a computing device include a desktop computer, a tablet computing, and a smartphone. Furthermore, although the first, second, and third documents 114, 116, and 118 are depicted as being stored in a single device, they may, in fact, be stored on multiple storage devices (e.g., sharded into multiple physical chunks) of a cloud storage service. Finally, there may be more than or fewer than the first, second, and third documents 114, 116, and 118 residing on the media storage device 108.

For convenient reference, the first computing device 100 will also be referred to as a "productivity server 100" and the fifth computing device 106 will be also be referred to as a "database server 106." Although depicted in FIG. 1A as separate devices, in some embodiments, the functionality of the productivity server 100 and the database server 106 are on the same device. The productivity server 100 executes productivity software 101 to provide document collaboration services. The database server 106 executes Software-as-a-Service ("SaaS") platform software 107 to provide database services to the productivity software 101, such as maintaining the contents of the database 108a and providing a programming platform for various processes launched by the productivity software (e.g., to manipulate, store, and retrieve documents and other information from the database 108a). Under the control of the productivity software 101, the productivity server 100 interacts with the database server 106 (which operates under the control of the SaaS platform software 107) and the computing devices 104a, 104b, and 104c to allow the computing devices to access the first document 114, the second document 116, and the third document 118 so that the first user 120, the second user 122, and the third user 124 can collaborate in editing the documents (e.g., moving sections around in a particular document).

In an embodiment, documents maintained on the media storage device 108 may be organized into sections, with each section (e.g., the contents of the section) being maintained in its own separate data structure referred to as a "section entity." For example, the first document 114 in FIG. 1A has a first section represented by a first section entity 130, a second section represented by a second section entity 132, and a third section represented by a third section entity 134. The productivity software 101 uses an outline entity 136 (also stored on the media storage device) to determine how the sections are organized. As will be described below, the outline entity 136 may be implemented as a causal graph.

Figure 1B:
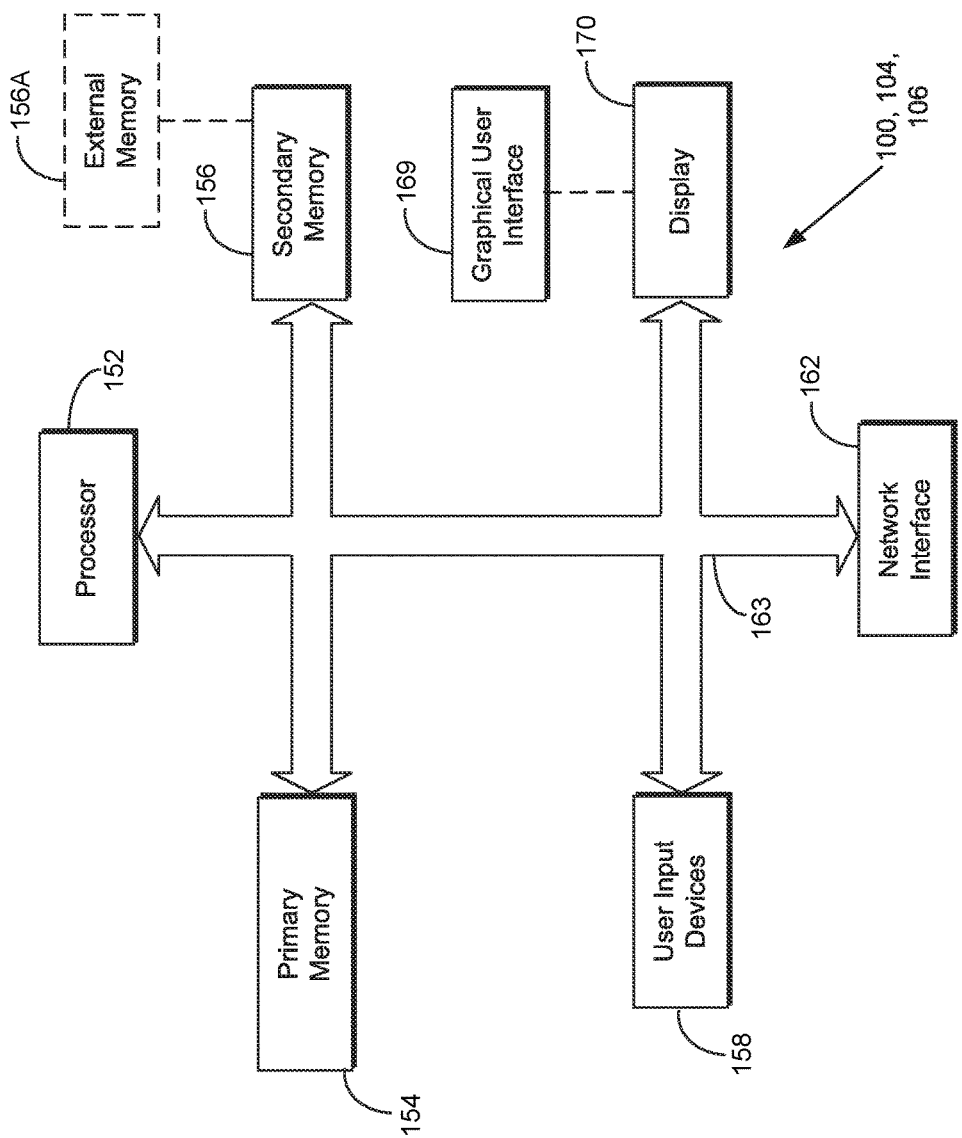
FIG. 1B is a block diagram of a computing device according to an embodiment.

According to an embodiment, one or more of the computing devices of FIG. 1A (including the media storage device 108) have the general architecture shown in FIG. 1B. The device depicted in FIG. 1B includes a processor 152 (e.g., a microprocessor, controller, or application-specific integrated circuit), a primary memory 154 (e.g., volatile memory, random-access memory), a secondary memory 156 (e.g., non-volatile memory), user input devices 158 (e.g., a keyboard, mouse, or touchscreen), a display 160 (e.g., an organic, light-emitting diode display), and a network interface 162 (which may be wired or wireless). The memories 154 and 156 store instructions and data. The processor 152 executes the instructions and uses the data to carry out various procedures including, in some embodiments, the methods described herein.

Each of the elements of FIG. 1B is communicatively linked to one or more other elements via one or more data pathways 163. Possible implementations of the data pathways 163 include wires, conductive pathways on a microchip, and wireless connections. In an embodiment, the processor 152 is one of multiple processors in the computing device, each of which is capable of executing a separate thread. In an embodiment, the processor 152 communicates with other processors external to the computing device in order to initiate the execution of different threads on those other processors.

The term "local memory" as used herein refers to one or both the memories 154 and 156 (i.e., memory accessible by the processor 152 within the computing device). In some embodiments, the secondary memory 156 is implemented as, or supplemented by an external memory 156A. The media storage device 108 is a possible implementation of the external memory 156A. The processor 152 executes the instructions and uses the data to carry out various procedures including, in some embodiments, the methods described herein, including displaying a graphical user interface 169. The graphical user interface 169 is, according to one embodiment, software that the processor 152 executes to display a report on the display device 160, and which permits a user to make inputs into the report via the user input devices 168.

The computing devices of FIG. 1A (i.e., the processor 152 of each of the computing devices) are able to communicate with other devices of FIG. 1A via the network interface 162 over the network 152. In an embodiment, this communication takes place via a user interface that the productivity server 150 provides to the computing devices 154a, 154b, and 154c. The specific nature of the user interface and what the user interface shows at any given time may vary depending what the user has chosen to view. Also, multiple users may interact with different instances of the user interface on different devices. In some embodiments, the productivity server 150 carries out calculations to determine how content is to be rendered on a computing device, generates rendering instructions based on those calculations, and transmits those rendering instructions to the computing device. Using the received instructions, the computing device renders the content on a display. In other embodiments, the productivity server 150 transmits instructions regarding an asset to a computing device. In carrying out the received instructions, the computing device performs the appropriate calculations locally to render the content of the asset on a display.

Causal tree structures are useful representations of how content and metadata associated with the content are organized. For example, a document may be represented by a single causal tree structure or a bounded set of causal tree structures. The causal tree structure is useful in efficiently tracking and storing changes made in the document. A typical causal tree structure includes nodes of the editing instructions in the document, and each editing instruction has a unique identifier or ID. The editing instructions include, for example, text characters, insertion of text characters, deletion of text characters, formatting instructions, copy and paste, cut and paste, etc. In other words, a causal tree structure is a representation of all the instructions (regardless of type) that compose a document. The causal tree structure starts with a root node, from which all other instruction nodes branch. Except for the root node, each editing instruction in the document is caused by whichever editing instruction that came before it. Every editing instruction is aware of the ID of its parent instruction, i.e., the instruction that "caused" it. In an embodiment, each instruction (other than the root node) in the document may be represented as a 3-tuple: ID (ID of the instruction), CauseID (ID of the parent instruction), and Value (value of the instruction). Example causal tree structures are shown in FIG. 2A and FIG. 2B.

Figure 2A:
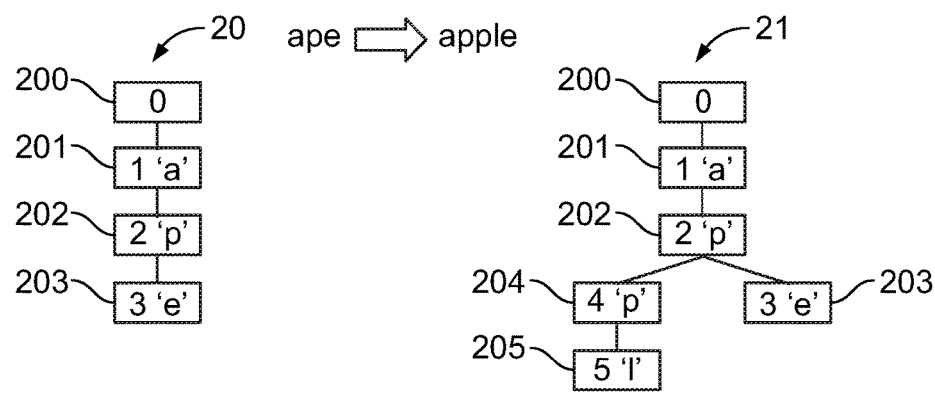
FIG. 2A is a diagram illustrating insertion of text in a causal tree structure.
Figure 2B:
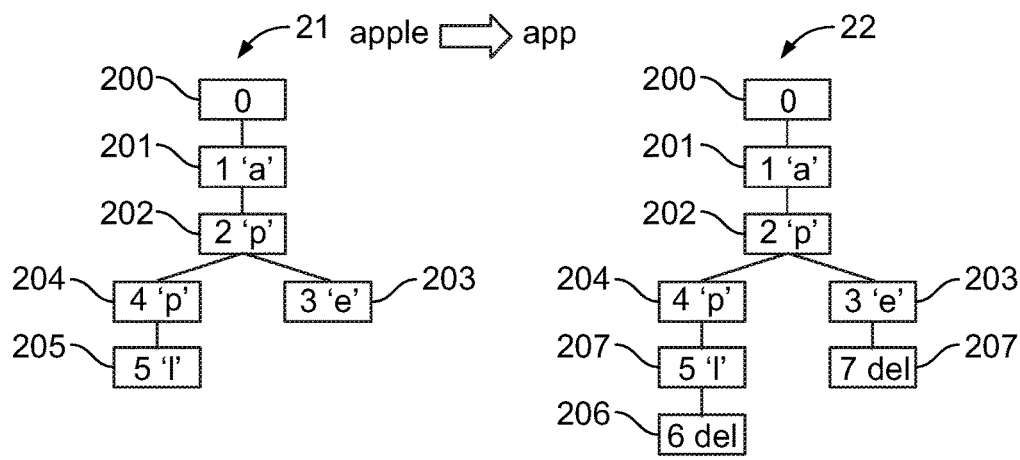
FIG. 2B is a diagram illustrating deletion of text in a causal tree structure.

FIG. 2A is a diagram illustrating insertion of text in a causal tree structure. A causal tree 20 for the text "ape" is shown. The first node in the causal tree 20 is the root node 200, assigned an ID of "0". Following the root node 200 is the character "a", which resides in a first node 201 having an ID of "1", a CauseID of "0", and a Value of "a". Following the character "a", character "p" is located in a second node 202 having has an ID of "2", a CauseID of "1", and a Value of "p". Finally, character "e" follows the character "p" and resides in a third node 203, which has an ID of "3", a CauseID of "2", and a Value of "e". Together, root node 200 to the third node 203 forms one branch of the causal tree 20.

When a user changes the text "ape" to "apple" by inserting new characters "p" and "l" between the existing characters "p" and "e" in the causal tree 20, these insertions result in causal tree 21. The causal tree 21 is a modified version of the causal tree 20 and tracks the character insertion instructions as additional nodes of the tree. In the causal tree 21, the instruction to insert a new character "p" is added as the fourth node 204 and is assigned the next available ID, i.e., "4". The instruction to insert new character "p" also has a CauseID of "3" since its parent instruction is the existing "p" in the text "ape". The instruction to insert a new character "l" follows the instruction to insert the new character "p", and the instruction to insert the new character "l" is shown in a fifth node 205. The instruction to insert the new character "l" has an ID of "5", a CauseID of "4", and a value of "l".

As shown in FIG. 2A, two branches are formed or caused by the second node 202 (the first "p"). The first branch includes the third node 203, which is the character "e" from the text "ape". The second branch includes the fourth node 204 (the second "p") and the fifth node 205 (the character "l"). In an embodiment, the ordering of branches in a causal tree is significant because incorrectly sequenced branches result in unwanted results. For example, an incorrectly sequenced branch from the second node 202 in causal tree 21 would result in "apepl" rather than "apple".

In an embodiment, sequence of the instructions in a causal tree is determined by the ID of the instructions; the higher the value of the ID the later the node came into existence, since the ID for a node is based on the next available sequential ID in the document. For example, in causal tree 21 the fourth node 204 has the ID of "4" and thus was created after the third node 203 which has the ID of "3". Nodes or branches sharing the same CauseID are ordered from highest value ID to lowest value ID. For example, in causal tree 21, the fourth node 204 and the third node 203 share the same parent node (the second node 202) and the same CauseID of "2". Because the ID ("4") of the fourth node 204 is higher than the ID ("3") of the third node 203, the fourth node 204 begins the first branch following the second node 202, and the third node 203 begins the second branch following the second node 202. In yet another embodiment, sequence of the branches is determined by a time stamp, where the nodes sharing the same CauseID are ordered from newest node (i.e., created later in time) to oldest node (i.e., created earlier in time).

FIG. 2B illustrates deletion of text from a causal tree structure. When a user deletes a character from existing text, the character is not removed from the causal tree structure, but only marked as deleted. In other words, the causal tree tracks the instructions to delete using additional nodes. For example, the user changes the text "apple" to "app" by deleting the characters "l" and "e", corresponding to the fifth node 205 and the third node 203, from the causal tree 21. The deletion of the character results in the modified causal tree 22. In the causal tree 22, a "del" instruction (i.e., delete instruction) is created after the characters "l" (fifth node 205) and "e" (third node 203). The "del" instruction in the sixth node 206 is caused by the character "l" and is assigned the next available ID, which is "6". Because the "del" instruction in the sixth node 206 is caused by the character "l", it has a CauseID of "5" corresponding to the ID of the character "l". The "del" instruction in the seventh node 207 is caused by the character "e" and has an ID of "7". The "del" instruction in the seventh node 207 has a CauseID of "3", which corresponds to the ID of the character "e". The Value of the "del" instruction is "del", which represents deletion.

Using a causal tree structure, every editing instruction in a document is immutable (including deletions), which ensures convergence of the changes at all user sites. As long as sufficient time is allowed for all editing instructions to arrive at all user sites, every user device will be able to construct the same causal tree and the users will be able to view and edit the same revision of document. In an embodiment, the value of the editing instruction may be mutable, however, the ID (e.g., ID of the node containing the editing instruction) is not mutable.

Storing the 3-tuple of every editing instruction in a document, however, requires a lot of memory and network transmission time. To reduce the amount of storage space and network transmission time needed, causal trees are compressed, where tree nodes form long chains with incrementing IDs. Not every ID is stored; only the first ID in each chain is stored. The CauseID may be similarly compressed.

Figure 3:
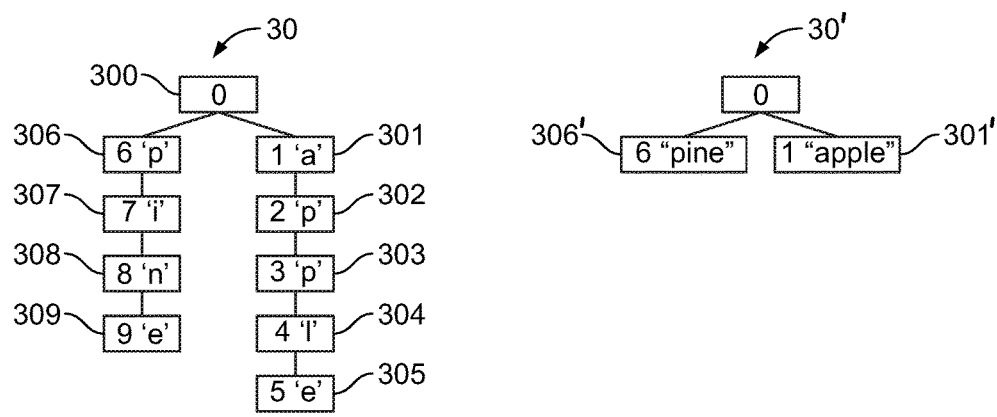
FIG. 3 is a diagram illustrating a compression algorithm for insertion of text in a causal tree structure, according to an embodiment.

FIG. 3 is a diagram illustrating a compression algorithm for insertion of text in a causal tree, according to an embodiment. In an example, a user inserts "pine" before "apple" to create the text "pineapple". The insertion of text generates an uncompressed causal tree 30, in which four additional characters with IDs of "6", "7", "8", and "9" are generated. In more detail, the causal tree 300 includes a root node 300, which causes two branches. The first branch includes nodes 301, 302, 303, 304, and 305, which respectively correspond to the IDs of "1" to "5" forming the text "apple". The second branch includes nodes 306, 307, 308, and 309, which respectively correspond to the IDs of "6" to "9" forming the text "pine".

A compression algorithm is applied to uncompressed causal tree 30 resulting in compressed causal tree 30'. In compressed tree 30', node 301 to 305 with IDs of "1" to "5" are grouped or chained together to form a chain node 301' for the text "apple". Nodes 306 to 309 with IDs of "6" to "9" are grouped or chained together to form another chain node 306' for the text "pine". In an embodiment, in the compressed causal tree 30', only the ID of the first node in a chain node is stored. In FIG. 3, for chain node 301', only the ID of the first character "a" is stored; for chain node 306', only the ID of the first character "p" is stored. Consequently, in the compressed causal tree 30', instead of storing IDs "1" to "9" as in uncompressed causal tree 30, the only IDs stored are "1" and "6".

Figure 4:
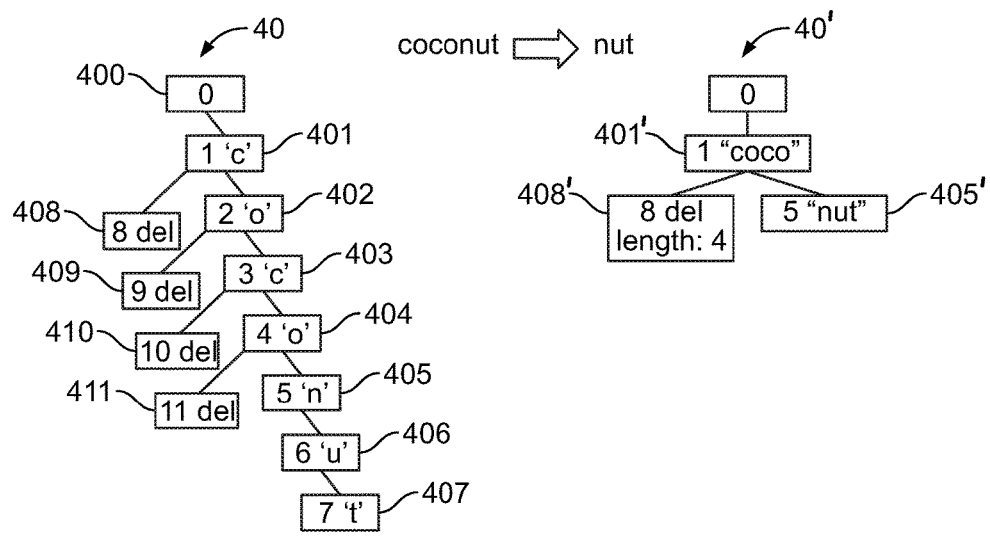
FIG. 4 is a diagram illustrating a compression algorithm for deletion of text in a causal tree structure, according to an embodiment.

FIG. 4 is a diagram illustrating a compression algorithm for deletion of text in a causal tree structure, according to an embodiment. In an example, a user deletes "coco" from "coconut" to create the text "nut". Uncompressed causal tree 40 includes a root node 400 and nodes 401 to 411. Nodes 401 to 407 respectively correspond to the characters in the text "coconut", which has IDs of "1" to "7". Since "coco" is deleted from "coconut", a "del" instruction is added after each character of "coco", resulting in four deletion instructions "del" having IDs of "8", "9", "10", and "11". The four deletion instructions "del" reside in nodes 408 to 411.

A compression algorithm is applied to uncompressed causal tree 40 resulting in compressed causal tree 40'. The compressed causal tree 40' includes the root node 400. Following the root node 400 is a chain node 401' for the text "coco". The chain node 401' has an ID of "1" (the ID of the first character "c") and a CauseID of "0" (the ID of the root node 400). The chain node 401' in turn causes two chain nodes 405' and 408'. The chain node 405' has an ID of "5", a CauseID of "1", and a Value of "nut". The chain node 408' has an ID of "8", a Cause ID of "1", and a Value of "del" representing the deletion instruction. In an embodiment, the chain node 408' includes a length field ("4"), because the chain node 408' contains four deletion instructions "del". Instead of removing the text "coco" from the tree, the chain node 408' modifies the character chain node 401' so that the system tracks the edit that deleted "coco" from "coconut".

In compressed causal tree 40', only three IDs are stored following the root node 400. ID "1" is stored and corresponds to "coco" in chain node 401'. ID "5" is stored and corresponds to "nut" in chain node 405'. ID "8" is stored and correspond to the four deletion instructions "del" in chain node 408'. The chain nodes 405' and 408' share the same CauseID of "1", because "coco" of chain node 401' is the parent of both chain nodes 405' and 408'.

Figure 5A:
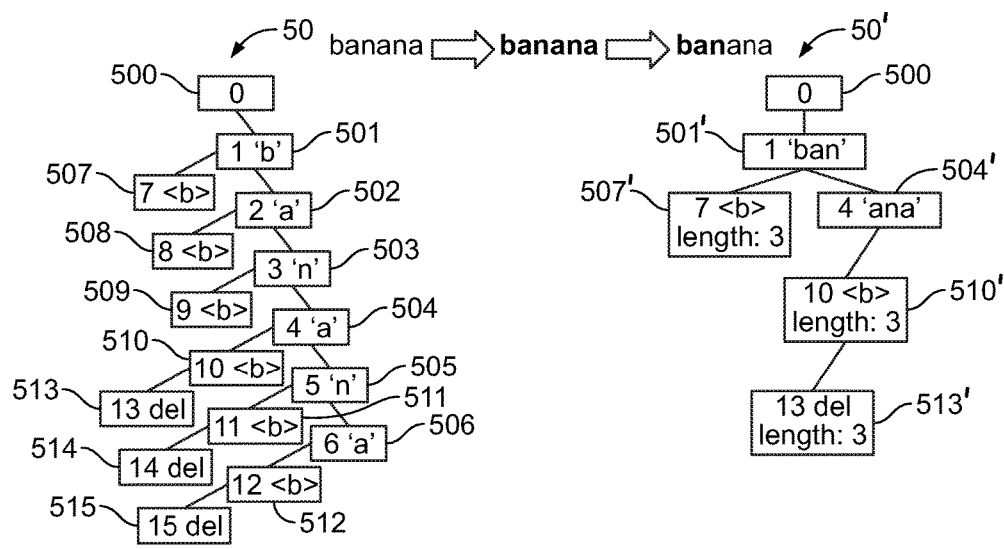
FIG. 5A is a diagram illustrating a compression algorithm for formatting changes in a causal tree structure, according to an embodiment.

Not only can the causal tree structure be used to track and store insertion and deletion of text, it can also be utilized to track and store formatting changes and other metadata changes. FIG. 5A is a diagram illustrating a compression algorithm for tracking and storing formatting changes in a causal tree structure, according to an embodiment. A user first bolds the text "banana" and then enters an instruction to delete the bolding of the characters "ana". As a result, the "ban" portion of the text "banana" is displayed in bold while the "ana" portion of the text "banana" is displayed not in bold.

Uncompressed causal tree 50 includes a root node 500 and nodes 501 to 515. Nodes 501 to 506 respectively correspond to the characters in the text "banana", which has IDs of "1" to "6". When the text "banana" is bolded, a bold instruction "<b>" is generated for each character node in the text "banana". In uncompressed causal tree 50, the bold instructions "<b>" span nodes 507 to 512 and have IDs "7" to "12". Each of the bold instructions "<b>" at character nodes 507 to 512 is caused by a character in the text "banana". For example, the bold instruction "<b>" at node 507 is caused by the character "b" at node 501. The bold instruction "<b>" at node 507 thus has a CauseID of "1". Likewise, the bold instruction "<b>" at node 512 is caused by the last "a" at node 506. The bold instruction "<b>" at node 512 thus has a CauseID of "6".

When the user enters an instruction to delete the bolding of the "ana" portion of the text "banana", three deletion instructions "del" are generated and added to the uncompressed causal tree 50. The deletion instructions "del" have IDs of "13", "14", and "15" and are caused by nodes 510, 511, and 512, respectively, and thus have respective CauseIDs of "10", "11", and "12". A deletion instruction does not remove the characters or instructions from the causal tree; instead, the deletion instruction simply instructs for the deletion or undoing of its respective parent node. In this example, the bold instructions "<b>" at nodes 510, 511, and 512 remain pointing to their respective parent nodes, i.e., nodes 504, 505, and 506, even though the bold instructions "<b>" at nodes 510, 511, and 512 are marked as deleted by the delete instructions "del" at nodes 513, 514, and 515.

When uncompressed causal tree 50 is compressed, the result is the compressed causal tree 50'. The compressed causal tree 50' includes the root node 500. Following the root node 500 is a chain node 501' for the text "ban". The chain node 501' has an ID of "1" (the ID of the first character "b") and a CauseID of "0" (the ID of the root node 500). The chain node 501' in turn causes two chain nodes 504' and 507'. The chain node 507' is a formatting chain node and has an ID of "7", a CauseID of "1", and a Value of "<b>" representing a bold instruction. In an embodiment, a length field is included in formatting chain node 507' to indicate that the chain is "3" characters long, i.e., there are three bold instructions "<b>" in the formatting chain node 507'. In other embodiments, however, the length field is omitted from the formatting chain node 507'. The three bold instructions "<b>" in formatting chain node 507' are caused by the text "ban" in chain node 501', and the bold instructions "<b>" modify the text "ban" to create the bolded word "ban".

The chain node 501' also causes the chain node 504', which has an ID of "4", a CauseID of "1", and a Value of "ana". The chain node 504' in turn causes another formatting chain node 510', which has an ID of "10", a CauseID of "4", and a Value of "<b>" representing a bold instruction. A length field in formatting chain node 510' indicates that the chain is "3" characters long, i.e., there are three bold instructions "<b>" in the formatting chain node 510'. The bold instructions "<b>" in the formatting chain node 510' modify the text "ana" in the chain node 504'.

When the user enters the instruction to delete the bolding of the characters "ana", the formatting chain node 510' causes a chain node 513'. The chain node 513' includes deletion instructions "del" and has an ID of "13", a CauseID of "10", and a Value of "del" representing a delete instruction. A length field in the chain node 513' indicates that the chain is "3" characters long, i.e., there are three deletion instructions "del" in the chain node. The deletion instructions in the chain node 513' modify the formatting chain node 510', i.e., which deletes the bold instructions contained in chain node 510'.

The user experience to unbold the text "ana" may be represented in another syntax, in another embodiment. In one example, it could be a syntax representing bold-ness as a Boolean property e.g., "bold=false". In another example, it could be a syntax where the unbold is a complementary instruction to "<b>" i.e., "<unb>".

Figure 5B:
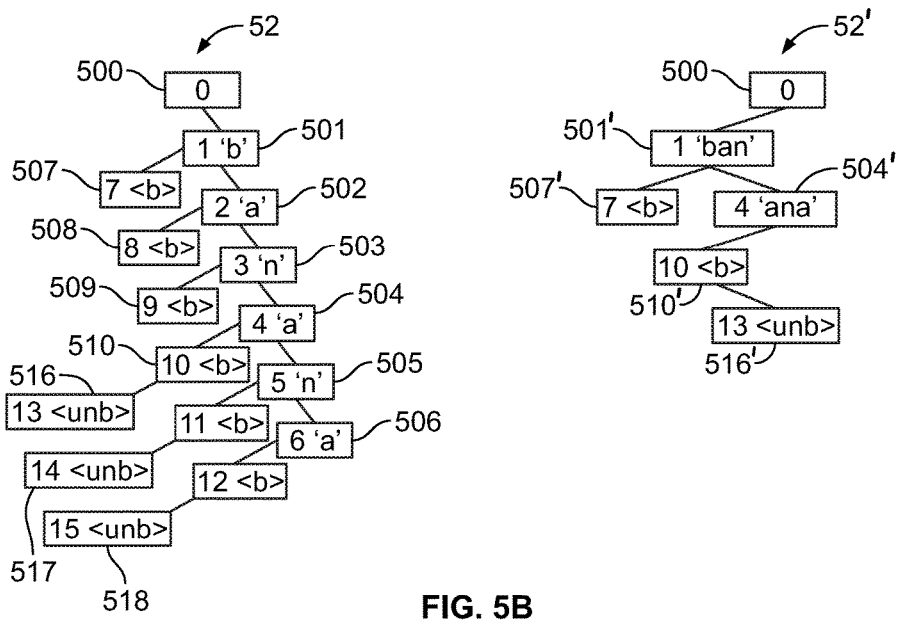
FIG. 5B is a diagram illustrating a compression algorithm for tracking and storing formatting changes in a causal tree structure, according to an embodiment.

FIG. 5B is a diagram illustrating one possible alternate approach to handling formatting change instructions, and then the application of the compression algorithm for tracking and storing formatting changes in a causal tree structure, according to an embodiment. A user first bolds the text "banana" and then enters an "unbold" instruction to unbold "ana". As a result, the "ban" portion of the text "banana" is displayed in bold while the "ana" portion of the text "banana" is displayed not in bold, which is the same result as shown in FIG. 5A. FIG. 5B illustrate some of the same elements as FIG. 5A and the description of such like-numbered elements are omitted for brevity.

As shown in FIG. 5B, in uncompressed causal tree 52, when the user enters an "unbold" instruction to unbold the text "ana", three nodes 516, 517, and 518 are created. Node 516 has an ID of "13", a CauseID of "10", and a Value of "<unb>" representing an unbold instruction. Node 517 has an ID of "14", a CauseID of "11", and a Value of "<unb>". Node 518 has an ID of "15", a CauseID of "12", and a Value of "<unb>." Thus, the nodes 516, 517 and 518 corresponding to the unbold instruction are caused by the nodes 510, 511, and 512 corresponding to the bold instructions "<b>" of the text "ana." On the other hand, in the uncompressed tree 50 of FIG. 5A, the delete "<del>" instruction adds deletion instruction nodes 513, 514, and 515 to the bold instruction nodes 510, 511, and 512. The result of both causal trees 50 and 52 are the same, which is that "ana" is bolded and then unbolded.

Compressing uncompressed causal tree 52 results in compressed causal tree 52'. When the user enters the "unbold" instruction to unbold the text "ana", the chain node 510' causes a chain node 516'. The chain node 516' includes unbold instructions "<unb>" and has an ID of "13", a CauseID of "10", and a Value of "<unb>" representing an unbold instruction. The instructions in the chain node 516' modify the chain node 510', i.e., which unbolds the text "ana" (chain node 504') that was previously bolded by chain node 510'.

Furthermore, although delete instruction (from the perspective of the system) or an undo instruction (from the perspective of the user) is applied to a bold instruction in FIG. 5A, the process is similar when the undo instruction is applied to other types of instructions (e.g., insertion of text, deletion of text, copy and paste instruction, etc.). As an example, if the bolded word "ana" (which encompasses chain nodes 504' and 510') are deleted, and the delete instruction is undone, both chain nodes 504' and 510' would be re-displayed at the user device. In general terms, any instruction can be undone by attaching a deletion instruction to it (e.g., a deletion instruction may be attached to another deletion instruction to undo the previous deletion).

Figure 6:
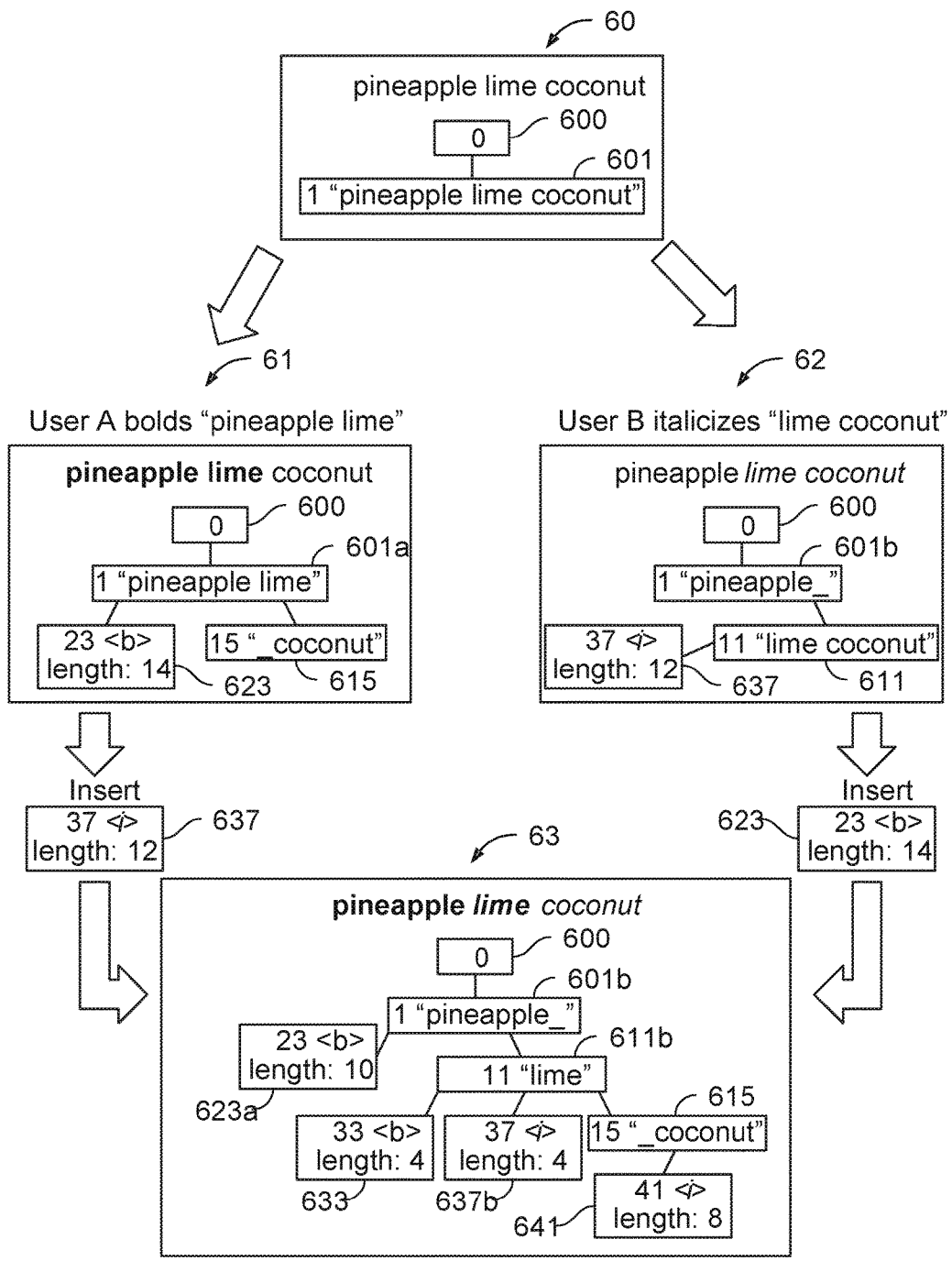
FIG. 6 is a diagram illustrating a compression algorithm for resolving formatting conflicts in a causal tree structure, according to an embodiment.

FIG. 6 is a diagram illustrating a compression algorithm for resolving formatting conflicts in a causal tree structure, according to an embodiment. When multiple users edit the same document, formatting conflicts may occur. Such conflicts may be resolved using a causal tree structure according to an embodiment.

In FIG. 6, a document includes the text "pineapple lime coconut". The document is represented by a causal tree 60, which includes a root node 600 and a chain node 601. The chain node 601 has an ID of "1", a CauseID of "0", and a Value of "pineapple lime coconut". Two users, User A and User B, make changes to the document. User A accesses and edits the document from a first user site and/or client device. User B accesses and edits the document from a second user site and/or client device.

User A bolds "pineapple lime", resulting in causal tree 61 based on User A's edits. The causal tree 61 includes the root node 600 and chain nodes 601a, 615, and 623. Chain node 601a is a character chain node and has an ID of "1", a CauseID of "0", and a Value of "pineapple lime". Character chain node 601a in turn causes chain nodes 615 and 623. Chain node 615 is also a character chain node and has an ID of "15", a CauseID of "1", and a Value of "_coconut" (a space plus the characters in the text "coconut"). As used in FIG. 6, "_" indicates a space. Chain node 623 is a formatting chain node and has an ID of "23", a CauseID of "1", and a Value of "<b>" representing a bold instruction. In the current embodiment, a length field in the chain node 623 indicates that the chain is 14 characters long, i.e., the bold instructions "<b>" in the formatting chain node 623 apply to fourteen characters. The fourteen bold instructions "<b>" in the formatting chain node 623 modify the text "pineapple lime" in character chain node 601a. In other embodiments, however, the length field is omitted from the chain node 623. In still other embodiments, the space character " " may be preserved in either of the two character chains.

User B italicizes "lime coconut", resulting in causal tree 62 based on user B's edits. The causal tree 62 includes the root node 600 and chain nodes 601b, 611, and 637. Chain node 601b is a character chain node has an ID of "1", a CauseID of "0", and a Value of "pineapple_" (the characters in the text "pineapple" plus a space). Character chain node 601b in turn causes another character chain node 611. Character chain node 611 has an ID of "11", a CauseID of "1", and a Value of "lime coconut". Character chain node 611 causes formatting chain node 637, which has a ID of "37", a CauseID of "11", and a Value of "<i>" representing an italicize instruction. In the present embodiment, a length field in the formatting chain node 637 indicates that the chain is 12 characters long, i.e., the twelve italicize instructions "<i>" in the formatting chain node 637 apply to twelve characters. The italicize instructions "<i>" in formatting chain node 637 modify the text "lime coconut" in the character chain node 611. In other embodiments, however, the length field is omitted from the chain node 637.

In an embodiment, User A and User B are editing the document simultaneously, or almost simultaneously. When the edits made by User A and User B are transmitted to the server, the edits are incorporated into a single causal tree 63 as shown in FIG. 6. Once the edits are incorporated, User A and User B will be accessing and viewing the same revision of the document, i.e., the revision of the document that includes the text "pineapple lime coconut", in which "pineapple" is bolded, "lime" is bolded and italicized, and "_coconut" (space plus the characters in the text "coconut") is italicized.

In more detail, causal tree 63 includes the root node 600 and several subsequent chain nodes. Immediately following the root node 600 is the character chain node 601b, which has an ID of "1", a CauseID of "0", and a Value of "pineapple_" (the characters in the text "pineapple" plus a space). Character chain node 601b in turn causes two chain nodes 611 and 623a. Chain node 623a is a formatting chain node and has an ID of "23", a CauseID of "1", a Value of "<b>", and a length of 10 corresponding to the number of characters in the text "pineapple" in character chain node 601b. Formatting chain node 623a is a bold instruction to modify the text "pineapple_" (the characters in the text "pineapple" plus a space) in chain node 601b. Formatting chain node 623a is a portion of formatting chain node 623 in causal tree 61, which corresponds to the edits made by User A.

Character chain node 611 is also caused by chain node 601b. Character chain node 611b has an ID of "11", a CauseID of "1", and a Value of "lime". In turn, character chain node 611b causes two formatting chain nodes 633 and 637b and another character chain node 615. Formatting chain node 633 has an ID of "33", a CauseID of "11", a value of "<b>", and a length of 4 corresponding to the number of characters in the text "lime". Formatting chain node 633 is a bold instruction to modify the text "lime" in the character chain node 611. Formatting chain node 633 is also a portion of the formatting chain node 623 in causal tree 61. Together, formatting chain nodes 623a and 633 correspond to the edits made by User A.

Character chain node 611b also causes formatting chain node 637b. Formatting chain node 637b has an ID of "37", a CauseID of "11", a Value of "<i>" representing an italicize instruction and a length of 4 corresponding to the number of characters in the text "lime". Formatting chain node 637b is an italicize instruction to modify the text "lime" in the character chain node 611b. Formatting chain node 637b is a portion of the formatting chain node 637, which corresponds to the edits made by User B in the causal tree 62.

Character chain node 615 is caused by character chain node 611b. Character chain node 615 has a ID of "15", a CauseID of "11", and a Value of "_coconut" (a space plus the characters in the text "coconut"). Character chain node 615 causes formatting chain node 641, which has an ID of "41", a CauseID of "15", a Value of "<i>", and a length of 8 corresponding to the number of characters in "coconut". Formatting chain node 641 is an italicize instruction to modify the text "_coconut" (a space plus the characters in the text "coconut") in the character chain 615. Together, formatting chain node 637b and 641 corresponds to the edits made by User B in formatting chain node 637 in the causal tree 62.

Figure 7A:
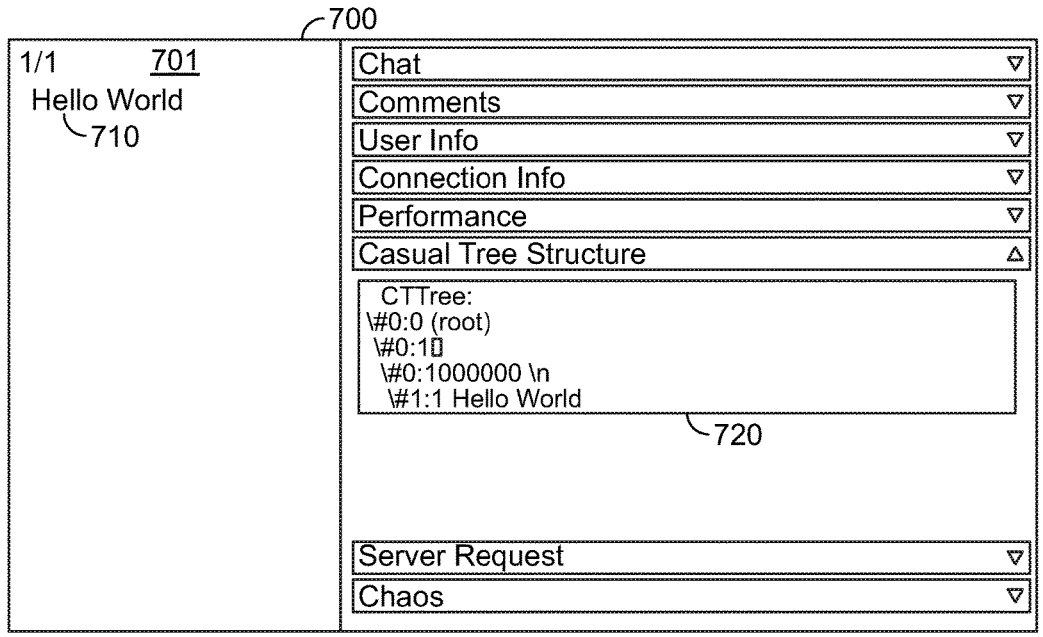
FIG. 7A is a screen shot diagram illustrating a collaborative editing application, according to an embodiment.

FIG. 7A is a screen shot diagram illustrating a collaborative editing application 700, according to an embodiment. The collaborative editing application 700 includes an editor window 701 and a causal tree structure 720. Although the causal tree structure 720 is shown in FIG. 7A, in other embodiments, the causal tree structure 720 may not be shown. Text "Hello World" 710 is shown in the editor window 701. In the corresponding causal tree structure 720, the causal tree structure 720 has a root node and a character chain node. The root node has an ID of "0". The character chain node has an ID of "1" and a Value of "Hello World".

The syntax of the causal tree structure 720 will be explained in more detail. In the causal tree structure 720, a chain node or a branch of the causal tree structure is represented as "#<site ID>:<stamp>[Value]". In FIG. 7A, the root node is represented as "#0:0 (root)." The line "#0:1 0" represents a subtree. The line "#0:1000000 \n" denotes a new line, which is used to begin paragraphs in the document. The line "#1:1 Hello World" represents the character chain node for the text "Hello World". The syntax shown for causal tree structure 720 is arbitrarily chosen and may be different in other embodiments.

In an embodiment, an instruction ID of the chain node includes a combination of the site ID and the stamp. For example, in FIG. 7A, the instruction ID is represented by "#<site ID>:<stamp>". The site ID is assigned to each client device by the server upon connecting to a document stored on the server. This way, every client session has a unique site ID. The stamp is a numeric value counter (e.g., an integer counter) of instructions entered or typed by a user (or instructions generated by the server) that is roughly synchronized across client devices. The next available numeric value of the stamp at each client device is determined based on the changes to the causal tree structure stored at the server, and the server broadcasts such changes to the client devices so that stamp values across client devices are sequential. In an embodiment, each user's edit instruction has a unique stamp value, and only one user's edit instruction can be assigned the next available stamp value in the instruction ID (e.g., next highest ID number for the causal tree). In other embodiments however, instructions from multiple users that are generated simultaneously may be assigned the same stamp value, and such instructions are distinguished from each other by their site IDs. In turn, the instruction ID is generated by client devices by combining the site ID and stamp. The instruction IDs thus generated are unique because even if the stamp portion of one client device collides with another client, the site ID portion of the instruction ID is unique across the client devices.

Although the instruction IDs in the present embodiment is generated at the client devices, in other embodiments, the instruction ID is generated by the server. In still other embodiments, the instruction ID may include a time stamp, which indicates the time at which the instruction is entered by the user.

In an embodiment, the site ID is used to identify the user, such that each user has a unique site ID. In various embodiments, each user is assigned the next available site ID when the user begins an editing session. For example, User A is assigned #1 as a site ID for a first editing session. When User A leaves the first editing session and begins a second editing session during which time User B is already editing the document, User A is assigned #2 as site ID for the second editing session while User B is assigned #1 as the site ID. In other embodiments, however, the site ID is not user session-specific and may be persistent for each user.

In various embodiments, the site ID is useful to resolve conflicts that may arise when edits from different users arrive simultaneously at the server (i.e., serves a tie-breaking function). In an embodiment, User A makes an edit to the document and User B also makes an edit to the document. User A's editing instruction is assigned a first instruction ID, a combination of User A's site ID and the next available stamp value. User B's editing instruction is assigned a second instruction ID, a combination of User B's site ID and the next available stamp value. In one scenario, User A's edit instruction and User B's edit instruction are assigned the same stamp value (due to network latency) and the instructions are received by the server at the same time. To resolve such conflict, the server processes the editing instruction with a lower site ID first. For instance, if User A is assigned site ID #1 and User B is assigned site ID #2, then the server will process User A's editing instructions prior to processing User B's editing instructions. In other embodiments, however, the user editing instruction associated with a higher site ID may take priority.

In other embodiments in which the instruction IDs include time stamps, the time stamp may be used (in place of or in addition to the site ID) to resolve conflicts that may arise when edits from different users arrive simultaneously at the server. As the time stamps are generated at the client devices when the users enters the edit, a user instruction associated with an earlier time stamp may take priority over a user instruction associated with a later time stamp, such that the user instruction associated with the earlier time stamp is processed first.

Figure 7B:
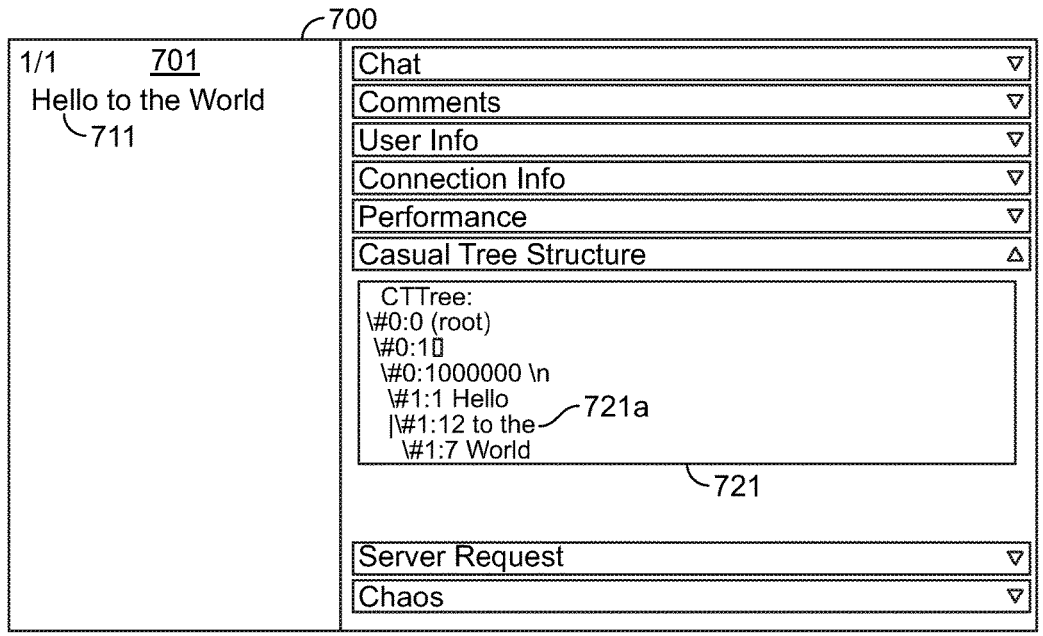
FIG. 7B is a screen shot diagram illustrating the collaborative editing application of FIG. 7A with insertion of text, according to an embodiment.

FIG. 7B is a screen shot diagram illustrating the collaborative editing application 700 of FIG. 7A with insertion of text, according to an embodiment. A user adds "to the" (the characters in the text "to the" plus a space) between "Hello" (the characters in the text "Hello" plus a space) and "World", forming a new phrase "Hello to the World" 711 shown in the editor window 701. The corresponding causal tree 721 is shown in the causal tree structure window. The causal tree 721 has a root node and three character chain nodes. The "Hello" character chain node has an instruction ID of "#1:1" (site ID=1 and stamp=1) and is caused by the root node. The "World" character chain node has an instruction ID of "#1:7" (site ID=1 and stamp=7) and is caused by the "Hello" character chain node. Character chain node 721a corresponds to the added text "to the". Character chain node 721a has an instruction ID of "#1:12" (site ID=1 and stamp=12) and is also caused by the "Hello" chain node. In other words, the "Hello" character chain node is the parent chain node of both the "World" character chain node and the new character chain node 721a.

Figure 7C:
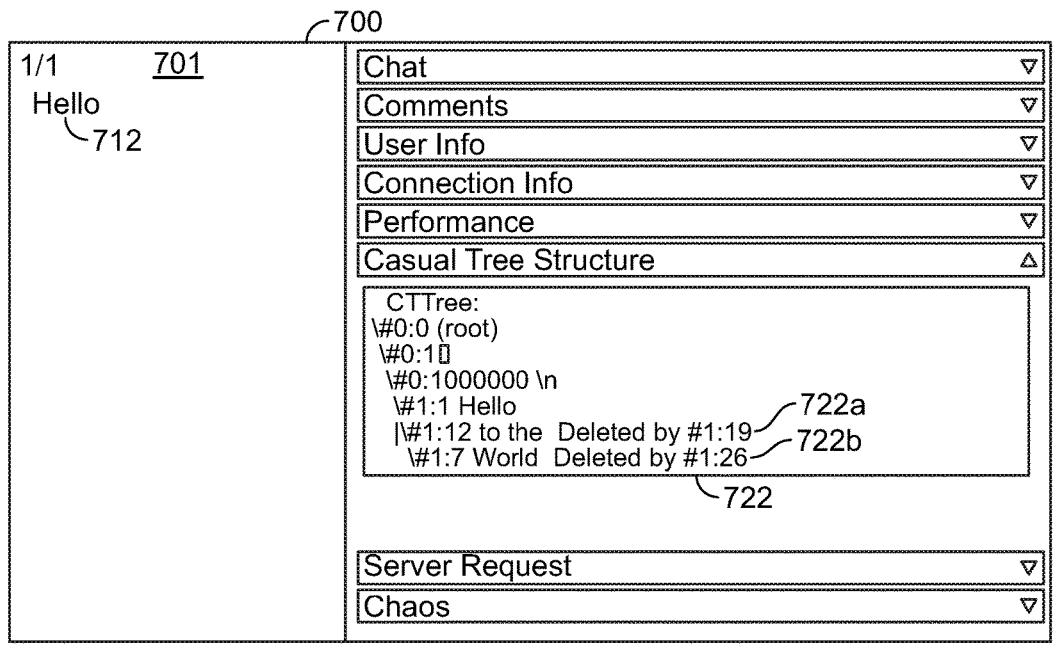
FIG. 7C is a screen shot diagram illustrating the collaborative editing application of FIG. 7B with deletion of text, according to an embodiment.

FIG. 7C is a screen shot diagram illustrating the collaborative editing application 700 of FIG. 7B with deletion of text, according to an embodiment. The user now deletes "to the World" (a space plus the characters in the text "to the World") from the phrase "Hello to the World". The resultant text "Hello" 712 is shown in the editor window 701. In the corresponding causal tree structure 722, two deletion chain nodes 722a and 722b are added. The deletion chain node 722a follows and is caused by character chain node 721a and has an instruction ID of "#1:19" (site ID=1 and stamp=19). The deletion chain node 722b follow and is caused by the "World" character chain node. The deletion chain node 722b has an instruction ID of "#1:26" (site ID=1 and stamp=26). In an embodiment, a length field for the deletion chain nodes 722a and 722b is not shown because it is assumed that the deletion chain node has the same length of its parent node. In other embodiment, a length field may be added to the syntax for the causal tree structure 722 to denote the length of the deletion chain nodes 722a and 722b.

Figure 8A:
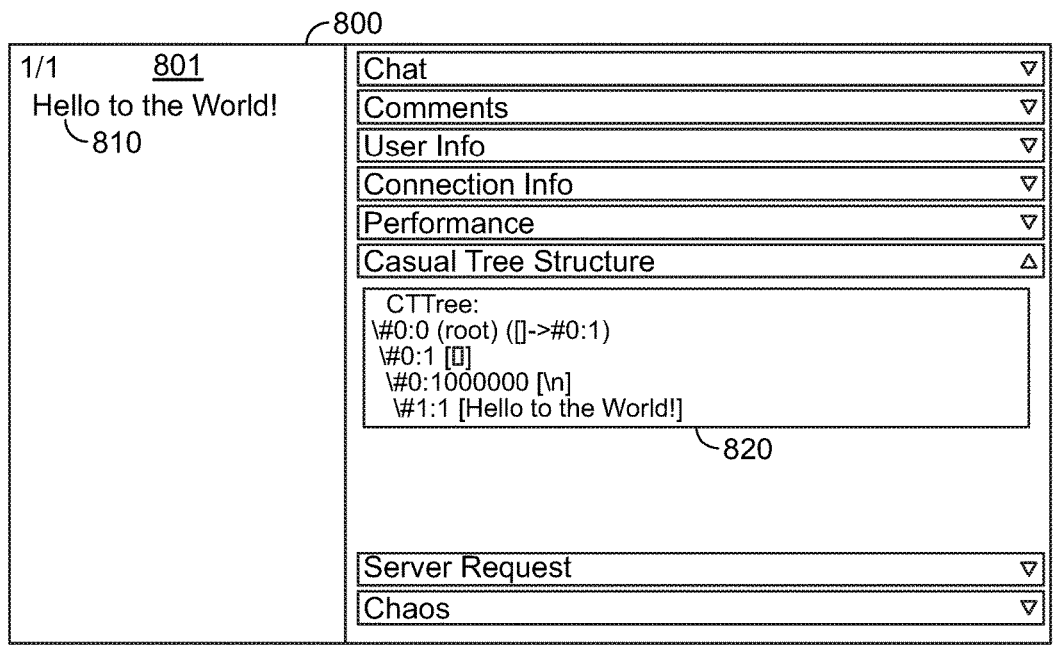
FIG. 8A is a screen shot diagram illustrating a collaborative editing application, according to an embodiment.

FIG. 8A is a screen shot diagram illustrating a collaborative editing application 800, according to an embodiment. The collaborative editing application 800 includes an editor window 801 and a causal tree structure 820. Although the causal tree structure 820 is shown in FIG. 8A, in other embodiments, the causal tree structure 820 may not be shown. Text "Hello to the World!" 810 is shown in the editor window 801. In the corresponding causal tree structure 820, the causal tree has a root node and a character chain node. The character chain node has an instruction ID of "#1:1" (site ID=1 and stamp=1) and a Value of "Hello to the World!" as shown in brackets ([ ]).

Figure 8B:
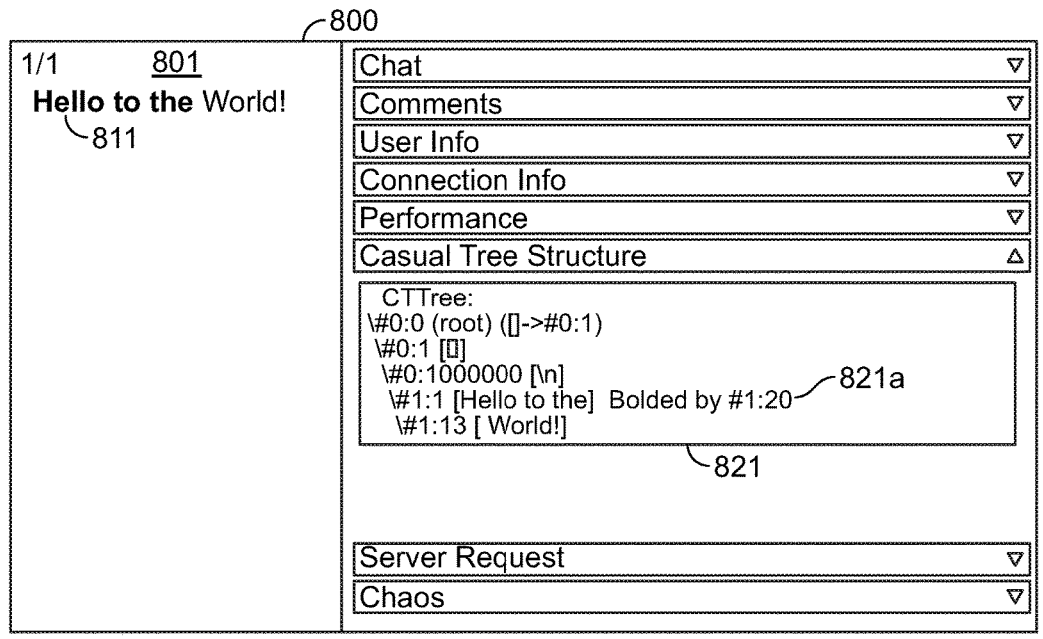
FIG. 8B is a screen shot diagram illustrating the collaborative editing application of FIG. 8A with formatting change, according to an embodiment.

FIG. 8B is a screen shot diagram illustrating the collaborative editing application 800 of FIG. 8A with formatting change, according to an embodiment. A user bolds "Hello to the" in "Hello to the World!" via a bold instruction, as shown in the editor window 801. The corresponding causal tree structure 821 is shown in the causal tree structure window. The causal tree structure 821 has a root node and three character chain nodes. The "Hello to the" character chain node has an instruction ID of "#1:1" (site ID=1 and stamp=1) and is caused by the root node. The "World!" (a space plus the characters in the text "World!") character chain node has an instruction ID of "#1:13" (site ID=1 and stamp=13) and is caused by the "Hello to the" character chain node. Formatting chain node 821a is caused by the "Hello to the" character chain node. Formatting chain node 821a has an instruction ID of "#1:20" (site ID=1 and stamp=20). The formatting chain node 821a is a bold instruction to modify the "Hello to the" character chain node. In an embodiment, a length field for the formatting chain node 821a is not shown because it is assumed that the formatting chain node has the same length of its parent node. In other embodiment, a length field may be added to the syntax for the causal tree structure 821 to denote the length of the formatting chain node 821a.

Figure 8C:
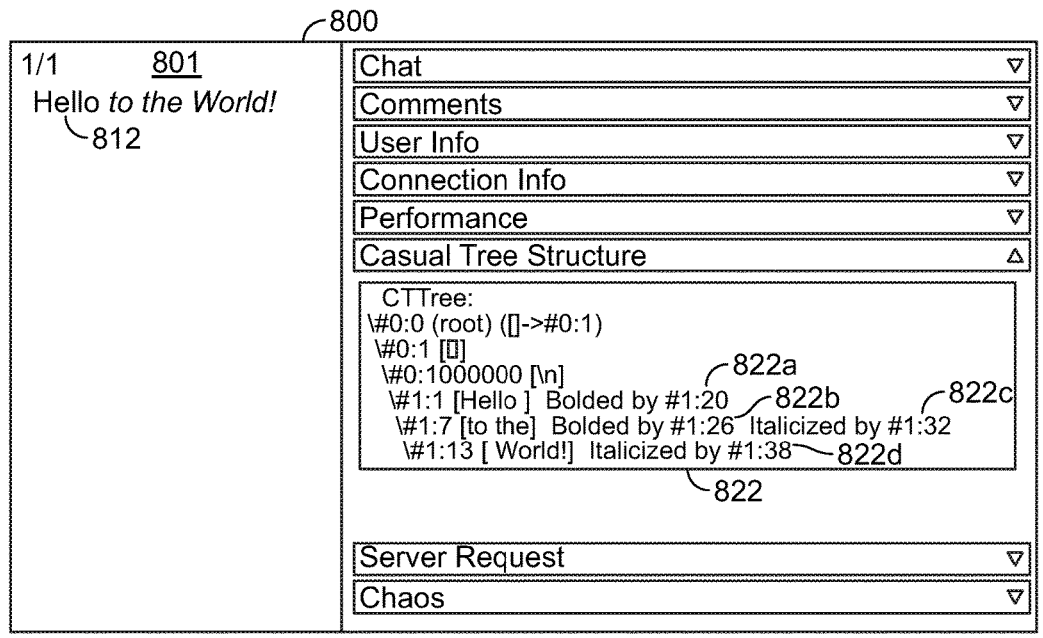
FIG. 8C is a screen shot diagram illustrating the collaborative editing application of FIG. 8B with another formatting change, according to an embodiment.

FIG. 8C is a screen shot diagram illustrating the collaborative editing application 800 of FIG. 8B with another formatting change, according to an embodiment. The user now italicizes "to the World!" in the phrase "Hello to the World!" via an italicize instruction, as shown in the editor window 801. The corresponding causal tree structure 822 illustrates the formatting change. The causal tree structure 822 includes a root node. Following the root node is the "Hello" (the text "Hello" plus a space) character chain node, which has an instruction ID of "#1:1" (site ID=1 and stamp=1). As shown in the editor window 801, "Hello" is bolded, and the bold instruction corresponds to formatting node chain 822a. Formatting node chain 822a is caused by the "Hello" character chain node and has an instruction ID of "#1:20" (site ID=1 and stamp=20).

Character chain node "to the" is also caused by the "Hello" character chain node. The character chain node "to the" has an instruction ID of "#1:7" (site ID=1 and stamp=7). Two formatting chain nodes follow "to the" character chain node. Formatting chain node 822b has an instruction ID of "#1:26" (site ID=1 and stamp=26) and is a bold instruction, which indicates that "to the" has been bolded. Formatting chain node 822c has an instruction ID of "#1:32" (site ID=1 and stamp=32) and is an italicize instruction, which indicates that "to the" has been italicized. Both formatting chain nodes 822b and 822c are caused by the character chain node "to the".

Character chain node "World!" (a space plus the text "World!") is caused by character chain node "to the". The character chain node "World!" has an instruction ID of "#1:13" (site ID=1 and stamp=13). A formatting chain node 822d follows the character chain node "World!". Formatting chain node 822d has an instruction ID of "#1:38" (site ID=1 and stamp=13) and is an italicize instruction, which indicates that "World!" has been italicized. Formatting chain node 822d is caused by the character chain node "World!".

Although the instruction IDs in the embodiments of FIGS. 7A-7C and 8A-8C are a combination of site IDs and stamps, in other embodiments, the instruction IDs may be represented by only a sequence of integers without the site IDs, i.e., the stamps are the instruction IDs.

In various embodiments, a causal tree is restructured into smaller, even-sized branches. If a tree is unbalanced, then the restructured or rebalanced tree contains more branches than the original tree in an embodiment. Depending on the editing instructions, the restructured or rebalanced tree may contain less branches than the original tree. The branches make it easier for the system to support the client-server architecture where the server has the whole document, and the client device only needs the part actively used by the client device. This way, rather than transmitting the entire tree to a client device, only the branches that are needed by a user are sent to that user's client device. Furthermore, transmitting just the necessary branches, which are smaller than the entire tree structure, reduces transmission time when sent from the server to the client device, reduces processing time on the client device, and decreases the horsepower requirements of the client device. This is particularly useful when the client device is a mobile phone, tablet, or other handheld device that may have lower computational power.

Figures 9, 10A:
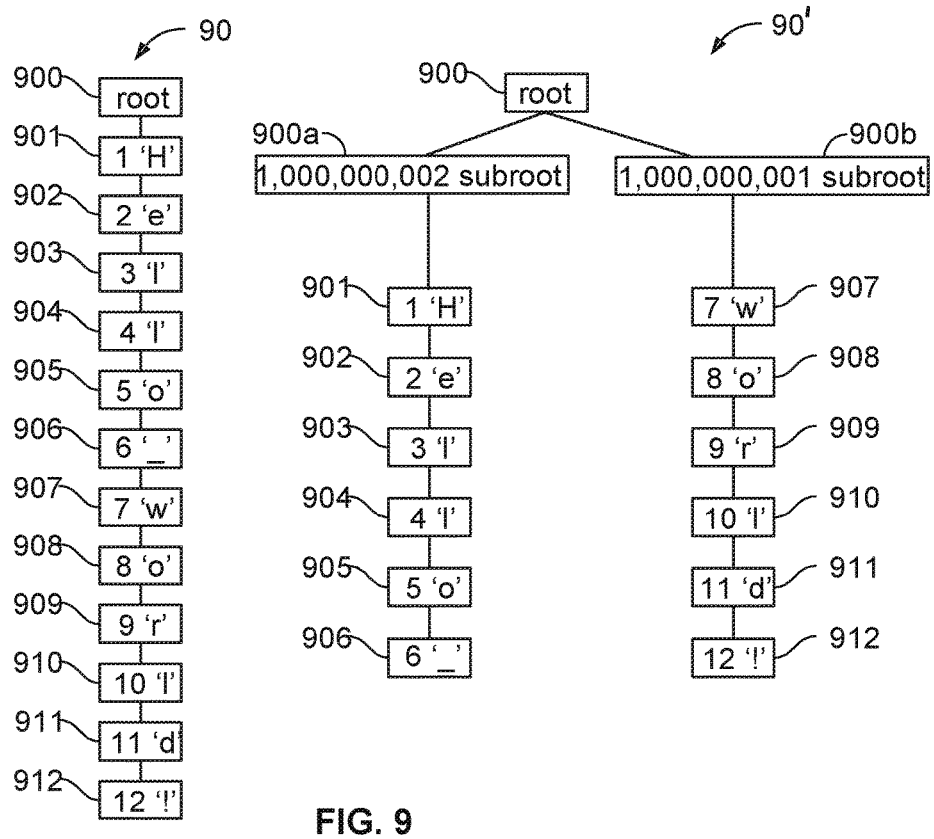
FIG. 9 is a diagram illustrating a rebalancing algorithm for generating a causal tree having even-sized branches, according to an embodiment.
FIG. 10A is a screen shot diagram illustrating a spreadsheet application, according to an embodiment.

FIG. 9 is a diagram illustrating a rebalancing algorithm for generating a causal tree having even-sized branches, according to an embodiment. A causal tree has even-sized branches when there are approximately equal number of nodes in each branch. Compression of a causal tree may be performed in real time, i.e., while the users are editing a document. Rebalancing of a causal tree may be performed offline, i.e., after all users have finished editing a document and all editing instructions are received by the server. Rebalancing may also be performed in real time if the causal tree becomes too off-balanced (i.e., the difference in the number of nodes between two branches become too large). In that case, the server temporarily suspends the users' editing sessions to rebalance the causal tree.

Referring to FIG. 9, a document contains the text "Hello World!". A causal tree 90 corresponding to the text is generated and includes a root node 900 and character nodes 901 to 912. Each character in the character nodes 901 to 912 is assigned an ID. For example, character node 901 is assigned an ID of "1" and has a Value of "H". Character node 906 is assigned an ID of "6" and has a Value of "_" corresponding to a space. Character node 907 is assigned a ID of "7" and has a Value of "w". Character node 912 is assigned a ID of "12" and has a Value of "!".

When a rebalancing algorithm is applied to the causal tree 90, a rebalanced tree 90' is generated. The rebalanced tree 90' includes the root node 900. Two subroot nodes 900a and 900b are generated. Subroot node 900a has an ID of "1,000,000,002" and subroot node 900b has an ID of "1,000,000,001". Subroot nodes 900a and 900b are invisible nodes, i.e., they are not visible to the user when the document is composed. Character nodes 901 to 906 follow subroot node 900a, and character node 901 is caused by subroot node 900a. Instead of following character node 906, character nodes 907 to 912 now form a second branch in the rebalanced tree 90'. Character node 907 is now caused by subroot node 900b and its CauseID is changed from 6 to 1,000,000, 001. Although the CauseID of character node 907 is modified, the ID of character node 907 remains the unchanged. As shown in FIG. 9, rebalanced tree 90' thus has two chains formed by character nodes 901 to 906 and character nodes 907 to 912, with each chain having six characters.

The rebalancing algorithm generates the invisible subroot nodes to allow redistribution of nodes in the causal tree. The invisible subroot nodes also preserve the proper traversal order of the nodes in the causal tree. For example, in rebalanced tree 90', because the ID of subroot node 900a is greater than the ID of subroot node 900b, the branch beginning with subroot node 900a (character nodes 901 to 906) is traversed before the branch beginning with subroot node 900b (character nodes 907 to 912). In other embodiments, however, the ID of subroot node 900a may be less than the ID of subroot node 900b, and the branch beginning with subroot node 900a is traversed before the branch beginning with subroot node 900b.

In still other embodiments, subroot nodes are not generated. Instead, an additional identifier is added to the first node in each branch of the rebalanced tree to indicate the order in which the branches of the rebalanced causal tree should be traversed.

This example, though trivial in size, illustrates what happens with a much larger document. Many business documents number in the hundreds of pages; some, in the thousands of pages. Due to limited display space on computer devices a user may only need to display no more than 4 pages at a time. Rather than transmitting the entire causal tree representing the thousands of pages and having a client device, especially a mobile device with limited computational power, work through pagination, the server can perform pagination, rebalancing the causal tree into branches appropriately limited in size to what can be displayed on the client device. The server then sends only the branch that represents the content to be displayed on the client device.

In various embodiments, only the ID (shown as the instruction ID in the causal tree structures in FIGS. 7A-7C and 8A-8C) of a chain node is persistent. The persistent nature of the ID allows the server to track all changes made in the document. A comparison of the document (e.g., redline or blackline) at any point in time may be generated by traversing the nodes of the causal tree structure.

Other example instructions that are suitable for a causal tree structure include the copy and paste instruction and the cut and paste instruction. Regarding the copy and paste instruction, the branches and/or nodes that are associated with the copied content are duplicated into new branches and/or nodes. The new branches and/or nodes have a different CauseID than the original branches and/or nodes, depending on where the copied content is pasted. Regarding the cut and paste instruction, prior to creating the duplicate branches and/or nodes, delete instruction nodes are added to follow the original branches and/or nodes.

A causal tree may be used to represent content other than a conventional computer document. In an embodiment a causal tree may be created for every cell in a spreadsheet to provide the benefits of tracking changes to a cell's value over time, provide for visual formatting on individual characters in that cell, control over access to the value, or other cell and character-specific capabilities as represented in the causal tree of that cell. In one embodiment it could be used to track changes to a formula that generates a cell's value.

In another embodiment, a causal tree is created for a spreadsheet with each cell being a branch of that spreadsheet. For example, FIG. 10A is a screen shot diagram illustrating a spreadsheet application, according to an embodiment. FIG. 10A shows a spreadsheet 1050 with cells A9, A10, A11, A12, and A13 having values. A causal tree structure is generated for the spreadsheet 1050, and each cell A9, A10, A11, A12, and A13 is a branch caused by a root node of the spreadsheet causal tree structure.

Figures 10B, 10C:
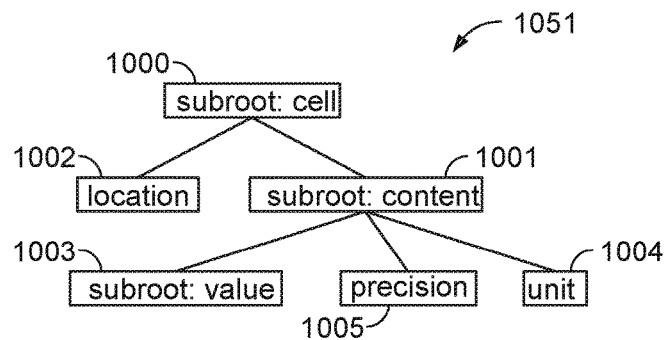
FIG. 10B is a diagram illustrating a general causal tree structure of a cell in the spreadsheet application of FIG. 10A, according to an embodiment.
FIG. 10C is a screen shot diagram illustrating a formula in the spreadsheet application of FIG. 10A, according to an embodiment.

FIG. 10B is a diagram illustrating a general causal tree structure 1051 of a cell in the spreadsheet application of FIG. 10A, according to an embodiment. The causal tree structure 1051 includes a subroot node 1000 ("subroot: cell"), which serves as the root node of the cell. The cell subroot node 1000 in turn causes two branches. The first branch includes a location node 1002, which indicates the location of a cell in the spreadsheet (e.g., cell "A9"). The second branch includes a content subroot 1001 ("subroot: content"). In this embodiment, the content subroot 1001 causes three branches, value subroot node 1003 ("subroot: value"), precision node 1005, and unit node 1004. The value subroot node 1003 indicates the value of the cell (e.g., "$10.00" for cell "A9"). In this embodiment, the precision node 1005 and unit node 1004 are metadata associated with the data in the cell. For example, for cell "A9," the unit node 1004 would have a value of 10^-2, indicating that the precision of the value is to the hundredth, and the precision node 1005 would have a value of "USD", indicating that the unit for the cell is US dollars. In other embodiments, the content subroot 1001 may cause nodes with metadata other than or in addition to precision node 1005 and unit node 1004. Such metadata may include, for example, date of measurement, and other metadata that may be associated with the data or cell.

FIG. 10C is a screen shot diagram illustrating a formula in the spreadsheet application of FIG. 10A, according to an embodiment. As shown in FIG. 10C, the selected cell A13 contains a formula "=SUM(A8:A12)". The formula contained in cell A13 corresponds to a causal tree branch, such as that shown in FIG. 10D, according to an embodiment.

Figures 10D, 11A:
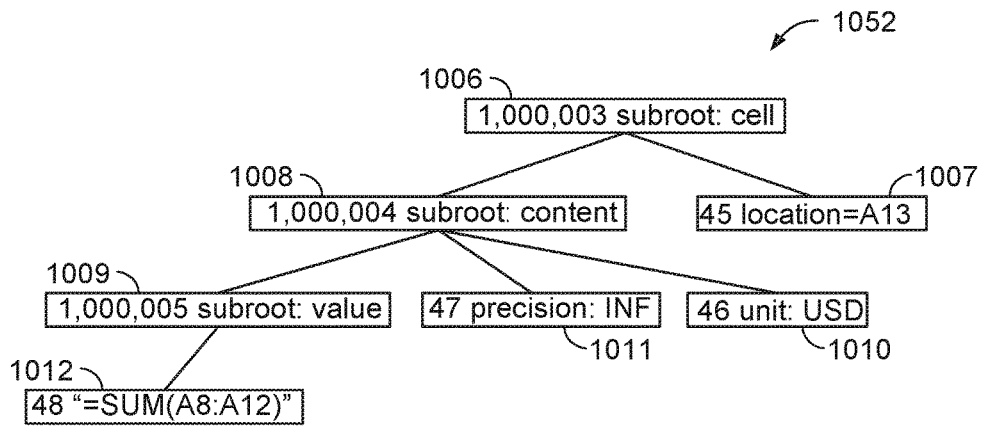
FIG. 10D is a diagram illustrating a causal tree structure of the formula of FIG. 10C, according to an embodiment.
FIG. 11A is a screen shot diagram illustrating a spreadsheet application, according to another embodiment.

Referring to FIG. 10D, the causal tree branch 1052 for cell A13 includes a cell subroot node 1006 ("subroot: cell"), which may be an invisible node in some embodiments. The cell subroot node 1006 has an ID of "1,000,003". Following the subroot node 1006 are content subroot node 1008 ("subroot: content") and location node 1007. The content subroot node 1008 has an ID of "1,000,004", and may be an invisible node in some embodiments. Location node 1007 has an ID of "45" and indicates that the location of the cell is "A13". The content subroot node 1008 causes three branches: value subroot node 1009 ("subroot: value"), precision node 1011, and unit node 1010. The unit node 1010 has an ID of "46" and indicates that the unit of the cell is "USD" or US dollars. The precision node 1011 has an ID of "47" and indicates that the precision of the data in the cell is infinite ("INF"). The value subroot node 1009 has an ID of "1,000,005", and may be an invisible node in some embodiments. The value subroot node 1009 in turn causes node 1012, which indicates the instruction in the cell. The node 1012 has an ID of "48" and indicates that the formula "=SUM(A8:A12)" is the instruction in the cell. In an embodiment, the formula in a spreadsheet cell is an instruction that is understood by the spreadsheet application, which interprets and processes the instruction. For instance, when node 1012 is reached, the spreadsheet application understands that the formula "=SUM(A8:A12)" calls for the summation of the values in cells A8 through A12, and processes the formula to obtain the sum.

FIG. 11A is a screen shot diagram 1150 illustrating a spreadsheet application, according to an embodiment. The screen shot diagram 1150 has a different cell A12 than the screen shot diagram 1050 shown in FIG. 10A. In FIG. 11A, the unit associated with cell A12 is "€", not "$" as shown in FIG. 10A.

Figure 11B:
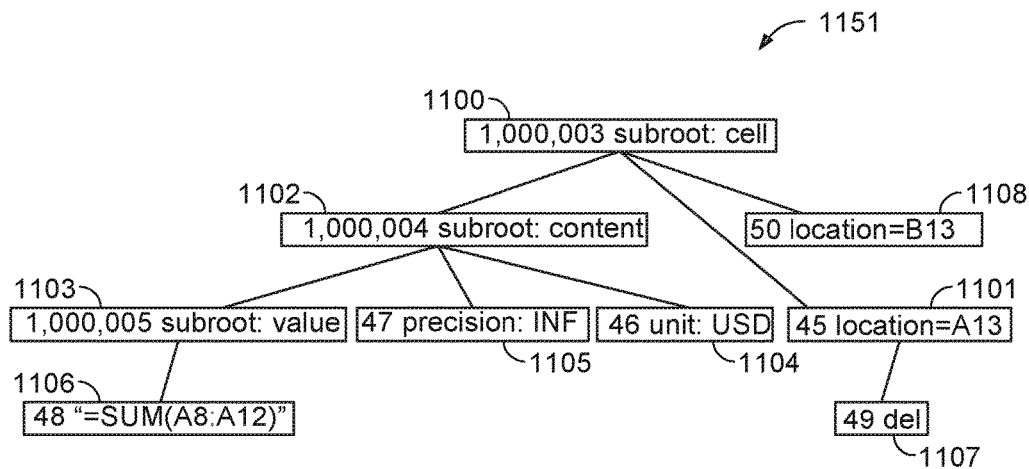
FIG. 11B is a diagram illustrating a causal tree structure when the formula of FIG. 11A is moved to another cell, according to an embodiment.

FIG. 11B is a diagram illustrating a causal tree structure 1151 when the formula of FIG. 11A is moved to another cell, according to an embodiment. The causal tree structure 1151 begins with a cell subroot 1100 having an ID of "1,000,003." The cell subroot 1100 may be an invisible node in some embodiments. Following the subroot node 1100 are content subroot node 1102 ("subroot: content") and location node 1108. The content subroot node 1102 has an ID of "1,000,004", and may be an invisible node in some embodiments. Location node 1101 has an ID of "45" and indicates that the location of the cell is "A13". The content subroot node 1102 in turn causes three branches: value subroot node 1103 ("subroot: value"), precision node 1105, and unit node 1104. The unit node 1104 has an ID of "46" and indicates that the unit of the cell is "USD" or US dollars. The precision node 1105 has an ID of "47" and indicates that the precision of the data in the cell is infinite ("INF"). The value subroot node 1103 has an ID of "1,000,005", and may be an invisible node in some embodiments. The value subroot node 1103 in turn causes node 1106, which indicates the instruction in the cell. The node 1106 has an ID of "48" and indicates that the formula "=SUM(A8:A12)" is the instruction in the cell.

In the present embodiment, the formula "=SUM(A8: A12)" is moved from cell A13 to B13. With this edit, a delete instruction "del" is added after the location node 1101 as node 1107. Node 1107 has an ID of "49", which is the next available ID in the causal tree structure. Another location node 1108 is added. The location node 1108 is caused by the cell subroot node 1100 and has an ID of "50." The location node 1108 indicates that the location of the formula is now in cell "B13".

Figure 11C:
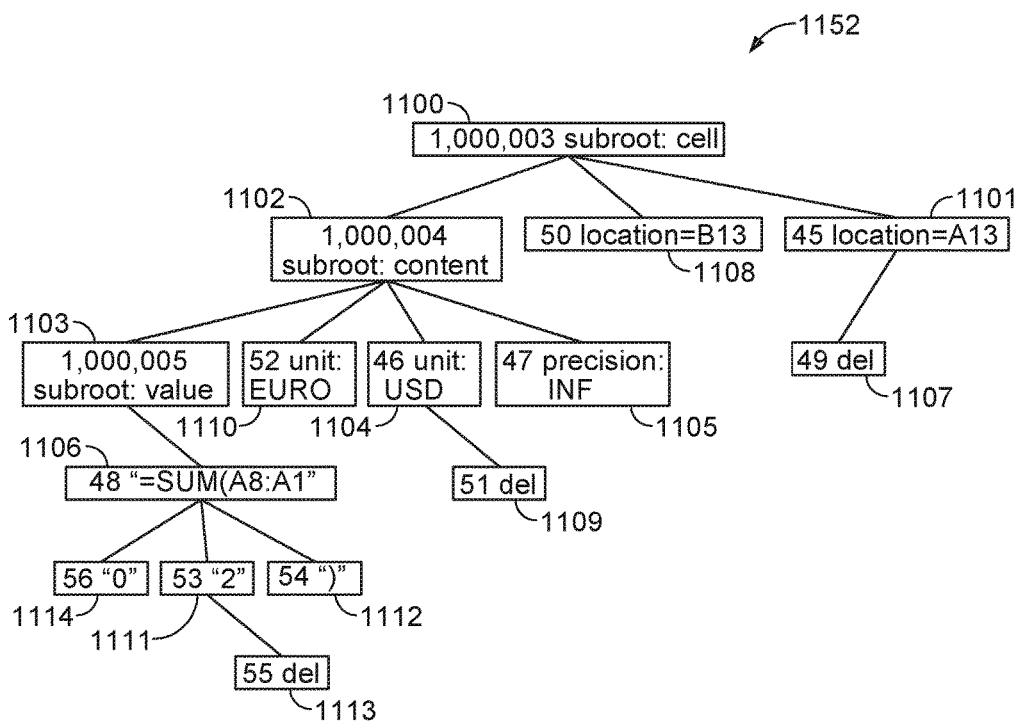
FIG. 11C is a diagram illustrating a causal tree structure when the formula of FIG. 11A is moved to another cell and edited, according to an embodiment.

FIG. 11C is a diagram illustrating a causal tree structure 1152 when the formula of FIG. 11A is moved to another cell and then edited, according to an embodiment. The causal tree structure 1152 is based on the causal tree structure 1151 of FIG. 11A, and the descriptions of like-numbered elements are omitted for brevity.

In FIG. 11C, the formula "=SUM(A8:A12)" is edited to "=SUM(A8:A10)" having a unit of "Euro" instead of "USD", after the formula is moved from cell A13 to cell B13. First, the unit of the formula is revised. Following the unit node 1104, a delete instruction node 1109 is added. The delete instruction node 1109 has an ID of "51" and a value of "del" indicating the delete instruction. Together, unit node 1104 and deletion node 1109 indicate that the unit "USD" is no longer the unit of the formula. When the unit of the formula is changed to "Euro," new unit node 1110 is created. New unit node 1110 has an ID of "52" and a value of "EURO" indicating that the new unit associated with the formula is "Euro."

The edits with respect to the text of the formula is reflected in the casual tree branch beginning with the node 1106. The node 1106 has an ID of "48" and indicates that the unedited portion of the formula is "=SUM(A8:A1". The node 1106 causes nodes 1111, 1112, and 1114. Node 1111 has an ID of "53", indicates that it follows node 1106, and a value of "2". A delete instruction node 1113 is generated following node 1111 because "2" is deleted from the formula. The delete instruction node 1113 has an ID of "55," indicates that it follows node 1111 and a value of "del" indicating the delete instruction. Node 1112 follows the node 1106 and has an ID of 54 and a value of ")". The "0" added to the formula is indicated in node 1114, which follows the node 1106. Node 1114 has an ID of "56" and a value of "0".

As noted earlier, the value or instruction of a node is not restricted by the causal tree, but rather only by the syntax understood by an application that processes and interprets the value or instruction. For example, the i18n character set can be represented without an impact on the causal tree; the application that interprets it does need to know how to interpret the values.

Figure 12:
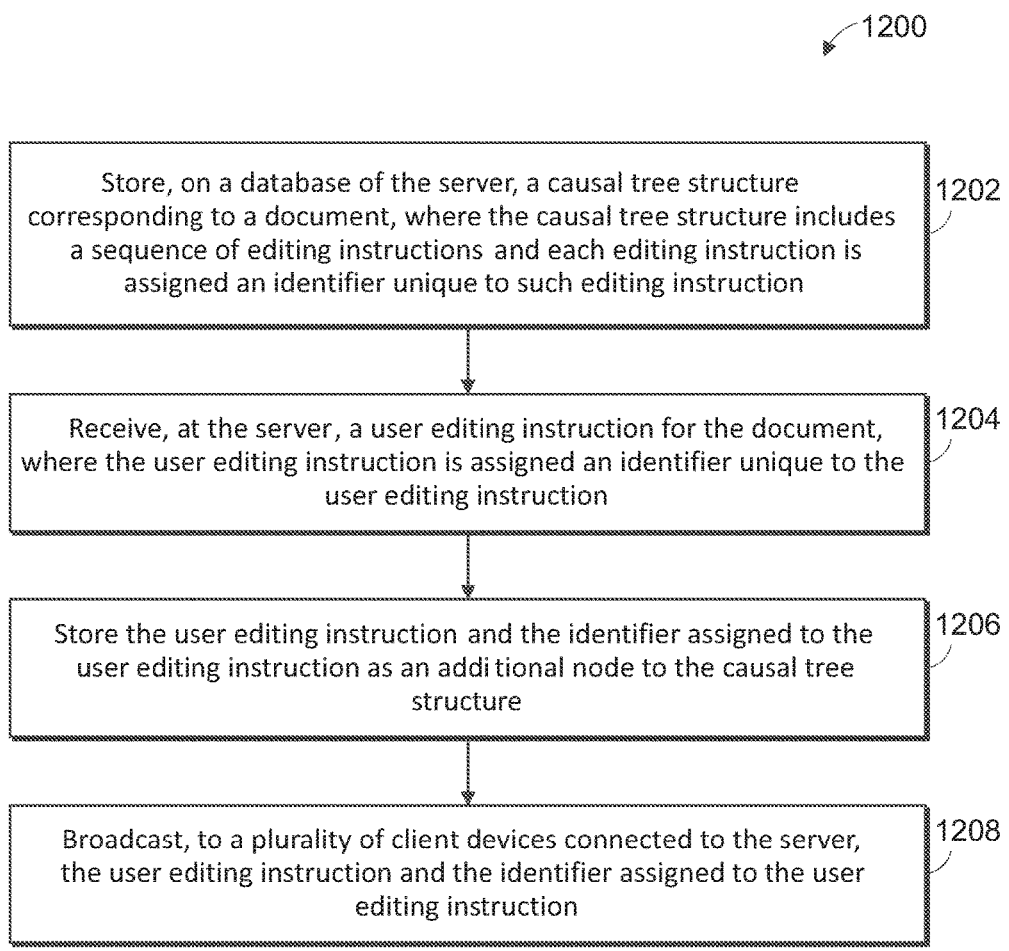
FIG. 12 is a flowchart illustrating an example method, implemented on a server, for editing a document, according to an embodiment.

FIG. 12 is a flowchart illustrating an example method 1200, implemented on a server, for editing a document, according to an embodiment. In some embodiments, the method 1200 is implemented by the productivity server 100 of FIG. 1A, which interacts with the database server 110 and the client devices 104, 106, 108. FIG. 12 is described with reference to FIG. 1A for explanatory purposes. In other embodiments, however, the method 1200 is implemented by another suitable computing device.

At 1202, the productivity server 100 stores, on a database of the productivity server 100 or on the database server 110, a causal tree structure (e.g., a data structure) corresponding to a document. The document may be stored on the database of the productivity server 100 or the database server 110. The causal tree structure includes a sequence of editing instructions, and each editing instruction is assigned an identifier unique to such editing instruction. In an embodiment, the identifiers of the editing instructions in the causal tree structure are assigned by client devices when these edit instructions are received by the client devices (e.g., when the editing instructions are entered by a user). In other embodiments, for example when an editing instruction is too large for a client device to process, upon receiving the editing instruction, the server assigns the editing instruction an identifier and processes and applies the editing instruction to the causal tree structure maintained by the server. In still other embodiments, the causal tree structure contains server-generated instructions (e.g., creation of a document, rebalance of the causal tree structure, or externally updated link content), and these server-generated instructions are assigned identifiers by the server.

At 1204, the productivity server 100 receives, via its network interface 140, a user editing instruction for the document, where the user editing instruction is assigned an identifier unique to the user editing instruction. In an embodiment, the identifier unique to the user editing instruction is assigned by the client device after receiving the user editing instruction. Then at 1206, the productivity server 100 stores, via its processor 130, the user editing instruction and the identifier assigned to the user editing instruction as an additional node to the causal tree structure. At 1208, the productivity server 100 broadcasts, to a plurality of client devices (e.g., client devices 104, 106, and 108) connected to the productivity server 100, the user editing instruction and the identifier assigned to the user editing instruction.

In an embodiment, the identifier assigned to the user editing instruction may include a site identifier and a stamp. The site identifier is unique to an editing session of the user at a client device. The stamp is a numeric value (e.g., an integer value) based on identifiers assigned to editing instructions in the causal tree structure. In an embodiment, the stamp represents temporal relativeness to all other identifiers in the same causal tree structure, which allows the determination of the history of edits to the document. In some embodiments, the number of editing instructions in the causal tree may be reduced but the identifiers will continue to increment.

In still another embodiment, the identifier assigned to the user editing instruction may further include a cause identifier, where the cause identifier is an identifier of a prior editing instruction in a node in the causal tree structure that precedes the additional node.

In yet another embodiment, the document may be composed by traversing identifiers of the editing instructions in a sequential order (e.g., in an ascending or descending order).

In still other embodiments, the user editing instruction may include an instruction to modify a series of consecutive data in the document. The series of consecutive data, for example, may be a string of characters that is inserted or deleted by the user.

In an embodiment, each editing instruction in the causal tree structure may include at least one instruction selected from the group consisting of a modification of a value, a modification of metadata, a link to another node of the causal tree structure, a link to a node in another causal tree structure corresponding to another document, a link to the other causal tree, and a link to data residing outside the causal tree structure.

In another embodiment, the causal tree structure may include an editing instruction that is assigned a cause identifier. The causal tree structure may further include a second editing instruction that is assigned the same cause identifier as the editing instruction. The editing instruction and the second editing instruction may form separate branches of the causal tree structure.

Figure 13:
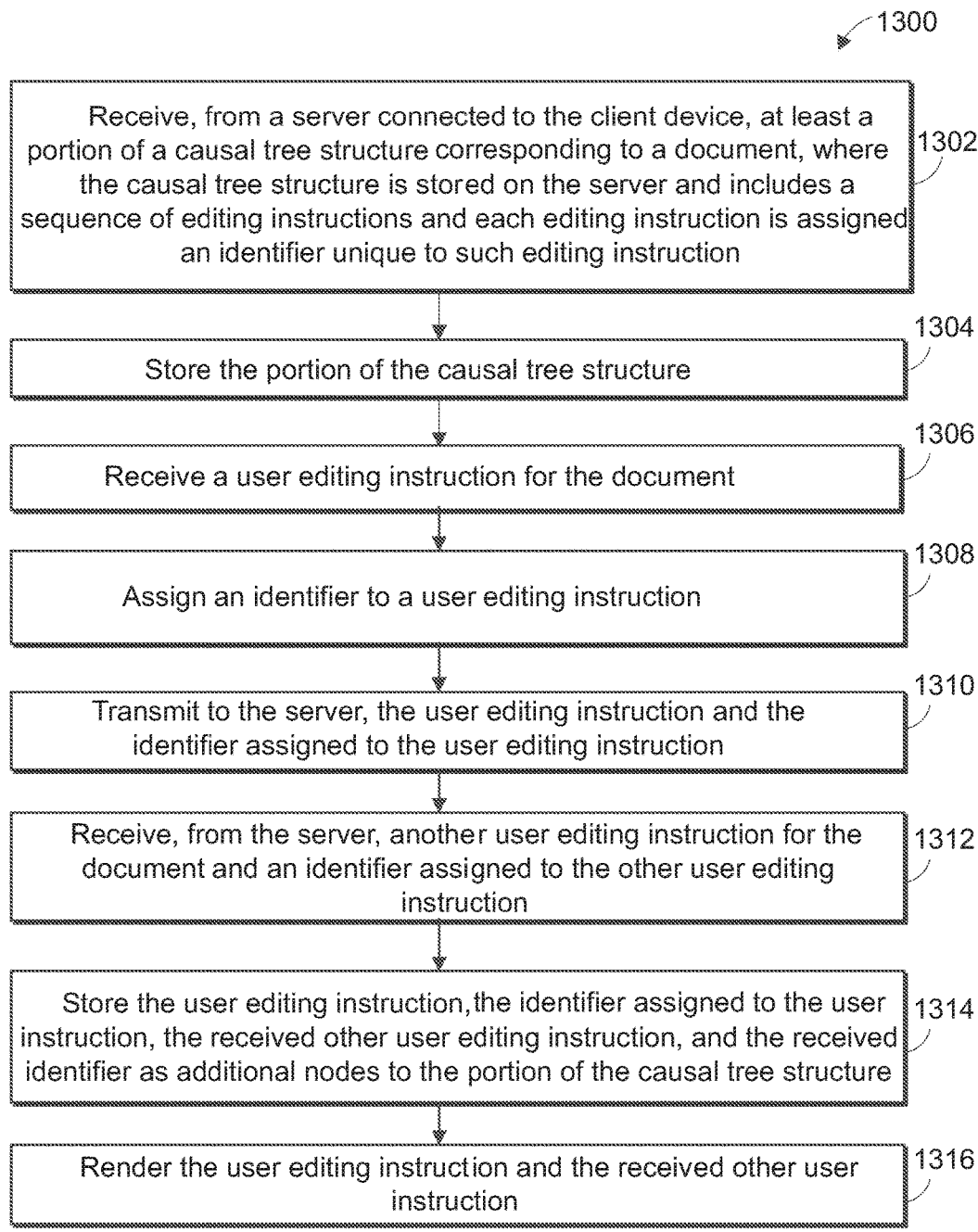
FIG. 13 is a flowchart illustrating an example method, implemented on a client device, for editing a document, according to an embodiment.

FIG. 13 is a flowchart illustrating an example method 1300, implemented on a client device, for editing a document, according to an embodiment. In some embodiments, the method 1300 is implemented by any of the client devices 104, 106, 108 connected to the productivity server 100 and the database server 110. FIG. 13 is described with reference to FIG. 1A for explanatory purposes. In other embodiments, however, the method 1300 is implemented by another suitable computing device.

At 1302, the client device 104 receives, from the productivity server 100 or the database server 110, at least a portion of a causal tree structure corresponding to a document. The client device 104 may receive the portion of a causal tree structure in response to a user request to access, view, and/or edit the corresponding portion of the document. The causal tree structure is stored on the database server 110 (or a database of the productivity server 100) and includes a sequence of editing instructions. Each editing instruction is assigned an identifier unique to such editing instruction.

At 1304, the client device 104 stores the received portion of the causal tree structure in its memory. At 1306, the client device 104 receives a user editing instruction for the document input by a user. At 1308, the client device 104 assigns, using its processor 130, an identifier to the user editing instruction.

At 1310, the client device 104 transmits, to the productivity server 100, the user editing instruction and the identifier assigned to the user editing instruction. At 1312, the client device 104 receives, from the productivity server 100, another user editing instruction for the document and an identifier assigned to the other user editing instruction. In an embodiment, the other user editing instruction is an instruction transmitted to the productivity server 100 by another client device (e.g., client device 106) from another user who is collaboratively editing the same document.

At 1314, the client device 104 stores the user editing instruction and the identifier assigned to the user instruction, and the received other user editing instruction and the received identifier as additional nodes to the portion of the causal tree structure stored on the client device 104. At 1316, the client device 104 processes and renders the user editing instruction and the received other user instruction, e.g., display edits to the document made by the user of client device 104 and the user of client device 106.

In an embodiment, the client device 104 assigns the identifier to the user editing instruction by assigning a site identifier and a stamp. The site identifier is unique to the user's editing session on the client device 104. The stamp is a numeric value (e.g., an integer value) based on identifiers assigned to editing instructions in the causal tree structure stored on the server.

In various embodiments, the client device 104 maintains a "maxStamp" numeric counter. When the client device 104 needs to generate or assign an identifier to a user editing instruction, the client device 104 increments maxStamp and sets the stamp of the identifier to the new maxStamp value. When the client device 104 receives editing instructions from the network or the productivity server 100, the client device 104 sets the maxStamp to the largest-seen stamp for the incoming editing instruction. This process ensures that when the client device 104 generates an identifier, that identifier's stamp will be larger than any stamp the client device 104 has yet seen.

In still other embodiments, the client device 104 further assigns a cause identifier as a part of the identifier of the user editing instruction. The cause identifier is an identifier of a prior editing instruction in the causal tree structure that precedes the additional node in which the user editing instruction resides.

In an embodiment, the client device 104 composes (e.g., processes and renders) the document by traversing identifiers of the editing instructions in the portion of the causal tree structure in a sequential order.

In various embodiments, the user editing instruction may include an instruction to modify a series of consecutive data in the document.

In an embodiment, the user editing instruction of the client device 104 and the other user editing instruction of the client device 106 may share a cause identifier, where the cause identifier is an identifier of a prior editing instruction in the causal tree structure that precedes both the user editing instruction and the other user editing instruction.

In still another embodiment, the client device 104 receives a next user editing instruction, and assigns an identifier to the next user editing instruction based on the identifier assigned to the user instruction and the identifier assigned to the other user instruction.

Figure 14:
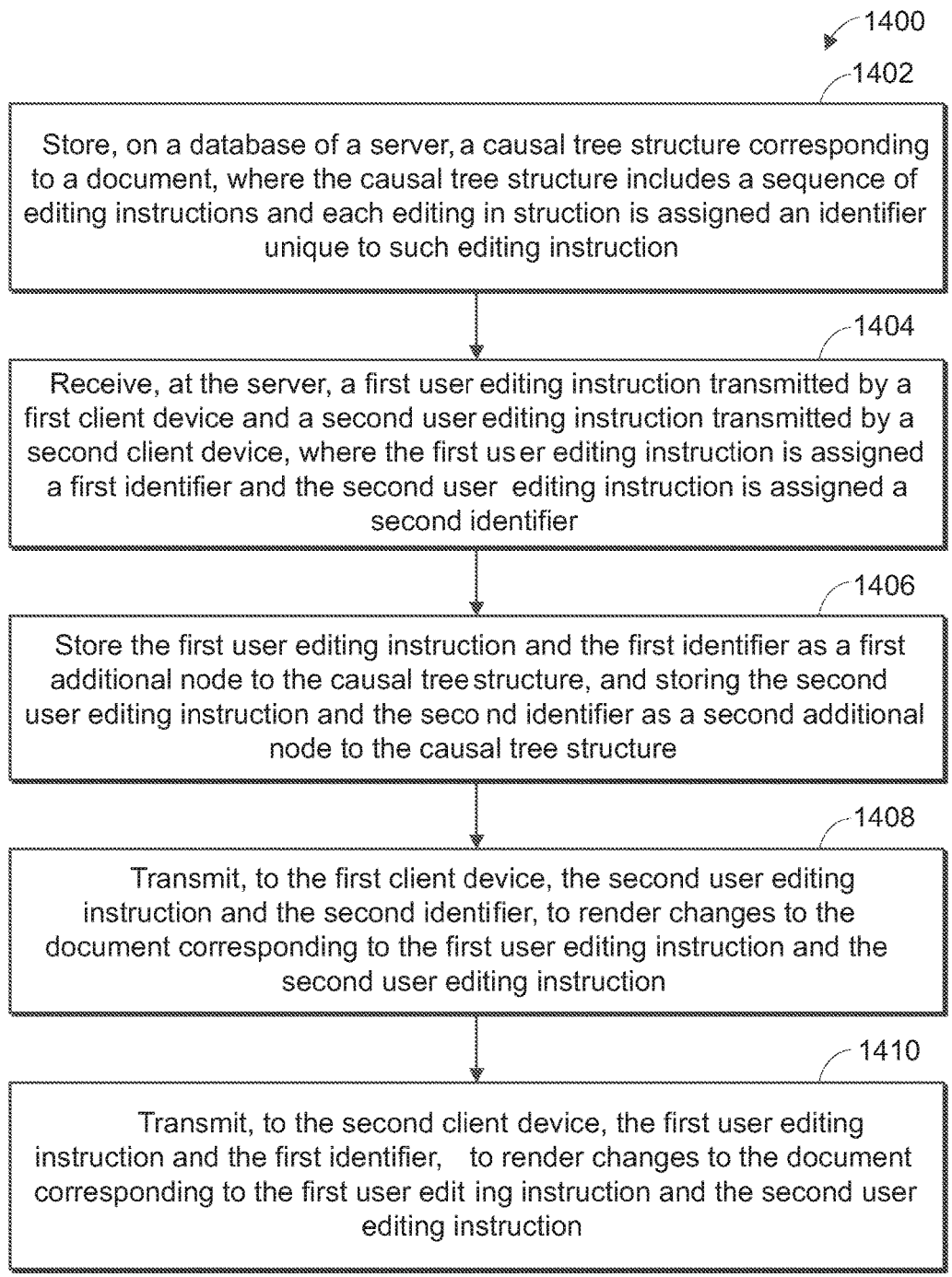
FIG. 14 is a flowchart illustrating another example method, implemented on a server, for editing a document, according to an embodiment.

FIG. 14 is a flowchart illustrating another example method, implemented on a server, for editing a document, according to an embodiment. In some embodiments, the method 1400 is implemented by the productivity server 100 of FIG. 1A, which interacts with the database server 110 and the client devices 104, 106, 108. FIG. 14 is described with reference to FIG. 1A for explanatory purposes. In other embodiments, however, the method 1400 is implemented by another suitable computing device.

At 1402, the productivity server 100 stores, on a database of the productivity server 100 or the database server 110, a causal tree structure corresponding to a document. The causal tree structure includes a sequence of editing instructions and each editing instruction is assigned an identifier unique to such editing instruction. At 1404, the productivity server 1404 receives a first user editing instruction transmitted by a first client device (e.g., client device 104) and a second user editing instruction transmitted by a second client device (e.g., client device 106). The first user editing instruction is assigned a first identifier (e.g., by the first client device) and the second user editing instruction is assigned a second identifier (e.g., by the second client device). At 1406, the productivity server 100 stores, via its processor 130, the first user editing instruction and the first identifier as a first additional node to the causal tree structure, and stores the second user editing instruction and the second identifier as a second additional node to the causal tree structure.

At 1408, the productivity server 100 transmits, to the first client device, the second user editing instruction and the second identifier, to render changes to the document corresponding to the first user editing instruction and the second user editing instruction. At 1410, the productivity server 100 transmits, to the second client device, the first user editing instruction and the first identifier, to render changes to the document corresponding to the first user editing instruction and the second user editing instruction.

According to the method 1400, if both the first user and the second user are editing the same portion of the document, both users' editing instructions are used to update the causal tree structure stored on the server and the copies of the causal tree structure (or copies of a branch of the causal tree structure) at the users' client devices. This ensures that the user edits converges and that both users are editing the same revision of the document.

In an embodiment, the first identifier may include a first site identifier unique to a first user's editing session on the first client device, and a first stamp, which is a numeric value (e.g., an integer value) based on identifiers assigned to editing instructions in the causal tree structure. The second identifier may include a second site identifier unique to a second user's editing session on the second client device, and a second stamp, which is a numeric value (e.g., an integer value) based on identifiers assigned to editing instructions in the causal tree structure.

In another embodiment, the first identifier may further include a first cause identifier, which is an identifier of a prior editing instruction in the causal tree structure that precedes the first user editing instruction. The second identifier may further include a second cause identifier, which is an identifier of a prior editing instruction in the causal tree structure that precedes the second user editing instruction.

In an embodiment where the first cause identifier and the second cause identifier are the same, the productivity server 100 compares the first stamp and the second stamp. If the first stamp is greater than the second stamp, the productivity server 100 processes the first user editing instruction before processing the second user editing instruction. If the first stamp is less than the second stamp, the productivity server 100 processes the second user editing instruction before processing the first user editing instruction.

In still another embodiment, when the first user editing instruction and the second user editing instruction are received by the productivity server 100 simultaneously, the productivity server 100 compares the first site identifier and the second site identifier. If the first site identifier is less than the second site identifier, the productivity server 100 processes the first user editing instruction before processing the second user editing instruction. If the first site identifier is greater than the second site identifier, the productivity server processes the second user editing instruction before processing the second user editing instruction.

In still another embodiment, the first identifier may include a first time stamp and the second identifier may include a second time stamp. The productivity server 100 compares the first time stamp and the second time stamp. If the first time stamp has an earlier time than the second time stamp, the productivity server 100 processes the first user editing instruction before processing the second user editing instruction. If the first time stamp has a later time than the second time stamp, the productivity server 100 processes the second user editing instruction before processing the first user editing instruction.

Figure 15:
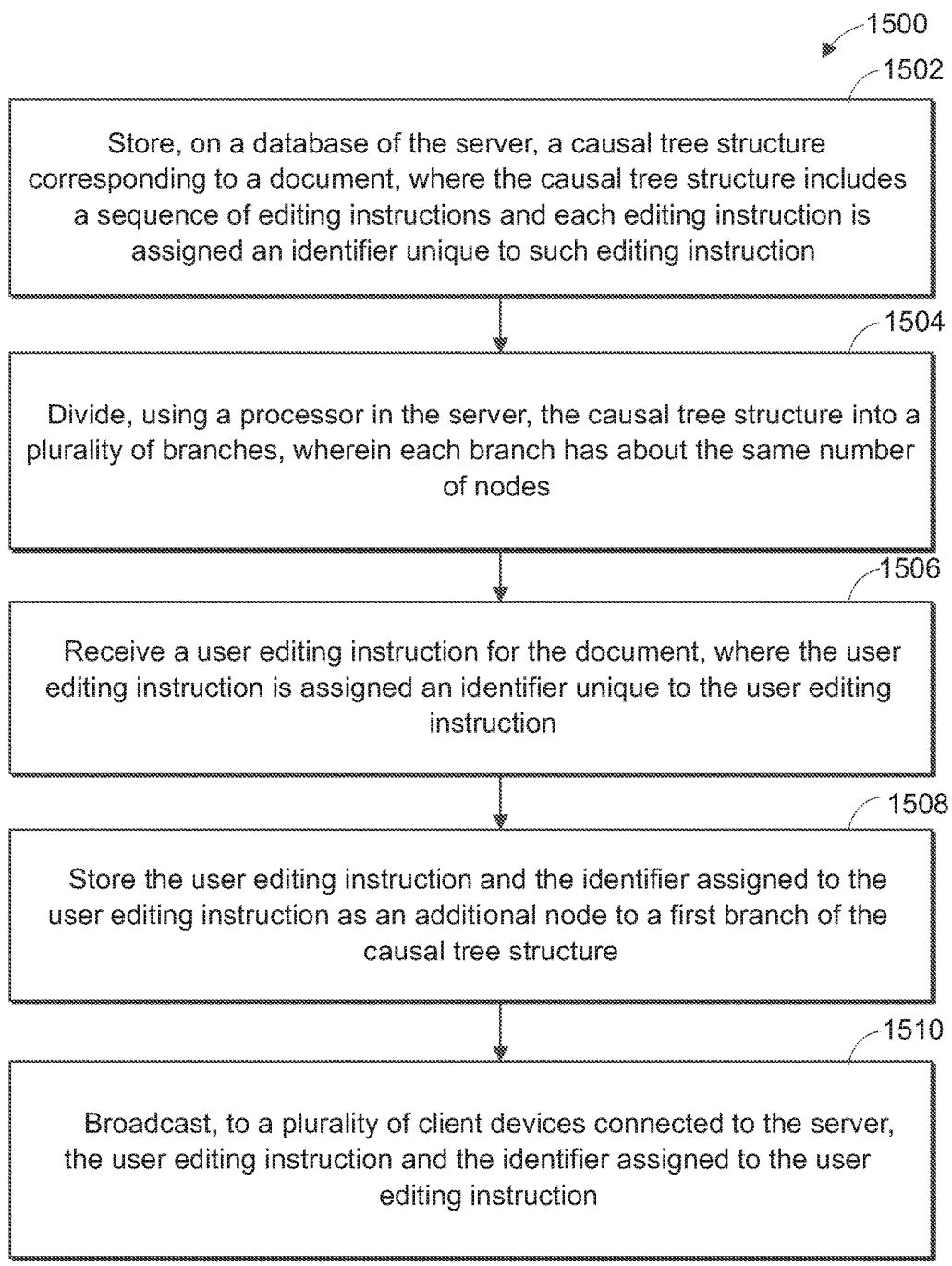
FIG. 15 is a flowchart illustrating yet another example method, implemented on a server, for editing a document, according to an embodiment.

FIG. 15 is a flowchart illustrating yet another example method 1500, implemented on a server, for editing a document, according to an embodiment. In some embodiments, the method 1500 is implemented by the productivity server 100 of FIG. 1A, which interacts with the database server 110 and the client devices 104, 106, 108. FIG. 15 is described with reference to FIG. 1A for explanatory purposes. In other embodiments, however, the method 1500 is implemented by another suitable computing device.

At 1502, the productivity server 100 stores, on a database of the productivity server 100 or the database server 110, a causal tree structure corresponding to a document. The causal tree structure includes a sequence of editing instructions and each editing instruction is assigned an identifier unique to such editing instruction. At 1504, the productivity server 100 divides, using its processor 130, the causal tree structure into a plurality of branches, where each branch has about the same number of editing instructions.

At 1506, the productivity server 100 receives a user editing instruction for the document, where the user editing instruction is assigned an identifier unique to the user editing instruction. At 1508, the productivity server 100 stores the user editing instruction and the identifier assigned to the user editing instruction as an additional node to a first branch of the causal tree structure. At 1510, the productivity server 100 broadcasts, to a plurality of client devices connected to the server, the user editing instruction and the identifier assigned to the user editing instruction.

In an embodiment, the productivity server 100 compares a number of editing instructions in the first branch of the causal tree structure to a predetermined number. If the number of editing instructions in the first branch exceeds the predetermined number, the productivity server 100 re-divides (e.g., re-balances) the causal tree structure into a second plurality of branches having about the same number of editing instructions.

In another embodiment, the productivity server 100 re-divides the causal tree structure when all user sessions to edit the document are terminated.

In yet another embodiment, the productivity server 100 temporarily suspend all user sessions to edit the document when re-dividing or re-balancing the causal tree structure.

In an embodiment, the re-divided causal tree structure may have a different number of branches than the causal tree structure.

In still another embodiment, the identifier assigned to each editing instruction may include an instruction identifier and a cause identifier. The productivity server 100 re-divides the causal tree structure by modifying cause identifiers of first editing instructions in the second plurality of branches without modifying the instruction identifiers of the first editing instructions.

In various embodiments, the causal tree structure also may be used to represent other metadata such as for use in formatting rendering of the data, or for capturing semantic information. It may contain metadata useful for other purposes such as for generating footnotes or even other documents in other data formats such as HTML, XML, XBRL, and iXBRL. In another embodiment, characters may represent data used to control access to the CauseID supporting such features as redacting content. The causal tree structure can be extended and adapted to all kinds of documents.

In still other embodiment, the causal tree structure may be used to represent various types of documents and objects such as a presentation or structured drawing. For instance, a presentation may include object of various types, e.g., text object, spreadsheet/table object, images. In an embodiment, each object may have its own causal tree structure. In another embodiment, each object may be a branch in causal tree structure for the presentation. The layout of these objects and the relationship between them may also be captured by the causal tree. In yet other embodiments, the causal tree may be used to link objects in different documents together. In still other embodiments, a node of a causal tree in one document may be a link to another separate and unrelated causal tree in another document. In other words, a causal tree may include an instruction that refers to nodes and branches of another causal tree or an entire other causal tree.

According to an embodiment, the causal tree data structure is implemented as a "commutative replicated data type" (CRDT). A CRDT is a replicated data structure that is inherently commutative: it allows edits to be applied to it in any order to produce the same result. A causal tree CRDT has several advantages for real-time collaborative distributed document editing, such as consistency, efficiency, interactivity, and respect for user intention.

A causal tree CRDT is a sequence CRDT designed to represent an eventually consistent list of atoms. The list of atoms is represented by a tree of vertices or nodes (vertices and nodes are used interchangeably herein). Edits carry the changes in vertices from one site with a replica of the data structure to another. When a site receives edits from another site, the edits are performed. Regardless of the order the edits are performed in, consistency will eventually be reached.

Each vertex or node in a causal tree CRDT has a globally unique id, written #s:t, where s is an integer identifying a site, and t is a logical timestamp that monotonically increases at each site. The site identifier is unique per site at any moment such that each site will produce unique ids. The site ids can be tied to additional information to represent authorship, e.g., a site id may represent a user or client device in various embodiments. When edits from another site are received, the timestamp for the site is updated to the maximum timestamp. Vertex ids have a global "younger" order where larger timestamps are younger, with ties resolved by the site id. Formally, if a and b are vertex ids, $a>b \equiv a:t>b:t \vee a:t=b:t \wedge a:s>b:s"$.

Each vertex or node in the tree contains a list of children sorted by the identifiers, youngest to oldest. These children were "caused" by the parent vertex. Each edit carries the identifier of the new vertex and the cause identifier so that the new vertex gets added to the correct list. If a cause cannot be found, the edit is pended until the cause has been added to the data structure.

In an embodiment, to carry out more computationally complex tasks such as driving document outlines for large collaborative documents, an ordered tree CRDT (which will also be referred to herein as a "causal graph") may be used. The causal graph is itself an extension of the causal tree CRDT: just as the causal tree uses an internal tree to implement a sequence CRDT, the causal graph uses an internal digraph to implement a hierarchy-of-sequences (ordered tree) CRDT. This combination creates an effective foundation for collaboratively editing large documents (e.g., a document upwards of 7,000 pages in size with 1,000 sections and 1,200 embedded objects). Put another way, a causal graph (as used herein) is an ensemble of causal subtrees, each one representing the ordered parent/child relationship between levels of nodes in an ordered tree hierarchy. Taken together this forms a digraph where the edges are causal connections and vertices are node and transition objects. Moving content from one location to another in the causal graph involves inserting a new transition in the appropriate causal tree (i.e., in the appropriate causal subtree).

As used herein, a causal graph is append-only, with all mutating operations adding new vertices to the graph. In this way the causal graph contains a record of all its historical states. Producing an ordered tree from the causal graph involves a traversal of the structure, iterating through selected edges to determine which nodes are "active" (not deleted) and their hierarchy and order positioning in the current document state.

Unlike a causal tree, where the structural relationship among data atoms is maintained entirely in the causal edges between graph vertices, a causal graph differentiates between node and transition vertices, with causal edges connecting both types, and has a more complex graph topology. This distinction allows for the original node to stay within the graph be moved as many times as necessary by adding transitions to it.

Figure 16A:
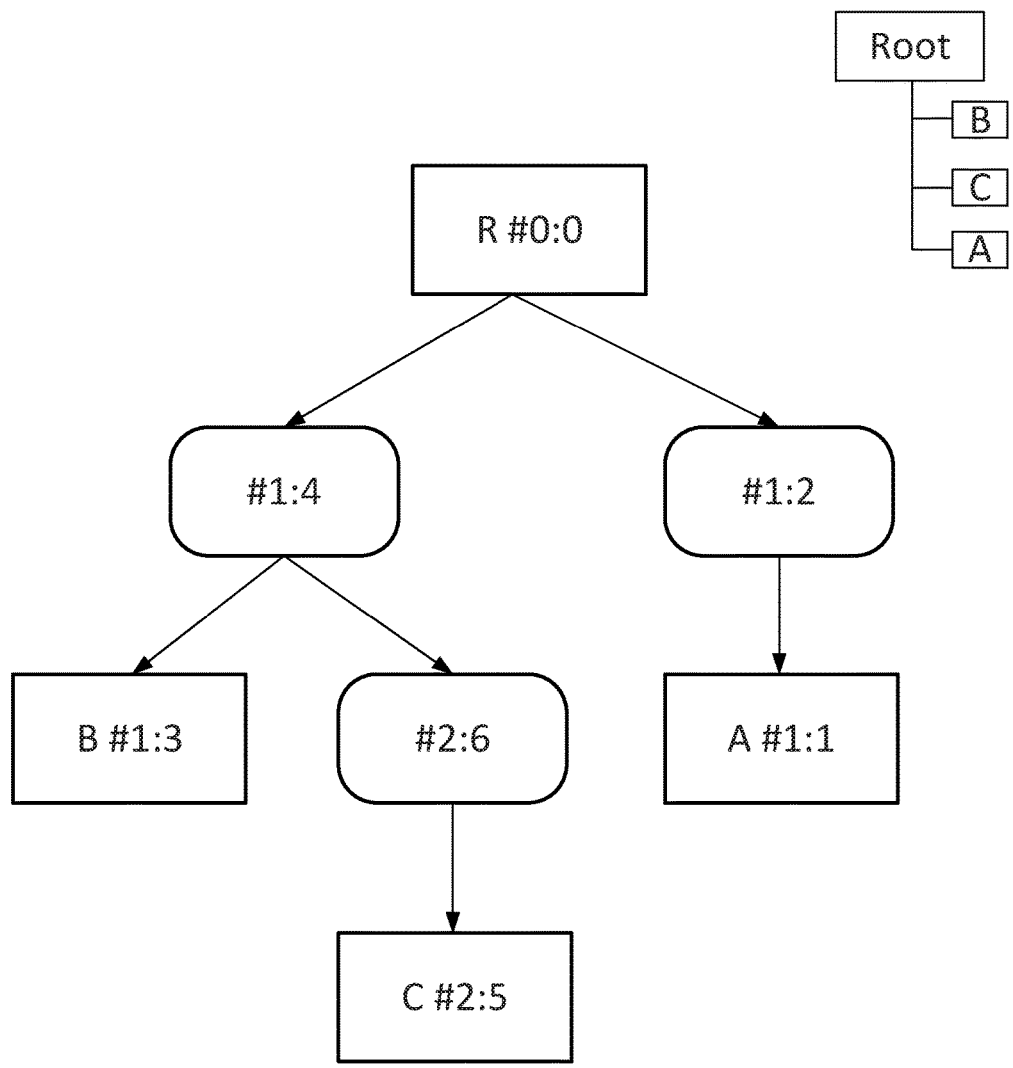
Figure 16B:
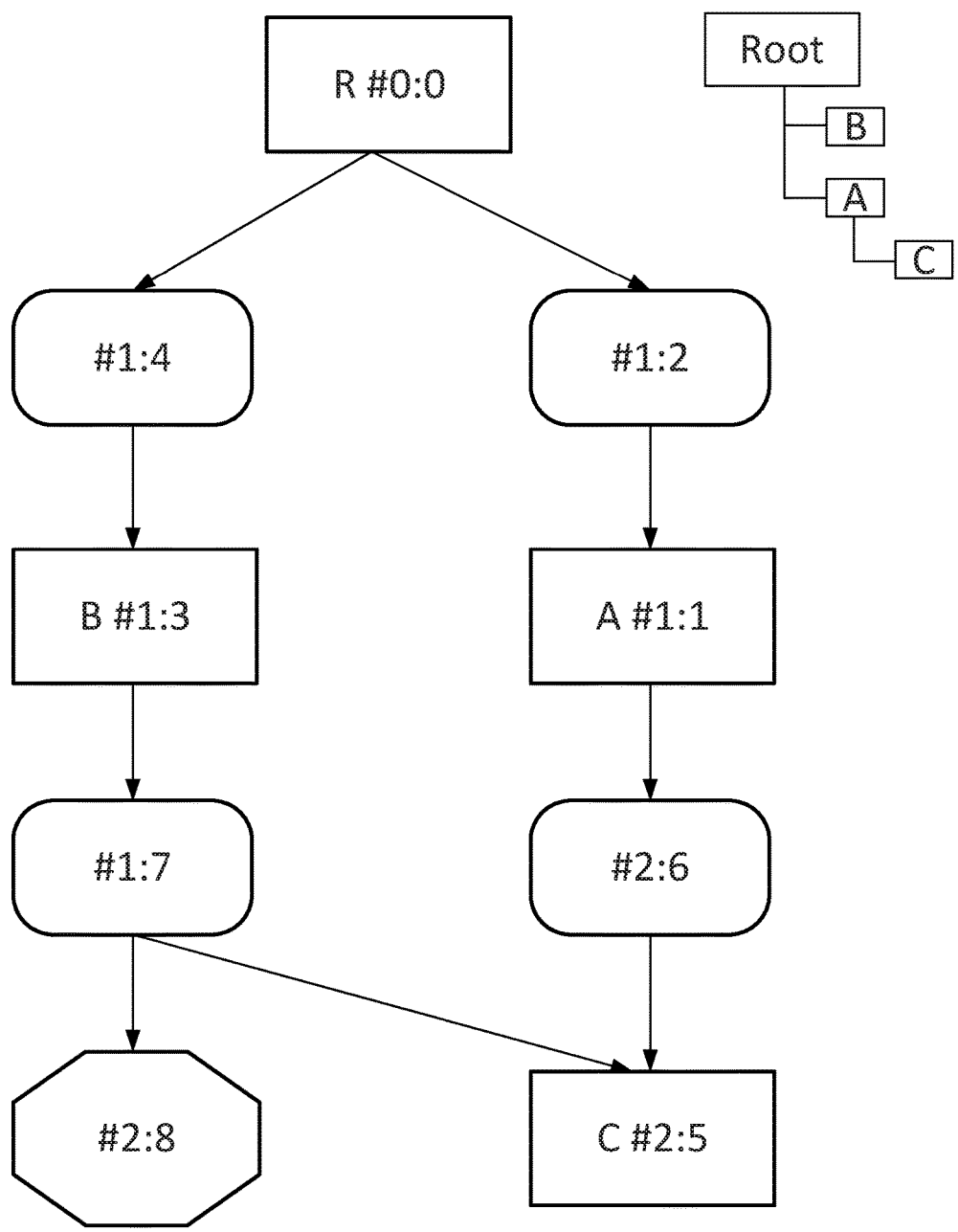
Figure 16C:
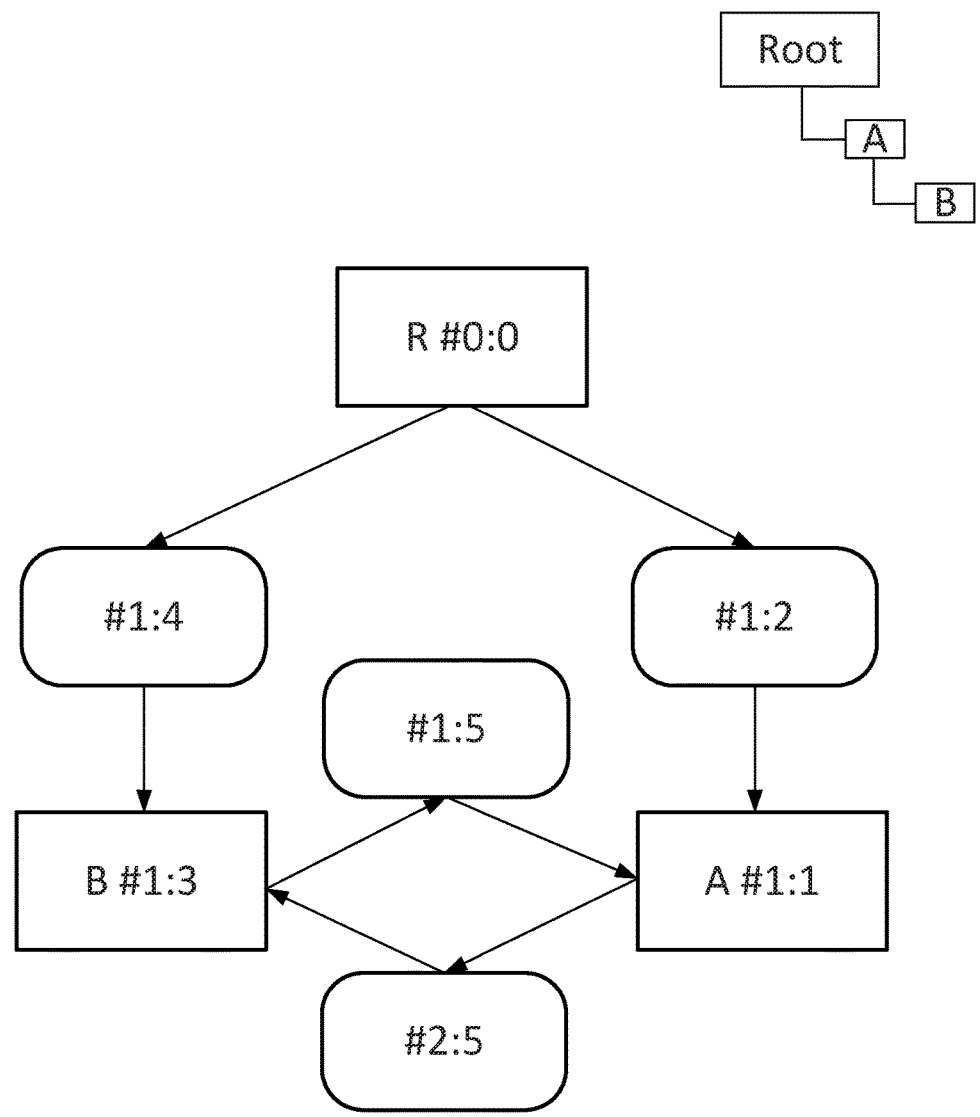
Figure 16D:
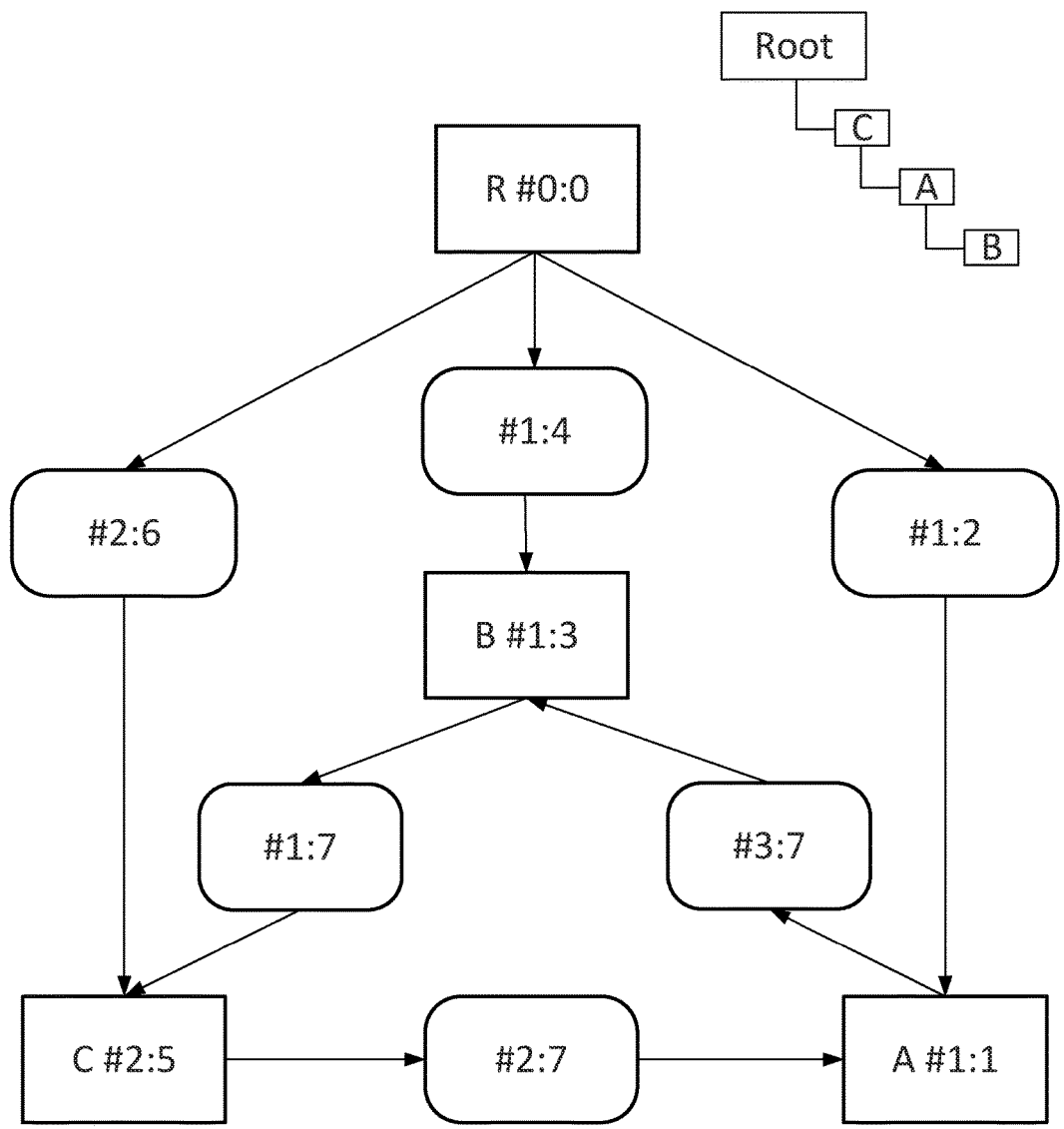

Turning to FIG. 16A, FIG. 16B, and FIG. 16D, examples of causal graphs and how they function will now be described. The causal graph of FIG. 16A includes vertices R#0:0, A#1:1, B#1:3, and C#2:5, which are nodes representing atoms of the causal graph (shown using right-angled-cornered rectangles). Vertices #1:2, #1:4, and #2:6 are transitions expressing the structural relationship among the nodes (shown using rounded-corner rectangles). The directed edges between vertices depict the causal relationships among the nodes and transitions. The causal graph is traversed (e.g., by a computing device) from its root node R to produce an ordered tree view of the relationship among its nodes. An example of a procedure to do so is as follows:

A possible implementation of the traversal as an ordered tree algorithm (also referred to herein as the Output Outline procedure) is as follows:

```
Data: G: a causal graph
Result: T: an ordered tree
// (1) Create a Flat-tree Node List
let F be a list of (node,transition) pairs, where (n;
    null)∈F⇔n∈G:nodes
for n∈G:nodes do
    let P be {pi∈G:transitions|pi:end=n}
    let pm be the youngest active pi∈P
    add (n, pm) to F
    (later: add cycle resolution)
end
// (2) Traverse Tree
func visit(v: vertex) do
    let C be the child transitions of v ordered by
        youngest (>)
    for c∈C do
        if (n, c)∈F for some n/\n is active then
            append n to T
            visit(n)
        end
        visit(c)
    end
end
append G.root to T
visit(G.root)
```

Delete(target) inserts a deletion vertex (a tombstone) causally linked to the target. All vertex types—including other deletions—can be deleted. In FIG. 16B, site 1 has deleted the transition moving C#2:5 under B#1:3 by inserting #2:8 under it. Deletion vertex #2.8 is shown as a an octagon in FIG. 16B.

Move(target, cause, after) could delete the existing node and insert a new one, but two or more simultaneous moves could unnecessarily duplicate large branch copies and yield an undesirable tree shape. Instead, move inserts a newer transition vertex representing the new location for the target node. During ordered-tree traversal of the causal graph the newer transition supersedes any older ones, respecting users' edit intentions. Turning to FIG. 16B, if the deletion #2:8 did not exist, the transition #1:7 would be newer than the transition #2:6, and atom or node C would be located under node B in the ordered tree. In FIG. 16B as it is shown, because of the deletion #2:8, node C is located under node A.

In practice, the nature of collaborative editing means it's possible for edits to take place "simultaneously" as far the converged causal graph state can tell. Consider the situation in FIG. 16C. Site 1 moves node A under node B at timestamp 5, while site 2 simultaneously moves node B under node A at the same timestamp. Once all edits propagate to all replicas of the data structure, a question arises as to how nodes A and B should be positioned in the ordered tree consistently.

An effective resolution to these cycles in the graph will produce an ordered tree that preserves commutativity while ideally also respecting user intentions. In an embodiment, the point in the above-described procedure marked add cycle resolution is carried out (e.g., by the computing device) as follows:

A possible implementation of the cycle resolution as a graph traversal algorithm (also referred to herein as the Loop Resolution procedure) is as follows:

```
Data: F a list of (node,transition) pairs
Data: (n, p_m) the latest pair added to F
Result: F after modifications to resolve cycles
repeat
    F←loopresolve(F)
until F does not change
func loopresolve(F) do
    let L be a list of transitions, initially empty
    let p=p_m
    while p∉L do
        if p is null V p.deleted then
            // no cycle created by r in F
            return
        end
        append p to L
        p←p' where (p.start, p')∈F
    end
    // cycle found, attempt to resolve
    for l∈L ordered by older (<) do
        let R be all transitions {r∈F|r.end=l.end}
        for r∈R ordered by older(<) do
            if r>l/\¬r.deleted then
                replace (n,l) with (n,r) in F
                return
            end
        end
    end
end
```

While setting the transitions in the Flat-tree Node List (FNL), if inserting a transition leads to the formation of a cycle, the oldest transition in the cycle is replaced with the next-older transition not causing a cycle. If no such transition is available, the next-oldest transition in the cycle is checked for a replacement, and so on. The search is guaranteed to terminate as the FNL has no cycles before inserting each transition, and ultimately any new transition could be rejected to preserve that. By disregarding older transitions to resolve cycles, user intentions are better respected as new move operations are appended.

A slightly more involved situation is shown in FIG. 16D. Prior to timestamp 7, the state of the graph would produce an ordered tree (R(CBA)). At timestamp 7 each of three sites moves a different node under some other node-prior to communicating their edits, they see three different ordered trees: site 1 sees (R(B(C)A)), site 2 sees (R(C(A)B)), while site 3 sees (R(CA)(B))). Once those edits are exchanged among all replicas, the traversal produces a single consistent ordered tree by rejecting transition #3:7 in stage (1) in favor of transition #1:4. Then stage (2) yields the ordered tree (R(B(C(A)))) shown in FIG. 17D.

In an embodiment, to be a practical data structure, the causal graph supports some additional operations, such as format and undo/redo. A format(target, key, value) operation involves another vertex type attribute, which associates key/value metadata with nodes. Attributes represent various properties that can be set on an element such as a document section name or visibility. Attribute vertices can be causally connected to nodes and can be deleted. The newest non-deleted format in a set of formats with the same key on the same node will be active and the rest inactive.

While undo(target) and redo(target) are treated as distinct operations a user may perform, in the data structure they are implemented as delete vertices on whatever edit vertex was undone or redone. This works as an undo of a deletion of a node appears as a deletion of that deletion, rendering the node undeleted. Formats and deletions can be deleted and undeleted in the same way.

Using this causal graph to support a document outline is straightforward: each node vertex represents a document section, with an attribute vertex storing the unique key identifying its section contents. Other formats store section titles, formatting properties like page margins or numbering style, etc. The ordered-tree traversal described above produces an outline structure for the current state of the document.

According to various embodiments, changes to a causal graph can be represented by different types of nodes. The use of structure nodes, transition nodes, deletion nodes, and attribute nodes will be described in the following sections. As will be shown, transition nodes help to facilitate changes. For example, by using transition nodes, moving a node representing a section of a document involves appending only one node to the causal graph data structure (the transition). Without a transition node, such a move would involve appending: (1) a deletion on the original, (2) a new structure node (section node), and (3) new attribute nodes copying all of the formats from the original. Put another way, using transition nodes provides an advantage in terms of space efficiency (i.e., less network storage needed) and network transmission efficiency (i.e., requires less bandwidth to execute). This allows collaboration without potentially ending up with duplicate parts of branches that could occur if, for example, two or more users were executing moves at the same time. In such case, both would delete the same original then create their own copies, resulting in duplicates. Using transition nodes makes such duplication impossible, since to resolve two or more users inserting transitions is as simple as sorting the transitions and determining which one is the currently active one that should be honored. The transitions make outlines and slides have superior collaboration while using less memory. A simple undo/redo/delete of a transition is also provided.

Additional technical advantages of using a causal graph as described herein include providing the ability to create much larger documents using a collaborative outline. The outline orders the collaborative rich-text to provide larger documents since only part of the document has to be loaded depending on what a user is looking at. At the same time, the outline is highly collaborative and allows for real-time modifications, e.g., the outline can be changed and the user sees those changes right away. The user's changes will be honored unless overwritten/undone by a user, whereas if this required the server to respond right away (in the non-causal graph approach) changes would take longer to be shown and two users changing two different things in the outline may result in one of the user's changes not taking effect.

Yet another technical advantage of using a causal graph is that this data structure can be used in multiple locations. For example, in the context of a slide presentation, it be for used for the outline of the presentation and for each individual slide as well. The order of the items on a slide (z-order/depth-order) may, for example, be based on the order of the nodes in the causal graph. The causal graph implementation described herein also provides a simple way to group items, sub-group items while inside a group, and order items while inside a group. Each slide (just like the outline) may be highly collaborative and show results in real-time without the delay of having to communicate with the server (although the changes will need to get to the server to be stored eventually, the changes are first applied on the client before being applied to the server).

Still another technical advantage of using a causal graph is that it facilitates an edge computing model in that most of the work is done on the client side (the user's computer) for determining the changes that need to be applied. The same data structure is used on all the user's machines and the server acts like a passive customer. The server runs the same data structure as the clients so it can apply the changes the same way one user will apply changes from a different user. This means the code only has to be written once to work on both sides.

Turning to FIG. 17, an example of a user interface 1700 containing content 1702 (e.g., text) of a document (in a main portion 1704 of the user interface) and an outline 1706 (in a side pane 1708) is shown. The various examples described herein may, in an embodiment, be used in a system in which multiple users (such as those of FIG. 1A) have access to a common document and can organize/reorganize sections via manipulating the outline shown in the left pane. In an embodiment, the outline 1606 of FIG. 16 is represented by the outline entity 136 of FIG. 1A and, when one or more users (e.g., editing the document 114 at the same time) manipulates the outline 1706 via the user interface 1700 (e.g., by dragging and dropping, "painting" a format of one section of the outline onto another section in their own instance of the user interface 1700), the productivity software 101 responds by making commensurate changes to the outline entity 136 (e.g., via the SaaS platform software 107).

In an embodiment, the outline entity is a causal graph that includes one or more nodes. Types of nodes that may be used include (1) a structure node, which represents part of a hierarchical structure, such as a level (e.g., a section) of a document outline; (2) a transition node, which represents a relationship between two structure nodes; (3) a deletion node, which represents a deletion of a node; and (4) an attribute node, which represents custom information for a node.

Turning to FIG. 18A, an example format of a structure node (which may be referred to as "Node") is shown. In this embodiment, the structure node:
 a. Has a causal-identifier
 b. Optionally has text, stored in an attribute node linked to the structure node, which is the name of the level represented by the node and can be shown in the outline on the user interface
 c. Represents an entry in the outline d. Can have formatting on it as attached attribute nodes
e. Can be deleted
f. Has a list of Parent Transitions
   i. These are not Causes since a Parent Transition can be added after the initial causation of the Node
g. Has a tree of Children Transitions
   i. Children are Transitions caused directly by this Node or any other Transition in the tree of Transitions for this Node For ease of reference, some of the nodes will be referred to by informal names such as "Node A, Node B, . . . " It is to be understood, however, that the nodes reference one another using the causal identifier.

Turning to FIG. 18B, an example format of a transition node (which may be referred to as "Transition") is shown. In this embodiment, the transition node:
a. Has a causal-identifier
b. Represents the relationship between two Nodes
   i. Has the Start Node
      1. The Start Node could be a method which traverses the Causes of Transitions until the Cause is a Node.
   ii. Has the End Node
c. Can be deleted
d. Takes part of a causal ordering
   i. Has its Cause, which may be the Start Node if the Start Node is its direct cause.
   ii. Has its Children which are Transitions caused directly by this Transition Turning to FIG. 18C, an example format of a deletion node (which may be referred to as "Deletion") is shown. In this embodiment, the deletion node:
a. Has a causal-identifier
b. Represents a Deletion
   i. Could be undo or redo
c. Can also be deleted Turning to FIG. 18D, an example format of an attribute node (which may be referred to as "Attribute") is shown. In this embodiment, the attribute node:
a. Has a causal-identifier
b. Represents some custom information for a Node
   i. Has a Type
   ii. Has a Value for the Type
   iii. Can be deleted Turning to FIG. 19A, a root node, along with a representation of the corresponding outline hierarchy configured in accordance with an embodiment is shown. In an embodiment, (1) Every outline has an initial topmost Root Node. (2) The Root Node always has the causal-identifier #0:0. (3) It will always have an empty Parent list. A special case check should enforce this when attempting to add a Transition into the Parents of the Root. (4) Nodes may have a method added to them, IsRoot, which simply checks if the causal-identifier #0:0.

Figure 19B:
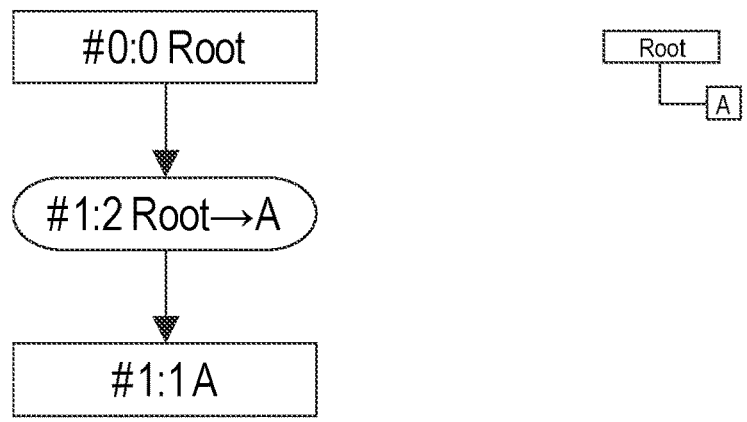

Turning to FIG. 19B, an example of inserting a node according to an embodiment will now be described. A user on the first computing device 100 interacts with the user interface (e.g., the user interface 1700 of FIG. 17), carrying out a gesture such as right-clicking and selecting "Add Level" on the outline 1706. In response to the gesture, the method InsertNewNode(#0:0) is carried out by the first computing device 100 as follows: Add a new Node directly under the Root
1. Create Node A with ID #1:1
2. Create Transition with ID #1:2
   a. Start Node is set to Root
   b. End Node is set to A
   c. Cause is set to Root
3. Insert Transition #1:2 into Children of Root
4. Insert Transition #1:2 into Parents of A
5. Display level represented by Node A on the outline 1706

Figure 19C:
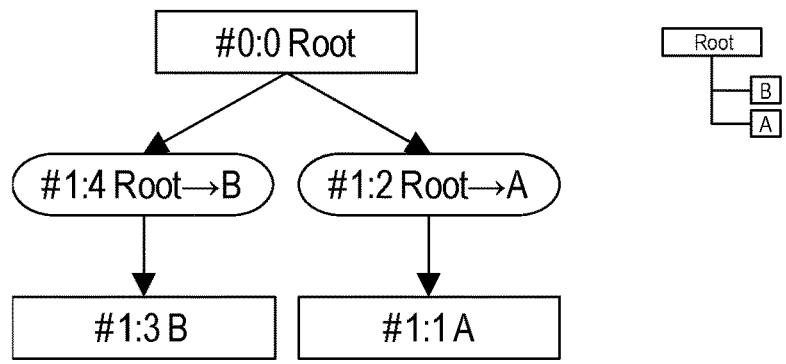

Turning to FIG. 19C, an example of inserting a node according to an embodiment will now be described. A user on the first computing device 100 interacts with the user interface (e.g., the user interface 1600 of FIG. 17), carrying out a gesture such as right-clicking and selecting "Add Level" on the outline 1706. In response to the gesture, the method InsertNewNode(#0:0, nil) is carried out by the first computing device 100 as follows: Add a new Node before A under the Root
1. Create Node B with ID #1:3
2. Create Transition with ID #1:4
   a. Start Node is set to Root
   b. End Node is set to B
   c. Cause is set to Root
3. Insert Transition #1:4 into Children of Root
4. Insert Transition #1:4 into Parents of B
5. Display level represented by Node B on the outline 1706

The children nodes are sorted from highest to lowest identifiers and read from left to right, therefore B is put above A in the output outline.

Figure 19D:
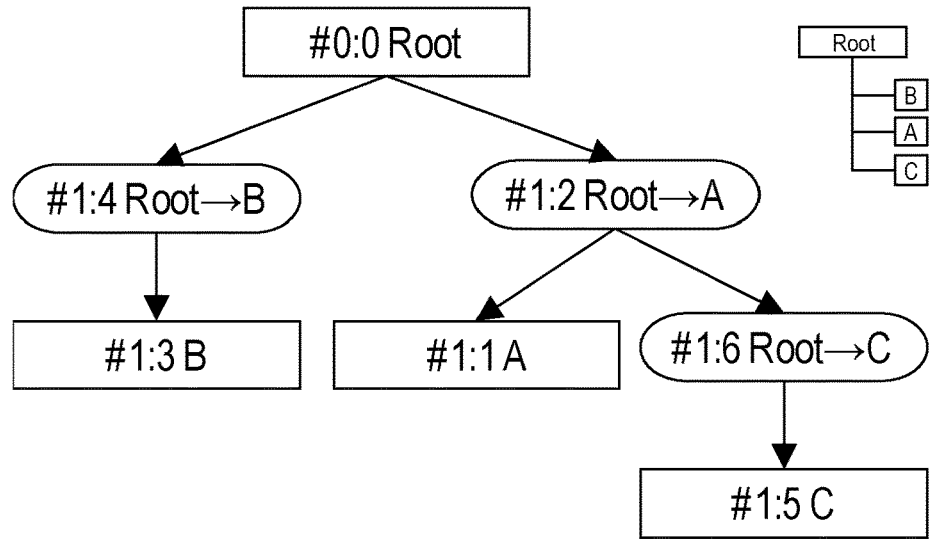

Turning to FIG. 19D, an example of inserting a node according to an embodiment will now be described. A user on the first computing device 100 interacts with the user interface (e.g., the user interface 1700 of FIG. 17), carrying out a gesture such as right-clicking and selecting "Add Level" on the outline 1706. In response to the gesture, the method InsertNewNode(#0:0, #1:1) is carried out by the first computing device 100 as follows:
Add a new Node after A under the Root
1. Create Node C with ID #1:5
2. Create Transition with ID #1:6
   a. Start Node is set to Root
   b. End Node is set to C
   c. Cause is set to #1:2
3. Insert Transition #1:6 into Children of Transition with ID #1:2
4. Insert Transition #1:6 into Parents of C
5. Display level represented by Node C on the outline 1706

The Transitions are a small causal-tree on each Node so that the sort order of the parent is consistent with latent collaborative edits.

Figure 19E:
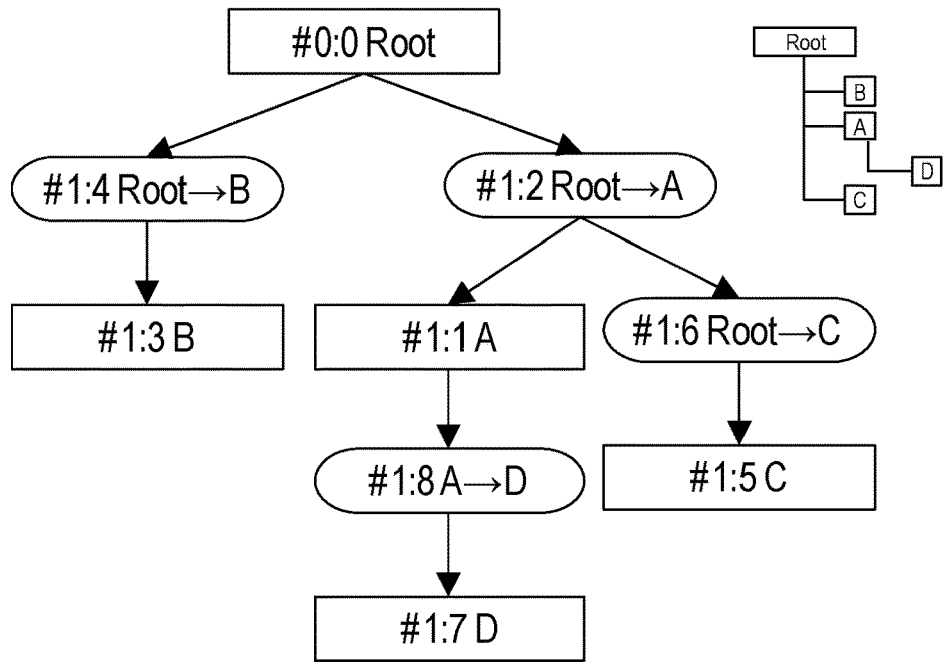

Turning to FIG. 19E, an example of inserting a node according to an embodiment will now be described. A user on the first computing device 100 interacts with the user interface (e.g., the user interface 1700 of FIG. 17), carrying out a gesture such as right-clicking and selecting "Add Level" on the outline 1706. In response to the gesture, the method InsertNewNode(#1:1) is carried out by the first computing device 100 as follows: Add a new Node directly under the A
1. Create Node D with ID #1:7
2. Create Transition with ID #1:8
   a. Start Node is set to A
   b. End Node is set to D
   c. Cause is set to A
3. Insert Transition #1:8 into Children of A 4. Insert Transition #1:8 into Parents of D
5. Display level represented by Node D on the outline 1706

Each Node has its own small causal-tree of Transitions for the individual levels of the outline.

Turning to FIG. 20A, an example of deleting a node according to an embodiment will now be described. A user on the first computing device 100 interacts with the user interface (e.g., the user interface 1700 of FIG. 17), carrying out a gesture such as right-clicking and selecting "Delete Level" on the outline 1706. In response to the gesture, the method DeleteNode(#1:1) is carried out by the first computing device 100 as follows:

Add a Delete to Node A
1. Create Deletion with ID #1:5
   a. Cause set to A
2. Insert Deletion #1:5 into Deletions of A
3. Remove level represented by Node A (and any sublevels) from the displayed outline 1706

Node A will no longer be in the output outline. This deletion could be created as an undo of inserting Node A.

Turning to FIG. 20B, an example of deleting a node according to an embodiment will now be described. A user on the first computing device 100 interacts with the user interface (e.g., the user interface 1700 of FIG. 17), carrying out a gesture such as right-clicking and selecting "Delete Level" on the outline 1706. In response to the gesture, the method DeleteNode(#1:1) is carried out by the first computing device 100 as follows:

Add a Delete to Node A
1. Create Deletion with ID #1:7
   a. Cause set to A
2. Insert Deletion #1:7 into Deletions of A
3. Remove level represented by Node A (and any sublevels) from the displayed outline 1706

Node A and all of its descendants will not be in the output outline. Its descendants, including Node B, are a type of orphaned Node. These orphaned Nodes are not to be confused with orphans caused by edits being received out of order or edits being lost.

In an embodiment, a Deletion may not be added to a Root Node. Thus, if the computing device attempts to add a Deletion to the Root Node (e.g., DeleteNode(#0:0)), a special case check may be implemented to enforce this prohibition.

Turning to FIG. 21A, an example of formatting a node according to an embodiment will now be described. In an embodiment, formatting the node has the effect of applying the formatting to the section entity associated with or represented by the node. A user on the first computing device 100 interacts with the user interface (e.g., the user interface 1700 of FIG. 17), carrying out a gesture such as right-clicking and selecting "Format" on the outline 1706. In response to the gesture, the method Format(#1:1, Width, "20") is carried out by the first computing device 100 as follows:

Add a Format to Node A
1. Create Format with ID #1:3
   a. Cause set to A
   b. Type set to Width
   c. Value set to "20"
2. Insert Format #1:3 into Formats of A
3. Display the section corresponding to the level represented by Node A (e.g., in the side pane 1708) with its new formatting (e.g., with a width of 20)

Formats can be added as additional information for how a Node should be drawn or for information relating to what the Node represents. Formats are a type of Attribute nodes.

Turning to FIG. 21B, an example of formatting a node according to an embodiment will now be described. A user on the first computing device 100 interacts with the user interface (e.g., the user interface 1700 of FIG. 17), carrying out a gesture such as right-clicking and selecting "Format" on the outline 1706. In response to the gesture, the method Format(#1:1, Height, "30") is carried out by the first computing device 100 as follows:

Add another Format to Node A
1. Create Format with ID #1:4
   a. Cause set to A
   b. Type set to Height
   c. Value set to "30"
2. Insert Format #1:4 into Formats of A
3. Display the section corresponding to the level represented by Node A (e.g., in the side pane 1708) with its new formatting (e.g., with a height of 30)

A Node may contain any number of unique Formats or other Attributes.

Turning to FIG. 21C, an example of formatting a node according to an embodiment will now be described. A user on the first computing device 100 interacts with the user interface (e.g., the user interface 1600 of FIG. 17), carrying out a gesture such as right-clicking and selecting "Format" on the outline 1706. In response to the gesture, the method Format(#1:1, Width, "24") is carried out by the first computing device 100 as follows:

Add another Format to Node A
1. Create Format with ID #1:5
   a. Cause set to A
   b. Type set to Width
   c. Value set to "24"
2. Insert Format #1:5 into Formats of A
3. Display the section corresponding to the level represented by Node A (e.g., in the side pane 1708) with its new formatting (e.g., with a width of 24)

When a Format type is repeated they both will be added into the same list in the format map. The list is sorted by newest to oldest causal-identifier (e.g., sorted by highest identifier to lowest identifier). The newest Format (e.g., the Format with the highest identifier) contains the value to use. In the example shown in FIG. 21C, the content in Node A will have a width of "24", since format node #1:5 is newer—with a higher identifier—than format node #1:3.

Turning to FIG. 22A, an example of moving a node according to an embodiment will now be described. Starting with the outline shown in FIG. 19C, a user on the first computing device 100 interacts with the user interface (e.g., the user interface 1700 of FIG. 17), carrying out a gesture such as dragging a level from one part of the outline to another. In response to the gesture, the method MoveNode (#1:3, #1:2) is carried out by the first computing device 100 as follows:

Move Node B to after A under the Root
1. Create Transition with ID #1:5
   a. Start Node is set to Root
   b. End Node is set to B
   c. Cause is set to #1:2
2. Insert Transition #1:5 into Children of #1:2
3. Insert Transition #1:5 into Parents of B
4. Display the outline with the level represented by Node B under the level represented by Node A When determining placement of a Node in the output outline, usually the highest transition (the transition with the highest ID) is taken (more information about how the output is created see the Output Outline procedure and the Loop Resolution procedure, which are described above).

Turning to FIG. 22B, an example of moving a node according to an embodiment will now be described. Starting with the outline shown in FIG. 19E, a user on the first computing device 100 interacts with the user interface (e.g., the user interface 1700 of FIG. 17), carrying out a gesture such as dragging a level from one part of the outline to another. In response to the gesture, the method MoveNode (#1:7, #1:3) is carried out by the computing device as follows:

Move Node D directly under Node B
1. Create Transition with ID #1:9
   a. Start Node is set to B
   b. End Node is set to D
   c. Cause is set to B
2. Insert Transition #1:9 into Children of B
3. Insert Transition #1:9 into Parents of D
4. Display the outline with the level represented by Node D under the level represented by Node A In an embodiment, any move can be performed by simply adding a new Transition between those two Nodes.

Figure 23A:
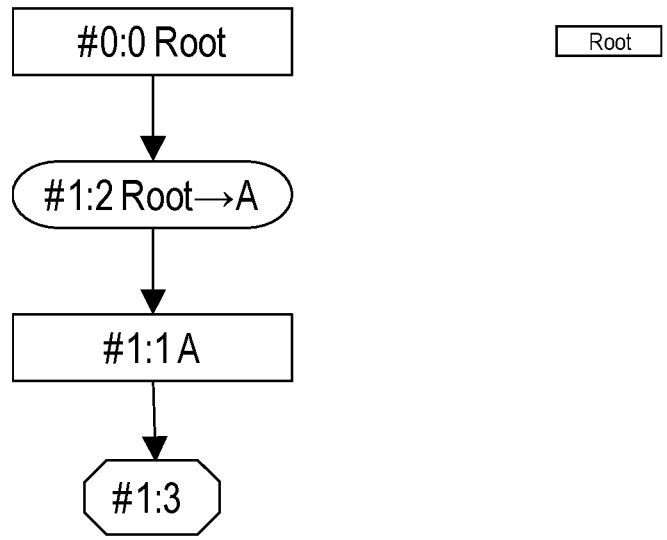

Turning to FIG. 23A, an example of undoing a node-related action according to an embodiment will now be described. A user on the first computing device 100 interacts with the user interface (e.g., the user interface 1700 of FIG. 17), carrying out an action such as clicking the "undo" button. In response, the method Undo( ) is carried out by the first computing device 100 as follows:

Undo inserting a new Node, add a Deletion to the Node
1. Create Deletion with ID #1:3
   a. Cause is set to A
2. Insert Deletion #1:3 into Deletions of A
3. Delete the level represented by Node A (assuming that the previous action was inserting it) from the displayed outline Any Node which is deleted should not be rendered and any Transition to a deleted Node can be ignored.

Figure 23B:
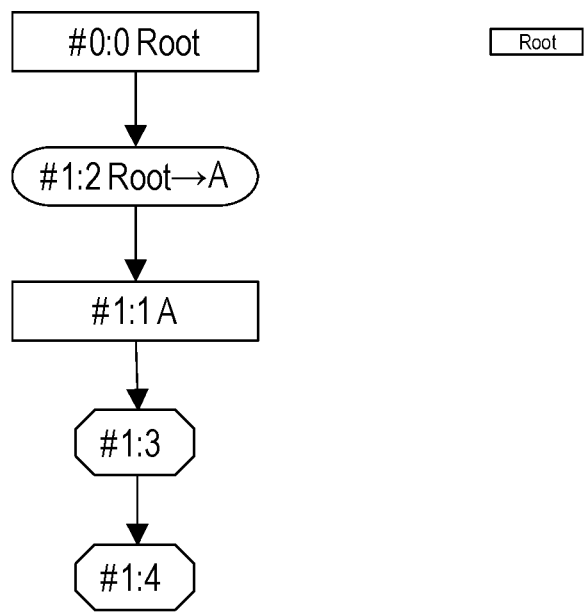

Turning to FIG. 23B, an example of undoing a node-related action according to an embodiment will now be described. A user on the first computing device 100 interacts with the user interface (e.g., the user interface 1700 of FIG. 17), carrying out an action such as clicking the "undo" button. In response, method Undo( ) is carried out by the first computing device 100 as follows:

Undo a deletion, add a Deletion to the Deletion
1. Create Deletion with ID #1:4
   a. Cause is set to #1:3
2. Insert Deletion #1:4 into Deletions of #1:3
3. Re-insert the level represented by Node A (assuming that the previous action was deleting it) into the outline A Deletion on a Deletion means the original Deletion should be ignored. If the depth of the Deletions is odd then the main cause is deleted, if the depth is even then the main cause is not deleted. This means that a deletion caused by an Undo can be undone which will in essence Redo the action.

Figure 23C:
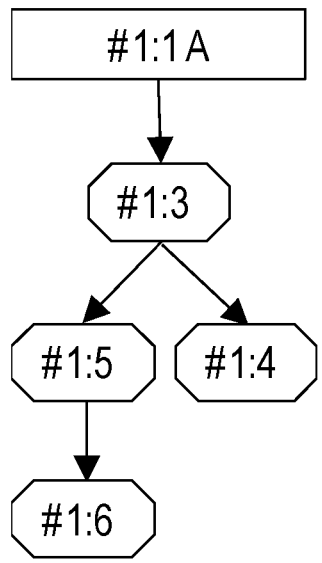

Turning to FIG. 23C, an example of undoing a node-related action according to an embodiment will now be described. In response to the appropriate user input, the first computing device 100 carries out the following actions:
1. Look for the first non-deleted Deletion to indicate if the deletion should be honored.
2. To determine if Node A #1:1 is deleted or not the computing device will query Deletion #1:3. Deletion #1:3 checks with its newest deletion which is Deletion #1:5. Deletion #1:5 checks with its newest deletion which is Deletion #1:6. Deletion #1:6 has no deletions so it should be honored, which means Deletion #1:5 should be ignored. Since Deletion #1:5 is ignored, Deletion #1:3 checks with the next newest deletion, Deletion #1:4, which has no deletions indicating it should be honored. Since Deletion #1:3 has at least one honored deletion, Deletion #1:3 should be ignored. #1:1 is therefore rendered.

Figure 23D:
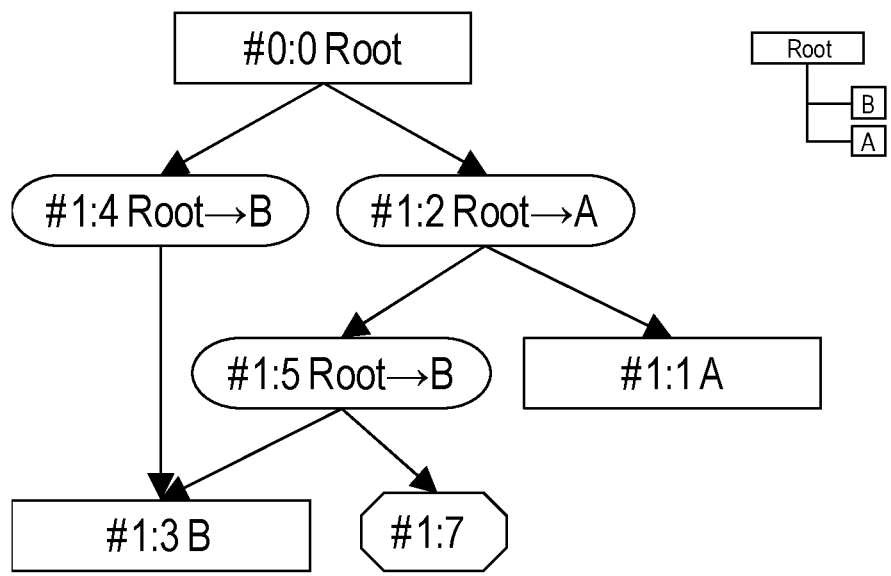

Turning to FIG. 23D, an example of undoing a node-related action according to an embodiment will now be described. Starting from the outline shown in FIG. 22A, in response to the appropriate user input, the method Undo( ) is carried out by the first computing device 100 as follows:

Undo a Move, add a Deletion to #1:5
1. Create Deletion with ID #1:7
   a. Cause is set to #1:5
2. Insert Deletion #1:7 into Deletions of #1:5
3. Move the appropriate level or levels back to their previous state When determining placement of a Node in the output outline, any Transition which has a deletion added to it should be ignored and the next highest non-deleted Transition should be used. All Children of a deleted Transition are still valid and should be traversed when creating the Outline Output unless the child themselves are deleted. Every Transition under will be evaluated in sorted depth first order unless they themselves are marked as deleted.

Figure 23E:
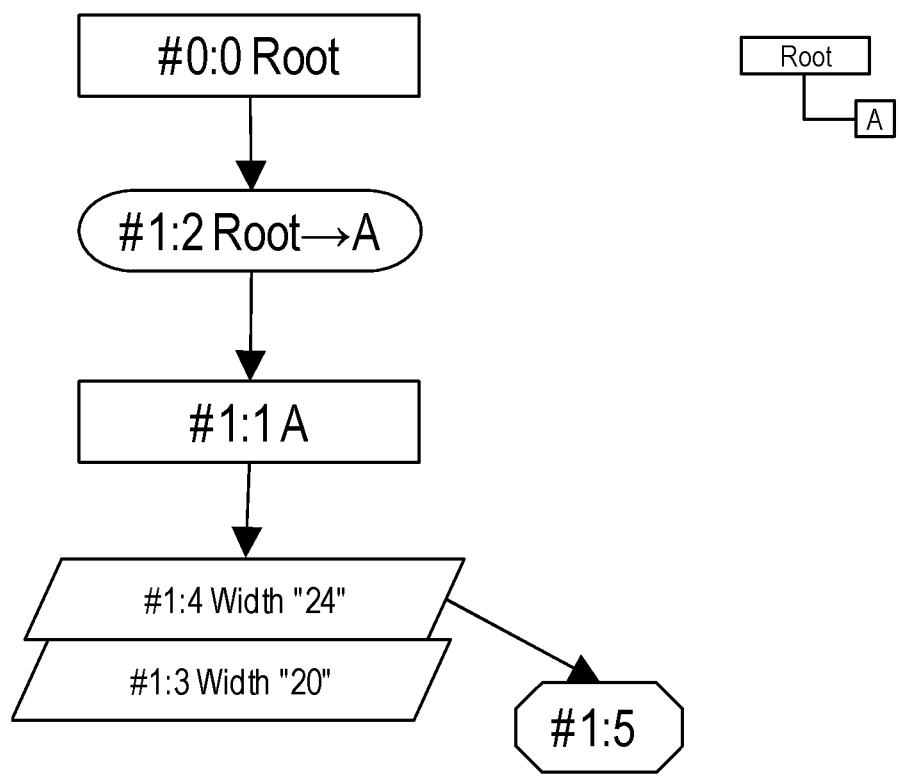

Turning to FIG. 23E, an example of undoing a node-related action according to an embodiment will now be described. In response to the appropriate user input, the method Undo( ) is carried out by the first computing device 100 as follows: Undo a format or add a Deletion to the Format
1. Create Deletion with ID #1:5
   a. Cause set to #1:4
2. Insert Deletion #1:5 into Deletions of #1:4
3. Change the text of the appropriate section back to its previous state (i.e., prior to the formatting that is the subject of the "undo"

When a Format has been deleted the next highest non-deleted Format will indicate the value for that Type of Format. A similar procedure can be carried out for other types of Attribute nodes.

Turning to FIG. 24A, an example of how the computing device outputs an outline using a causal graph will now be described. To quickly generate the output and to help with Loop Resolution (discussed above and in the next section), the output outline will be built in reverse starting from an End Node and determining its Start Node. The general steps are as follows:
1. Create Flat-tree Node List (FNL)
2. Determine Transition list
3. Traverse tree Turning to FIG. 24B, an example of how the computing device creates a Flat-tree Node List will now be described. The computing device takes the following actions:
1. Gather all the Nodes into a list including deleted Nodes. The list entries should contain a Node and a Transition.
2. The list should be sorted by the Node's causal-identifiers to ensure that every client device processes the Nodes in the same order. (A list of the Nodes can be kept in sorted order for storing and accessing Nodes. The FNL could simply be a copy of all nodes from that presorted list.)
3. Some additional fields will be added later to help speed up the Loop Resolution.

Turning to FIG. 24C, an example of how the computing device determines a transition list will now be described. The computing device takes the following actions:

1. Skip the Root Node since it will never have a Transition. For all remaining nodes, write the newest Transition in the Transition list part of the FNL.
2. Using this FNL, a tree can be constructed but it will not have the order of the children in the Start Node. The "Traverse tree" step will show how that is done.
3. This step is simplified for this case because there were no loops. See Loop Resolution for the full description of this step.

To traverse the tree according to an embodiment, the computing device, using the resulting Transition list, walks the tree outputting the Nodes into the outline. The computing device in this embodiment only takes transitions to their End Node when they show up in the Transition list. The Transition list can be grouped using their Start Nodes and sorted by causal-identifier to make checking for a Transition in the list much faster.

To walk the tree in an embodiment, the computing device takes the newest child Transition that is in the list and does a full depth first tree traversal, keeping a stack of Nodes to speed up the process.

More specifically, in an embodiment, the computing device: (1) generates an Output #0:0 Root and pushes it on a Node stack; (2) follows Transition #1:4 because it's in the Transition list; outputs #1:3 B as a child of the Node on the top of the Node stack, i.e., #0:0; (3) pushes #1:3 B on to stack; (4) follows Transition #1:9; (5) outputs #1:7 D as child of #1:3 B and pushes #1:7 D onto stack; (6) #1:7 D has no children so the computing device pops it off stack and returns to Transition #1:9; (7) Transition #1:9 has no children so the computing device returns to #1:3 B; (7) #1:3 B has no children so the computing device pops it off the stack and returns to #0:0 Root; (8) the computing device follows Transition #1:2; (9) outputs #1:1 A as a child of #0:0 Root; (9) ignores Transition #1:8 because it is not in the Transition list; (10) pops #1:1 A off stack; (11) follows Transition #1:6; (12) outputs #1:5 C as a child of #0:0 Root; (13) pops, pops, pops, and is done. The resulting Outline Output is shown in FIG. 24A.

Turning to FIG. 24D and FIG. 24E, another example of reading a tree will now be described. In this example, there is a deleted node. (1) The deleted Nodes should be treated normally when creating the FNL. However, when walking the tree, the computing device outputs #0:0 and puts it onto the stack, then looks into Transition #1:2. (2) Because #1:1 A is deleted by Deletion #1:7, the computing device does not output it. The Transitions of #1:1 should not be taken, meaning #1:3 B is also not outputted. (3) Transition #1:6 is a child of #1:2 A so it is checked, found in the Transition List and taken. (4) The computing device outputs #1:5 C as a child to #0:0. (5) The computing device pops, pops, and is done.

Turning to FIG. 24F and FIG. 24G, another example of reading a tree will now be described. In this example, there is a deleted transition through Deletion #1:8. This scenario happens when A is added to the Root. B is added to the Root before A. Then B is moved after A. C is added to the Root after B. Then the movement of B is undone. (1) Even though Transition #1:5 has been deleted by Deletion #1:8, Transition #2:7 is still evaluated by the computing device so that C is outputted. C will be after A because the Transitions are still read in order. (2) Transition #1:5 is simply not allowed by the computing device to be used in the output but its children are still used.

Turning to FIG. 25A through FIG. 25S, an example of how a computing device (such as a server) resolves loops according to an embodiment will now be described. A loop in an outline may occur if two other computing devices (e.g., clients) try to make a move (e.g., both try to move a section in the outline at the same time).

In the first example, a first computing device receives the request MoveNode(#1:3, #1:1) from a second computing device and receives the request MoveNode(#1:1, #1:3) from a third computing device.

Turning to FIG. 25A, B became a child of A whilst A became a child of B. If the method of Output Outline is run, #0:0 will be outputted but neither #1:3 B nor #1:1 A will be outputted. To resolve this a new subroutine is added into the "Determine Transition list" step. This subroutine is for setting the next oldest Transition in the Transition list. Part of this method involves the computing device checking for loops. Turning to FIG. 25B, the computing device creates the FNL. To help speed up loop detection, the first computing device adds another list of parent indices. The parent indices are the index of the Start Node for the selected transition in the FNL. In another embodiment, the computing device uses a pointer to reference the Start Node instead of the parent index.

The index corresponds to the column number of a Node in the FNL, with the Root having a index of 0. For example, in the FNLs shown in FIGS. 25B to 25E, #0:0 Root has an index of 0, #1:1 A has an index of 1, and #1:3 B has an index of 2.

Turning to FIG. 25C, the first computing device does the following: (1) As before, skip over Root. (2) Run the next oldest Transition subroutine on #1:1 A. (3) Since there is no Transition set yet, simply determine the newest parent for #1:1 A, which will be Transition #2:5. (4) Write that to the list and look up the parent index of the Transition #2:5. (5) Since the Start Node in Transition #2:5 is the Node B, put Node B's index, 2, in the parent index of A. (6) To detect a loop, follow the parent index until either a −1 or the current index. If the current index is reached a loop has been found.

Turning to FIG. 25D, the first computing device does the following: (1) Run the next oldest Transition subroutine on #1:3 B. (2) Set the Transition to the newest, Transition #1:5, and since the Start Node is A, put Node A's index, 1, in the parent index of B. (3) Check for loops starting at the current index, which is 2. The parent in 2 is 1. (4) Follow 1 to A and find that its parent is 2, the current index, meaning there a loop was found. (5) To resolve the loop, first follow the parents again, except this time keep the index of the Node with the oldest Transition which has a valid fall back. (6) A valid fall back is at least one non-deleted even older Transition from the same Node. In this case, the oldest Transition in the loop is #1:5 at index 2.

Turning to FIG. 25E, the first computing device does the following: (1) The next part of resolving the loop, is to run the next oldest Transition subroutine on the Node with the oldest Transition in the loop. (2) In this case, the oldest Transition in the loop is Transition #1:5 at index 2, so the computing device gets the next oldest Transition for #1:3 B before Transition #1:5, which is Transition #1:4. (3) Write Transition #1:4 to the list and update the parent index to 0. (5) Check that the new Transition doesn't cause a loop itself (6) If it does, repeat the loop resolution. Since there is at least one Transition for every Node which cannot be part of a loop because of how Nodes are inserted, no matter how complicated the loop is eventually it will resolve consistently.

Now that the loop is resolved, the first computing device will output the outline shown in FIG. 25F (on the right) with the discovered Transition list (of FIG. 25E). Outputting the outline may involve the first computing device transmitting the outline to the second and third computing devices.

Turning to FIG. 25G and FIG. 25H, another example of resolving a loop according to an embodiment will now be described-this time the loop is created by receiving three conflicting move commands. In this example, the first computing device receives the following three move requests from a second, a third, and a fourth computing device: MoveNode(#1:1, #1:5), and MoveNode(#1:5, #1:3), MoveNode(#1:3, #1:1). The first computing device: (1) First creates the FNL (FIG. 25H) and fills it out normally. (2) Once index 3, Node C, has the next oldest Transition subroutine run on it, a loop is detected. The oldest Transition in the loop is Transition #1:7 at index 3. (3) Run the next oldest Transition subroutine run on index 3 again, which will resolve the loop and replace the Transition #1:7 with Transition #1:6 and parent index with 0 (FIG. 25I). (4) Now that the loop is resolved, the first computing device outputs an outline with the structure shown in FIG. 25K.

The loop resolution procedure described above honors every user's edits. Even if the edit is ignored to resolve the loops, the edits will still be there. For example, given the tri-move cycle described above, if the fourth computing device undoes its move, this will resolve the loop differently causing others sites moves to be honored, as shown in FIG. 25L and FIG. 25M.

Turning to FIG. 25N and FIG. 25O, if the second computing device undoes its move, this undo will appear to have no effect because it will undo the Transition which was ignored during loop resolution. However additional edits and the history would reflect the change by the second computing device.

Turning to FIG. 25P and FIG. 25Q, if the third computing device undoes its move, this will resolve the loop differently causing others users' moves to be honored. As it can be seen by one of the users undoing a move the other two moves are expressed. This may cause some odd looking behavior which would easily be explained by a user looking at the change history.

Turning to FIG. 25R and FIG. 25S, an example of a potential problem with the loop resolution procedure described above will now be described. In this example, the first computing device receives a MoveNode(#1:3, #0:0) request. A loop resolution has ignored Transition #1:7 via a user moving B from the child of A to the front of the root. This will break the loop which will make Transition #1:7 to become honored. To the user, it may appear that C ended up in the wrong location (see FIG. 25S) but careful study of the history would show that the second computing device had made that move a while ago. This won't feel very intuitive to the user, especially if it has been months since the original loop was created. Possible solutions to this problem according to various embodiments will now be described.

Turning to FIG. 26, a series of actions carried out by the first computing device in order to address the potential problems includes the following: Run the Output Outline. Any Transitions that are ignored are then determined to be no longer needed and have a Deletion added to them. This should be done on load or very rarely. In an embodiment, this idea could be extended to deleting orphaned Nodes on load. An orphaned Node is caused by either a lost edit or a Deleted parent (e.g., Deleted by the first computing device). This would reduce the size of the flat-tree Node lists and make outputting faster. This may not be done while a user still has the option to undo the parent deletion or while an edit may still be in progress.

Turning to FIG. 27, a method that a computing device carries out to serialize the nodes of a causal graph (e.g., store the graph in a file) in an embodiment will now be described. The computing device serializes each Node and its child Transitions. In an embodiment, Parent Transitions and causes are not serialized because they can be determined by child Transitions and children nodes. While deserializing (e.g., reading or loading the tree from the file), the computing device creates the sorted list of Nodes. When a Node is being read or a Node is referenced by an identifier in a Transition, the computing device creates a blank Node and adds it to the list. The computing device sets parents when connecting Transitions and sets causes when setting children. Put in another way, the computing device does not need to store the identifier of a start Node or an end Node when serializing a Transition. When deserializing, after the computing device has attached all Transitions into the causal graph, the computing device can go from every Node and traverse the Transitions until it gets to the parent Node to determine the start and end identifiers. The Parent Transitions do not need to be stored since they can be re-determined on load. In another embodiment, the Parent Transitions may be stored to speed up deserialization.

Turning to FIG. 28, in an embodiment, a computing device uses proxies to handle orphan nodes that are caused by lost edits or out-of-order edits. For the sake of simplicity, the computing device keeps a list of edits that cannot be applied. Whenever a new edit comes in, the computing device applies that edit and then checks any pending edits.

Turning to FIG. 29A and FIG. 29B, an example of how the techniques described herein can be used in the context of presentation software will now be described. In an embodiment, for a slide in a presentation (e.g., the slide shown in FIG. 29A), the Z-depth ordering of the items on the slide is carried out (e.g., by the first computing device) using a causal graph (e.g., as shown in FIG. 29B). The depth is determined by the node that comes first. The depth can be collaboratively modified by users using a "bring forward" or similar menu selection on the user interface. The depth will resolve even when two or more users move items to the "same" depth—similar to how nodes would be resolved in outlines when dragged to the same location. Items can also be grouped by having a node that is the "group" node and items in the group are under that group's level.

In various embodiments, a computing device (e.g., the first computing device 100) displays at least one slide that has z-depth-ordered items and maintains (e.g., in a non-transitory computer-readable medium) a causal graph data structure representing the z-depth ordering of the items (in which each structure node represents a level in the z-depth ordering). The computing device can then receive, via the user interface, the same sorts of inputs described above with respect to an outline (e.g., the insertion or deletion of a level, the movement of one or more levels (e.g., representing a change in the z-depth ordering), and the change in an attribute of a level (e.g., the formatting of a z-depth level)), and reacts in the same ways described herein with regard to analogous actions being taken on outlines. The computing device then updates the user interface to reflect the action taken.

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope as set forth in the following claims. For example, the actions described herein can be reordered in ways that will be apparent to those of skill in the art.

What is claimed is:

1. A method for maintaining a document outline on a user interface, the method comprising:
   displaying the document outline on the user interface;
   maintaining, in a non-transitory computer-readable medium, a causal graph data structure representing the document outline, wherein the causal graph data structure includes a plurality of structure nodes, each structure node representing a level of the document outline;
   receiving, via the user interface, an insertion of a new level to the document outline;
   in response to the insertion, defining a structure node that represents the inserted level;
   inserting a transition node in the causal graph data structure, wherein the transition node represents a relationship between the structure node and at least one other node of the causal graph data structure;
   inserting the structure node into the causal graph data structure as a child of the transition node;
   updating the user interface to display the inserted level within the document outline;
   receiving, via the user interface, an input of an undo instruction;
   in response to the undo instruction, inserting, in the causal graph data structure, a deletion node as a child of the structure node; and
   updating the user interface to remove the level represented by the structure node.

2. The method of claim 1, wherein inserting a transition node comprises inserting the transition node as a child of a second transition node, wherein the second transition node is a child of the structure node.

3. The method of claim 1, wherein inserting a transition node comprises inserting the transition node as a child of the structure node.

4. The method of claim 1, wherein text to be displayed as a title for the inserted level is contained in an attribute node linked to the structure node.

5. The method of claim 1, wherein the inserted structure node includes at least one identifier of a parent node.

6. The method of claim 1, wherein the inserted structure node includes at least one identifier of a child node.

7. The method of claim 1, further comprising:
   receiving, via the user interface, a deletion of a level of the plurality of levels;
   in response to the deletion, inserting, in the causal graph data structure, a deletion node as a child of a structure node representing the level for which the deletion was received, wherein the deletion node refers to the level that is to be deleted; and
   updating the user interface to remove the level for which the deletion was received.

8. The method of claim 1, further comprising:
   receiving, via the user interface, a formatting of a level of the plurality of levels;
   in response to the formatting, inserting an attribute node as a child of a structure node representing the level for which the formatting was received, wherein the attribute node indicates the type of formatting that is to be applied;
   applying the formatting to a section of the document within the level being formatted; and
   updating the user interface to display the updated formatting of the section.

9. A method for maintaining a document outline on a user interface, the method comprising:
   displaying the document outline on the user interface, wherein the document outline includes a plurality of levels;
   maintaining, in a non-transitory computer-readable medium, a causal graph data structure representing the document outline, wherein the causal graph data structure includes a plurality of structure nodes, each structure node representing a different level of the plurality of levels;
   receiving, via the user interface, a deletion of a level of the plurality of levels;
   in response to the user deletion, inserting, in the causal graph data structure, a deletion node as a child of the structure node representing the level for which the deletion was received, wherein the deletion node refers to the level that is to be deleted;
   updating the user interface to delete the level for which the deletion was received;
   receiving, via the user interface, an undo of the deletion of the level;
   in response to the received undo, inserting, in the causal graph data structure, a second deletion node as a child of the deletion node; and
   updating the user interface to re-display the level for which the deletion was received.

10. The method of claim 9, wherein the second deletion node includes an identifier of the deletion node.

11. The method of claim 9, wherein the deletion node includes an identifier of the structure node to be deleted.

12. A method for maintaining a document outline on a user interface, the method comprising:
    displaying the document outline on the user interface, the document outline comprising a plurality of levels, each of the plurality of levels representing a different section of a document;
    maintaining, in a non-transitory computer-readable medium, a causal graph data structure representing the document outline, wherein the causal graph data structure includes a plurality of structure nodes, each structure node representing a different level of the plurality of levels;
    receiving, via the user interface, a formatting of a level of the plurality of levels;
    in response to the formatting, inserting an attribute node as a child of the structure node representing the level for which the formatting was received, wherein the attribute node indicates the type of formatting that is to be applied;
    applying the indicated type of formatting to a section of the document within the level for which the formatting was received;
    updating the user interface to display the section as being formatted according to the indicated type;
    receiving, via the user interface, an undo command;
    in response to the undo command, inserting, in the causal graph data structure, a deletion node as a child of the attribute node; and
    updating the user interface to undo the formatting.

13. The method of claim 12, further comprising:
    receiving, via the user interface, additional formatting of the section;
    in response to receiving the additional formatting, inserting, in the causal graph data structure, a second attribute node as a child of the attribute node, wherein the second attribute node indicates the type of additional formatting to be applied;
applying the additional formatting to the section of the document; and
updating the user interface to display the section as being formatted according to the indicated type of additional formatting.

14. The method of claim 12, wherein the attribute node includes one or more key-value pairs, wherein each key-value pair includes a key that corresponds to a format property and a value that corresponds to the value of the format property.

15. A method for maintaining a document outline on a user interface, the method comprising:
displaying the document outline on the user interface;
maintaining, in a non-transitory computer-readable medium, a causal graph data structure representing the document outline, wherein the causal graph data structure includes a plurality of structure nodes, each structure node representing a level of the document outline;
receiving, via the user interface, a gesture indicating a move of a level of the plurality of levels from a first position to a second position;
in response to the gesture,
inserting a transition node into the causal graph data structure, wherein the transition node has a parent node representing the second position; and
updating a structure node representing the level being moved so that its parent node is the transition node;
updating the user interface to display the level within the document outline as having been moved;
receiving, via the user interface, an input of an undo instruction;
in response to the undo instruction, inserting, in the causal graph data structure, a deletion node as a child of the transition node; and
updating the user interface to display the level as being in a location where it was prior to having been moved.

16. The method of claim 15, further comprising:
receiving, via the user interface, a second undo command;
in response to the second undo command, inserting, in the causal graph data structure, a second deletion node as a child of the deletion node; and
updating the user interface to display the level within the document outline as having been moved.

* * * * *